US011369912B2

(12) United States Patent
Dewit et al.

(10) Patent No.: US 11,369,912 B2
(45) Date of Patent: *Jun. 28, 2022

(54) AIR CLEANER, COMPONENTS THEREOF, AND METHODS

(71) Applicant: Donaldson Company, Inc., Minneapolis, MN (US)

(72) Inventors: Johan G. Dewit, The Hague (NL); Johnny Craessaerts, Sint-agatha-rode (BE); Andreas Hoeniges, Ahnatal (DE)

(73) Assignee: Donaldson Company, Inc., Minneapolis, MN (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/856,639

(22) Filed: Apr. 23, 2020

(65) Prior Publication Data

US 2020/0246741 A1 Aug. 6, 2020

Related U.S. Application Data

(63) Continuation of application No. 15/809,717, filed on Nov. 10, 2017, now Pat. No. 10,632,410, which is a (Continued)

(51) Int. Cl.
*B01D 46/88* (2022.01)
*B01D 46/00* (2022.01)
(Continued)

(52) U.S. Cl.
CPC ......... *B01D 46/88* (2022.01); *B01D 46/0005* (2013.01); *B01D 46/0006* (2013.01);
(Continued)

(58) Field of Classification Search
CPC .............. B01D 46/008; B01D 46/4227; B01D 46/525–527; B01D 46/0005;
(Continued)

(56) References Cited

U.S. PATENT DOCUMENTS 4,925,561 A 5/1990 Ishii et al.
5,049,326 A 9/1991 Matsumoto et al.
(Continued)

FOREIGN PATENT DOCUMENTS

DE 19638790 A1 3/1998
DE 202005009989 U1 12/2006
(Continued)

OTHER PUBLICATIONS

Examination Report for European Patent Application No. 16 150 568.0 dated Apr. 17, 2019, 5 pages.

*Primary Examiner* — Robert Clemente
(74) *Attorney, Agent, or Firm* — Merchant & Gould P.C.

(57) ABSTRACT

A filter cartridge includes a media pack having first and second opposite flow faces; the media pack comprising flutes extending in a direction between the inlet flow face and the outlet flow face; a frame mounted on the second flow face of the media pack; a seal support section extending from the base member; and first and second opposite and spaced blades extending from the base member and in a different direction from the base member as the seal support section. The first and second blades are embedded within the media pack through the second flow face. A seal member is oriented against the seal support section. The filter cartridge can be removably oriented in a cassette. The cassette and filter cartridge are removably oriented in an air cleaner housing. The cassette may include lugs to help position the cartridge in sealing engagement with the air cleaner housing. In another embodiment, the filter cartridge is cassette-free and includes a cartridge-handle projecting therefrom.

16 Claims, 44 Drawing Sheets

Related U.S. Application Data continuation of application No. 14/584,150, filed on Dec. 29, 2014, now abandoned, which is a continuation of application No. 13/262,037, filed as application No. PCT/US2010/029426 on Mar. 31, 2010, now Pat. No. 8,920,528.

(60) Provisional application No. 61/296,711, filed on Jan. 20, 2010, provisional application No. 61/165,276, filed on Mar. 31, 2009.

(51) Int. Cl.
*B01D 46/52* (2006.01)
*B01D 46/62* (2022.01)
*B01D 46/42* (2006.01)
*B23P 19/04* (2006.01)

(52) U.S. Cl.
CPC ....... *B01D 46/4227* (2013.01); *B01D 46/525* (2013.01); *B01D 46/526* (2013.01); *B01D 46/527* (2013.01); *B01D 46/62* (2022.01); *B23P 19/04* (2013.01); *B01D 2271/025* (2013.01); *B01D 2271/027* (2013.01); *Y10T 29/4973* (2015.01); *Y10T 29/49718* (2015.01); *Y10T 29/49826* (2015.01)

(58) Field of Classification Search
CPC ............ B01D 46/0006; B01D 46/0023; B01D 2271/025; B01D 2271/027; B01D 46/62; B01D 46/88
See application file for complete search history.

(56) References Cited

U.S. PATENT DOCUMENTS

| | | | |
|---|---|---|---|
| 5,562,825 A | 10/1996 | Yamada et al. | |
| 5,613,992 A | 3/1997 | Engel | |
| 5,772,883 A | 6/1998 | Rothman et al. | |
| D396,098 S | 7/1998 | Gillingham et al. | |
| 5,792,247 A | 8/1998 | Gillingham et al. | |
| D398,046 S | 9/1998 | Gillingham et al. | |
| D399,944 S | 10/1998 | Gillingham et al. | |
| 5,820,646 A | 10/1998 | Gillingham et al. | |
| 5,895,574 A | 4/1999 | Friedmann et al. | |
| 5,902,364 A | 5/1999 | Tokar et al. | |
| 6,039,778 A | 3/2000 | Coulonvaux | |
| D428,128 S | 7/2000 | Gillingham et al. | |
| 6,179,890 B1 | 1/2001 | Ramos et al. | |
| D437,401 S | 2/2001 | Ramos et al. | |
| 6,190,432 B1 | 2/2001 | Gieseke et al. | |
| 6,210,469 B1 | 4/2001 | Tokar | |
| 6,235,195 B1 | 5/2001 | Tokar | |
| 6,350,296 B1 | 2/2002 | Warner | |
| 6,673,136 B2 | 1/2004 | Gillingham et al. | |
| 6,966,940 B2 | 11/2005 | Krisko et al. | |
| 7,004,986 B2 | 2/2006 | Kopec et al. | |
| 7,282,075 B2 | 10/2007 | Sporre et al. | |
| 7,323,029 B2 | 1/2008 | Engelland et al. | |
| 7,396,375 B2 | 7/2008 | Nepsund et al. | |
| 7,674,308 B2 | 3/2010 | Krisko et al. | |
| 7,682,416 B2 | 3/2010 | Engelland et al. | |
| 7,905,936 B2 | 3/2011 | Coulonvaux et al. | |
| 8,915,985 B2 | 12/2014 | Dewit et al. | |
| 8,920,528 B2 | 12/2014 | Dewit et al. | |
| 10,632,410 B2 * | 4/2020 | Dewit ................ | B01D 46/0005 |
| 2004/0020177 A1 | 2/2004 | Ota et al. | |
| 2006/0091084 A1 | 5/2006 | Merritt et al. | |
| 2007/0199289 A1 | 8/2007 | Bland et al. | |
| 2007/0289265 A1 | 12/2007 | Coulonvaux et al. | |
| 2008/0010958 A1 | 1/2008 | Fester et al. | |
| 2008/0250763 A1 | 10/2008 | Widerski et al. | |
| 2010/0186353 A1 | 7/2010 | Ackermann et al. | |

FOREIGN PATENT DOCUMENTS

| | | |
|---|---|---|
| JP | 9234321 A | 9/1997 |
| WO | 9740918 A1 | 11/1997 |
| WO | 03047722 A2 | 6/2003 |
| WO | 03095068 A1 | 11/2003 |
| WO | 2004007054 A1 | 1/2004 |
| WO | 2004082795 A2 | 9/2004 |
| WO | 2005063361 A1 | 7/2005 |
| WO | 2005107924 A2 | 11/2005 |
| WO | 2006009766 A1 | 1/2006 |
| WO | 2007000397 A1 | 1/2007 |
| WO | 2007056589 A2 | 5/2007 |

* cited by examiner

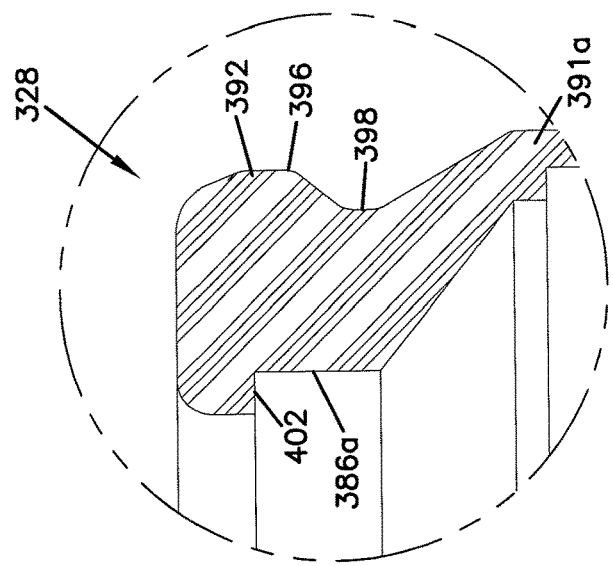
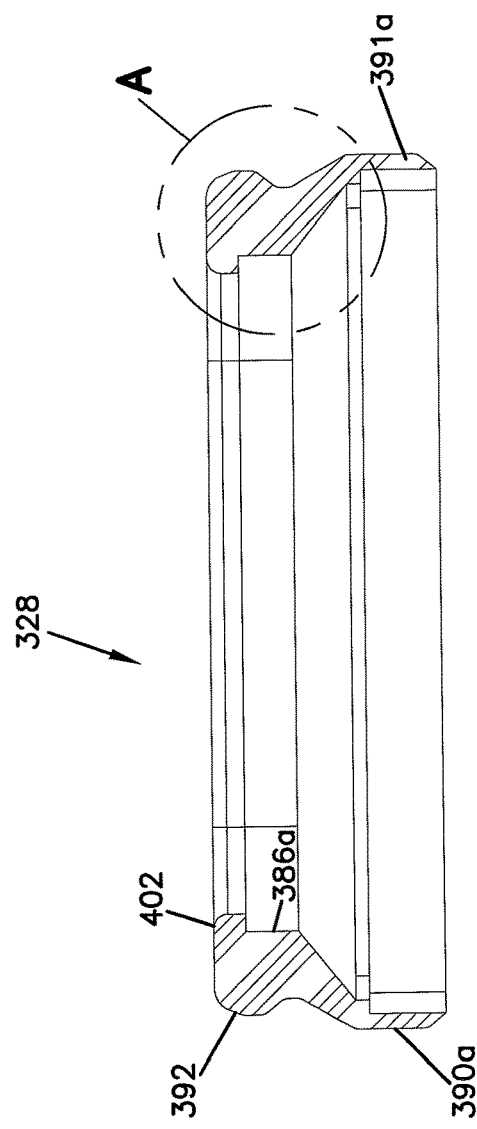

AIR CLEANER, COMPONENTS THEREOF, AND METHODS

CROSS REFERENCE TO RELATED APPLICATIONS

This application is a continuation of U.S. patent application Ser. No. 15/809,717, filed Nov. 10, 2017 which is a continuation of U.S. patent application Ser. No. 14/584,150, filed Dec. 29, 2014 which is a continuation of U.S. patent application Ser. No. 13/262,037, filed Jan. 13, 2012 issued as U.S. Pat. No. 8,920,528 on Dec. 30, 2014, which is a 371 U.S. National Stage of PCT International Patent application No. PCT/US2010/029426, filed 31 Mar. 2010, and claims priority to U.S. Provisional patent application Ser. Nos. 61/165,276, filed Mar. 31, 2009, and 61/296,711, filed Jan. 20, 2010, which applications are incorporated herein by reference. To the extent appropriate, a claim of priority is made to each of the above disclosed applications.

TECHNICAL FIELD

The present disclosure relates to filter constructions for filtering fluids, such as liquids or gases. This particular disclosure concerns: straight through flow filter cartridges; safety filters; assemblies employing such filters; precleaners; and methods for use of, and assembly of, filter cartridges.

BACKGROUND

Straight through flow filters (filter elements or filter cartridges) have been used in various systems for filtering fluids such as gases or liquids. Straight through flow filters typically have an inlet face (or end) and an oppositely disposed outlet face (or end). During filtering, the fluid to be filtered flows in one direction upon entering the filter at the inlet face, and has the same general direction of flow as it exists the outlet face. Typically, a straight through flow filter is installed in housing, for use. After a period of use, the filter requires servicing, either through cleaning or complete replacement of the filter. A seal is necessary between the filter and a portion of the housing in which the filter is placed in use, to ensure proper filtering of the fluid flow through the arrangement.

Improvements in straight through flow filters, their assembly and their use are desirable.

SUMMARY

According to the present disclosure, a filter element or cartridge is provided. The filter element or cartridge in general has a straight through flow construction and comprises z-filter media. The filter element or cartridge includes a seal gasket.

A particular type of air filter cartridge is of concern to the present disclosure. In general, the air filter cartridge comprises: A media pack having first and second opposite flow faces; the media pack comprising a plurality of flutes extending in a direction between the inlet flow face and the outlet flow face; the media pack being closed to air entering the inlet flow face and passing outwardly from the outward flow face without filtering through media of the media pack; a frame mounted on the second flow face of the media pack; the frame includes a base member defining an air flow opening arrangement in communication with the second flow face; a seal support section extending from the base member along a perimeter of the air flow opening arrangement; first and second opposite and spaced blades extending from the base member and in a different direction from the base member as the seal support section; the first and second blades are embedded within the media pack through the second flow face; and a seal member is oriented against the seal support section.

Preferably, in one embodiment, the media pack comprises a stack of strips of single facer filter media material, each strip including a fluted media sheet secured to a facing media sheet and oriented with flutes of each fluted sheet extending in a direction between the first and second opposite flow faces. In one arrangement, the first blade extends from the base member into the media pack between adjacent strips of single facer media. The second blade extends from the base member into the media pack between adjacent strips of single facer media.

In one arrangement, the media pack has first and second opposite sides extending between the first and second opposite flow faces. The cartridge can further include a first side panel secured to the first side of the media pack and a second side panel secured to the second side of the media pack.

Preferably, the first and second blades are connected only by an intervening portion of the base.

In another aspect, a filter cartridge and cassette assembly is provided. In general, the assembly includes a filter cartridge and a cassette. At least a portion of the filter cartridge is removably oriented in the interior volume of the cassette.

The filter cartridge includes a media pack of z-filter media, and a seal member secured to the media pack. One example cassette includes a surrounding wall defining an open interior volume, a plurality of lugs extending from the exterior surfaces of the first and second side walls. The first flow face of the filter cartridge opposes the at least one cross-piece of the first open end of the cassette. In one example, the seal member is outside of the cassette and adjacent to the second open end of the cassette.

In one example, there is at least one cross-piece extending over a first open end and in engagement with the surrounding wall In another aspect, an air cleaner is provided. The air cleaner includes a housing including a surrounding housing-wall defining an open interior, an inlet arrangement, and an outlet arrangement which are at opposite ends of the housing; the housing defining an access opening in communication with the open interior; the surrounding housing-wall defining a plurality of opposing receiving grooves, each of the grooves being in open communication with the access opening and being located closer to the outlet arrangement than to the inlet arrangement.

A cover is removably secured to the housing over the access opening. A filter cartridge and cassette assembly is operably oriented for selective removal within the open interior between the inlet arrangement and the outlet arrangement. The filter cartridge includes a media pack having first and second opposite flow faces and comprising a plurality of flutes extending in a direction between the inlet flow face and the outlet flow face, the media pack being closed to air entering the inlet flow face and passing outwardly from the outlet flow face without filtering flow through media of the media pack, and a seal member secured to the media pack which forms a releasable seal with a sealing surface in the housing.

The cassette includes a surrounding cassette-wall defining an open interior volume therewithin. The cassette-wall has first and second opposite open ends in communication with the interior volume. The cassette-wall has first and second opposite side walls defining an interior surface in communication with the interior volume and an opposite exterior surface. The second open end is an opening sized to permit the filter cartridge to be operably inserted and removed from the interior volume of the cassette. A plurality of lugs extend from the exterior surfaces of the first and second side walls. Each lug of the plurality of lugs is positioned within a respective one of the receiving grooves. At least a portion of the filter cartridge is removably oriented in the interior volume of the cassette. The first flow face is located adjacent to the first opening end of the cassette, and the seal member is outside of the cassette and adjacent to the second open end of the cassette.

In one example embodiment, the cover further includes a grip projecting from a remaining portion of the cover and extending over a portion of the inlet arrangement. In one example, the cassette further includes a cassette-handle sized to accommodate at least a portion of a human hand. The cassette-handle projects from the cassette-wall.

Preferably, the cover has an exterior surface and an opposite interior surface, in which the interior surface includes a receiver that contains at least a portion of the cassette-handle when the filter cartridge and cassette assembly are operably oriented within the housing interior and when the cover is secured over the access opening.

In one example embodiment, a safety element is removably sealed between the filter cartridge and the outlet arrangement.

In one example embodiment, the inlet arrangement includes a precleaner, which comprises a plurality of centrifugal separator tubes.

In another aspect, a method of installing a filter cartridge into an air cleaner is provided. The method includes providing a filter cartridge including a media pack having first and second opposite flow faces. The media pack comprises a plurality of flutes extending in a direction between the inlet flow face and the outlet flow face. The media pack is closed to air entering the inlet flow face and passing outwardly from the outlet flow face without filtering flow through media of the media pack. A seal member is secured to the media pack.

There is a step of providing a cassette having a surrounding cassette-wall, with lugs projecting from an exterior portion of the cassette-wall, and a handle extending from the cassette-wall. Next, the filter cartridge is oriented partially into an interior of the cassette so that the seal member is outside of the cassette to provide a filter cartridge and cassette assembly. The filter cartridge and cassette assembly are oriented into an access opening in an air cleaner housing. The access opening is between an air cleaner inlet arrangement and an air cleaner outlet arrangement.

While orienting the filter cartridge and cassette assembly in the access opening, there is a step of orienting the lugs into a grooves in the housing adjacent to the air cleaner outlet arrangement. Next, the handle is grasped to move the filter cartridge and cassette assembly so that the seal member is urged against a sealing surface in the housing to form a releasable seal.

Herein, a variety of features, arrangements and techniques are provided that can be incorporated into air cleaner arrangements, to advantage. Selected ones of the techniques features arrangements can be utilized, to advantage. Together, some particularly preferred arrangements are provided. However, it is not a requirement that all filter elements or assemblies must incorporate all advantageous features herein to obtain benefit and advantage according to the present disclosure. The individual features, techniques, and advantages can be selected and be selectively combined for various alternate arrangements.

BRIEF DESCRIPTION OF THE DRAWINGS

FIG. 16 is a side elevational view of the seal member used with the filter cartridge of FIGS. 12-14.

FIG. 16A is an enlarged view of a portion of the seal member of FIG. 16.

DETAILED DESCRIPTION

I. Z-Filter Media Configurations, Generally

Figure 1:
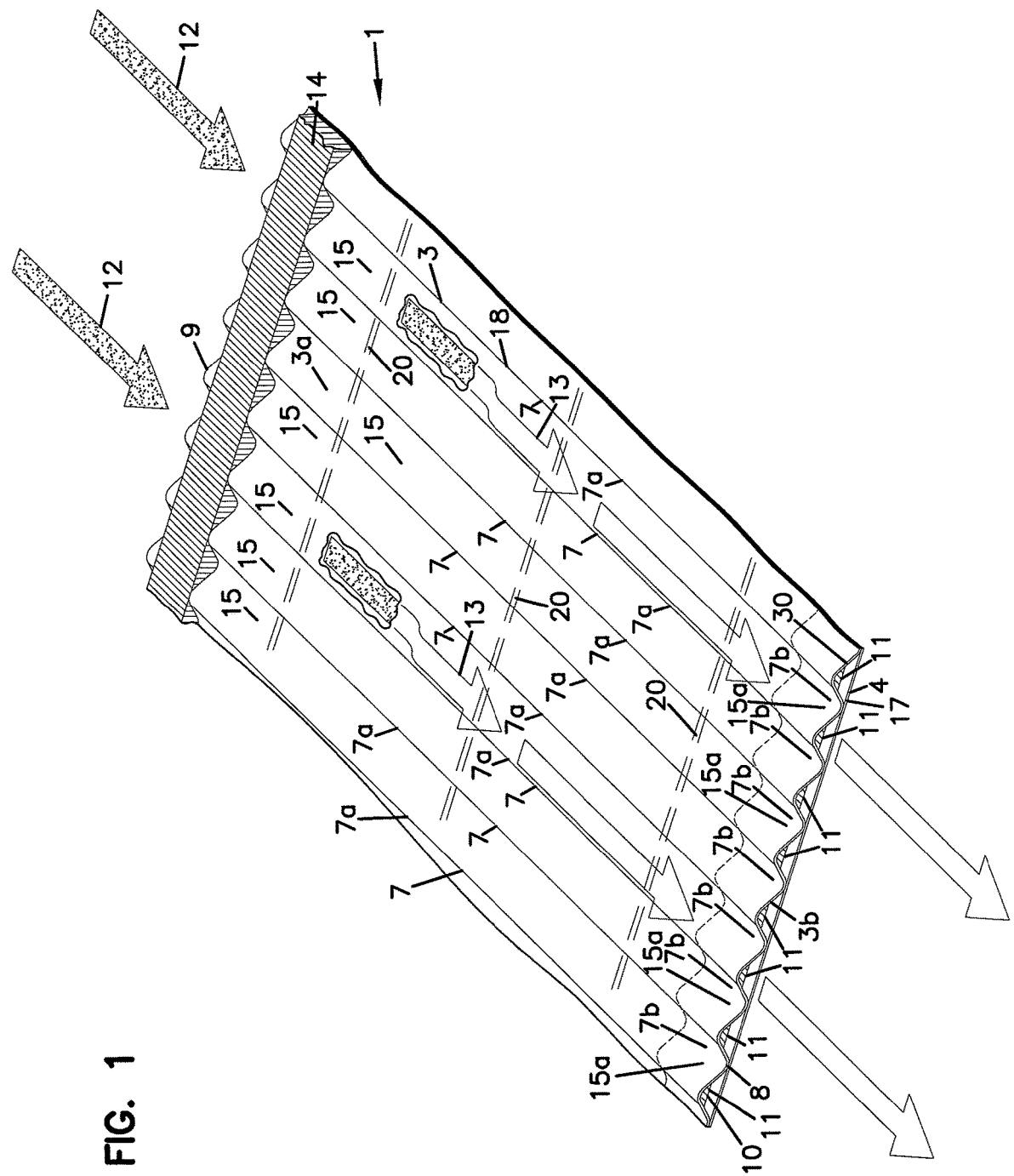
FIG. 1 is a fragmentary, schematic, perspective view of a single facer strip of z-filter media comprising a fluted sheet secured into a facing sheet.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is shown herein at FIG. 7 and described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending there across.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of ridges and troughs are necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15*a* of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7*a*, 7*b* are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
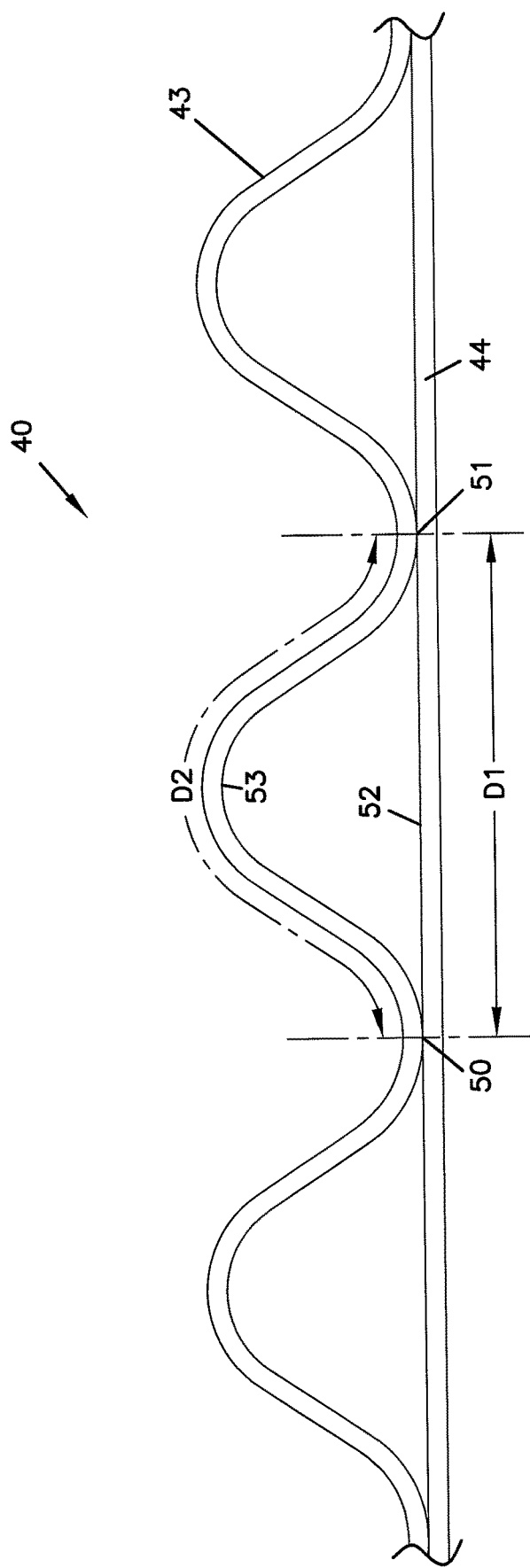
FIG. 2 is an enlarged, schematic, fragmentary view of a single facer sheet comprising fluted media secured to facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25–1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
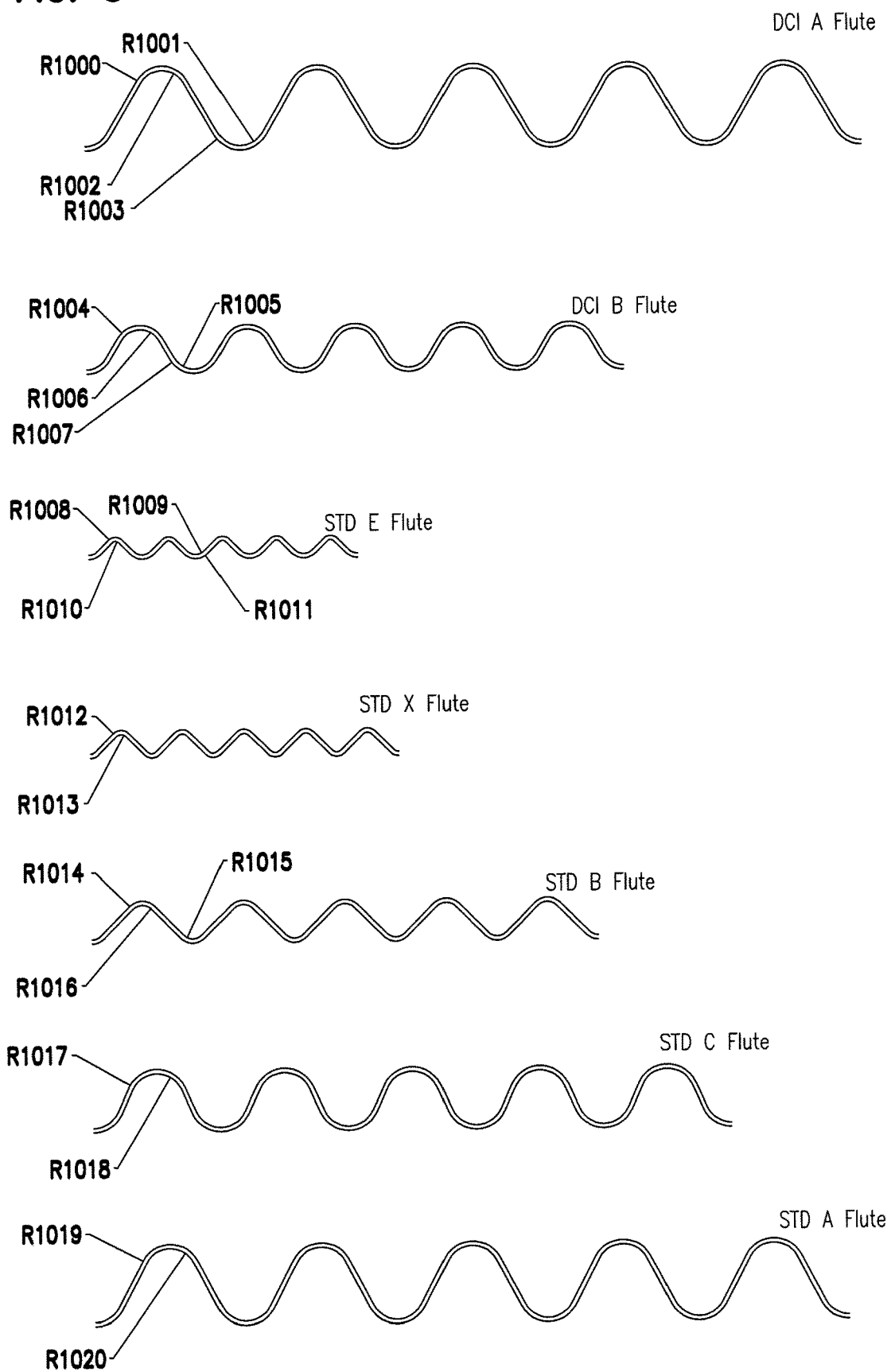
FIG. 3 is a schematic view of various selected flute shapes.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and Ser. No. 12/012,785, filed Feb. 4, 2008 can be used, with air cleaner features as characterized herein below. The complete disclosures of each of U.S. Ser. Nos. 12/215,718 and 12/012,785 are incorporated herein by reference.

Figures 3A, 3B:
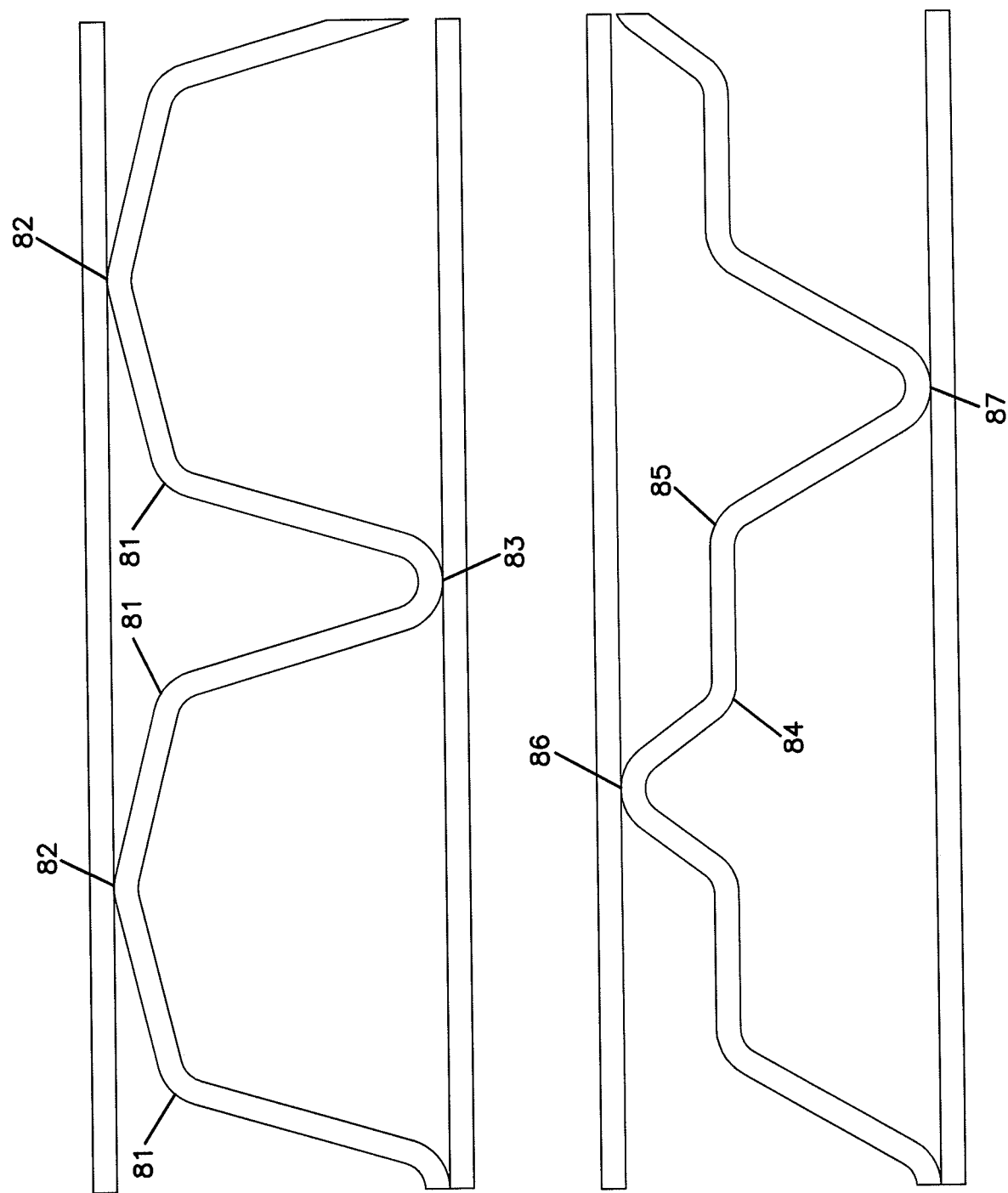
FIG. 3A includes a schematic, fragmentary, cross-sectional view of a further fluted media configuration in a single facer media pack.
FIG. 3B includes a schematic, fragmentary, cross-sectional view of a still further alternate flute definition and media pack comprising single facer strips.
Figure 3C:
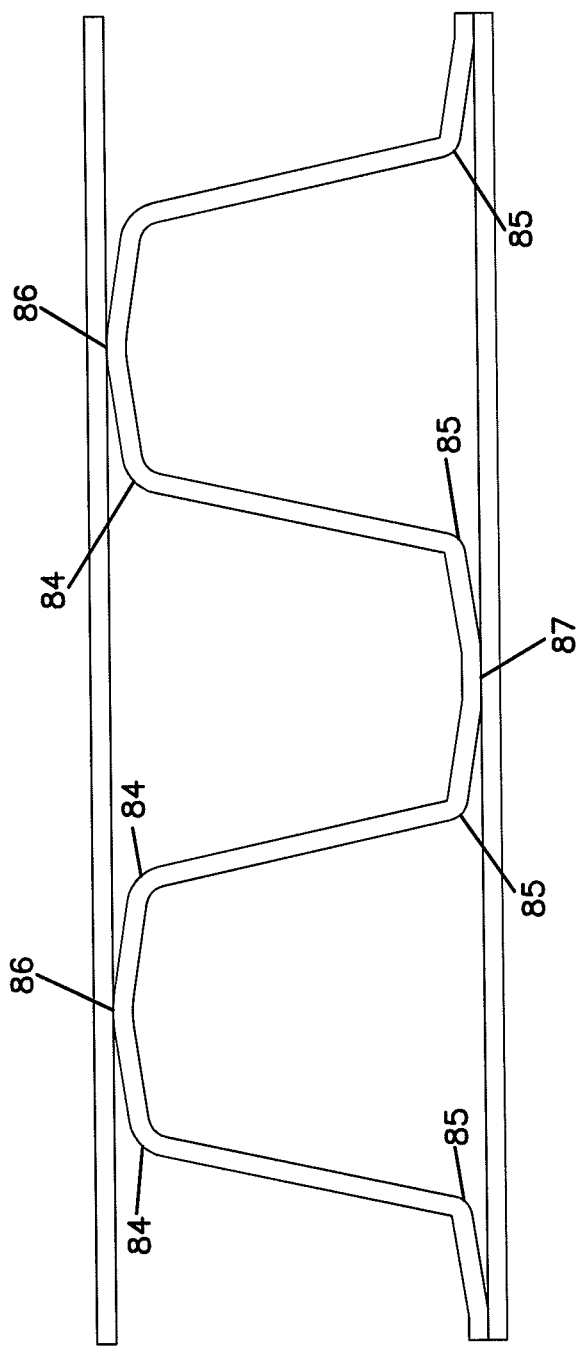
FIG. 3C includes a schematic, fragmentary, cross-sectional view of yet another flute definition in a media pack comprising single facer strips.

In FIGS. 3A-3C, cross-sectional views of exemplary portions of filtration media are shown wherein the fluted sheet has one or more non-peak ridge extending along at least a portion of the flute length. FIG. 3A shows a fluted sheet having one non-peak ridge 81 provided between adjacent peaks 82, 83, and FIGS. 3B and 3C show fluted sheets having two non-peak ridges 84, 85 between adjacent peaks 86, 87. The non-peak ridges 81, 84, 85 can extend along the flute length any amount including, for example, an amount of 20% of the flute length to 100% of the flute length. In addition, the fluted sheet can be provided without non-peak ridges 81, 84, 85 between all adjacent peaks 82, 83, 86, 87, and can be provided with differing numbers of non-peak ridges 81, 84, 85 between adjacent peaks 82, 83, 86, 87 (e.g., alternating zero, one, or two non-peak ridges in any arrangement). The presence of non-peak ridges 81, 84, 85 can help provide more media available for filtration in a given volume, and can help reduce stress on the fluted sheet thereby allowing for a smaller radius at the peaks and therefore reduced media masking. Such media can be used in arrangements according to the present disclosure.

II. Manufacture of Coiled Media Configurations Using Fluted Media, Generally

Figure 4:
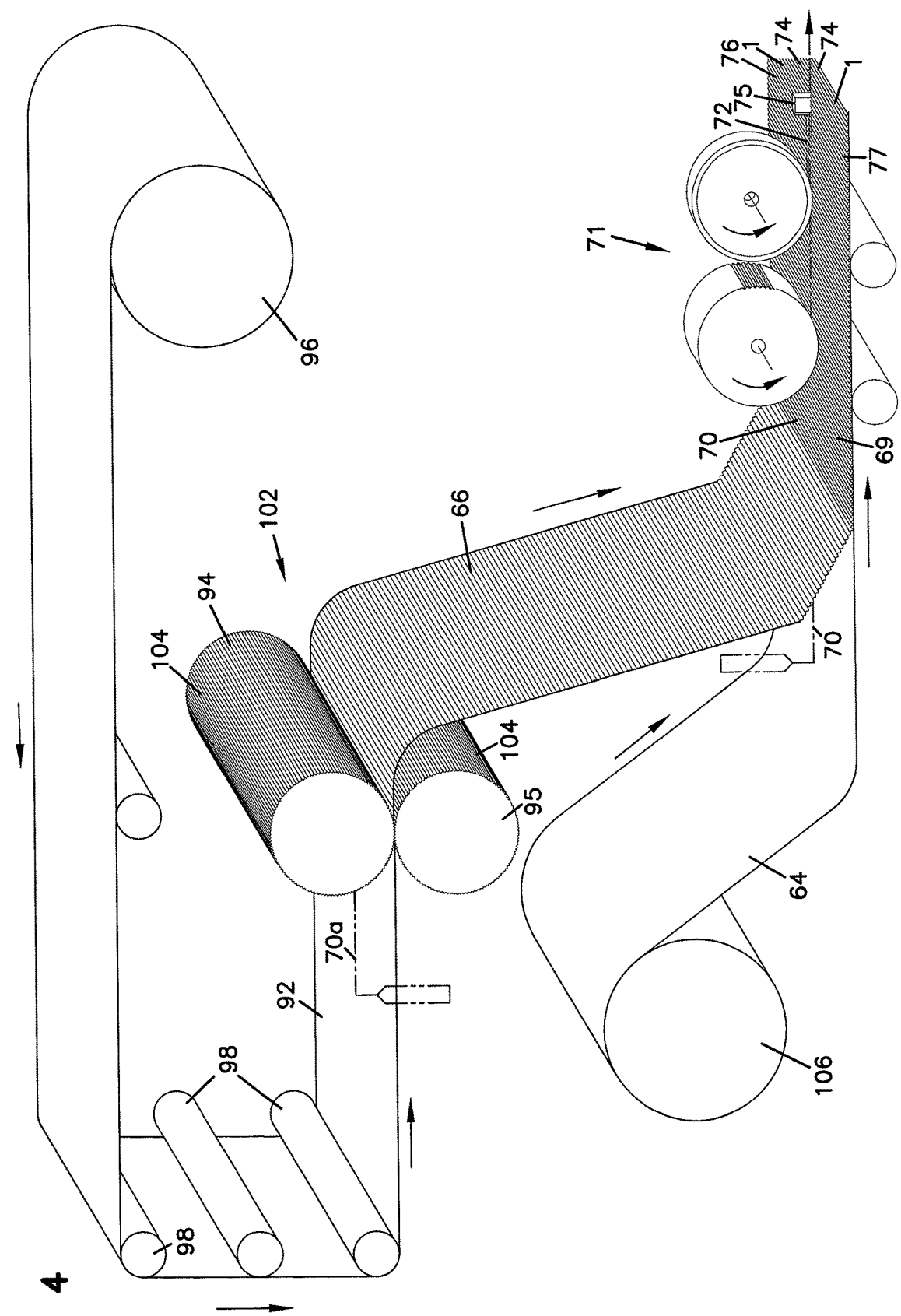
FIG. 4 is a schematic view of a process for making single facer media according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located there between at 70. The adhesive bead 70 will form a single facer bead 14, FIG. 1.

The term "single facer bead" references a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 7.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25–1.35×D1, although alternatives are possible. In some instances the techniques may be applied with curved wave patterns that are not "regular," including, for example, ones that do not use straight flutes. Also, variations from the curved wave patterns shown are possible.

Figure 5:
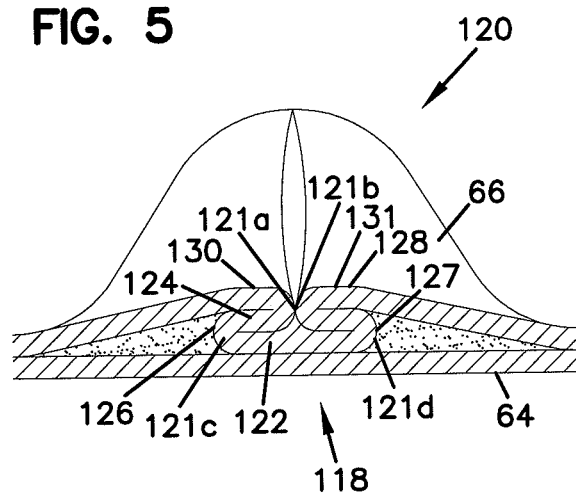
FIG. 5 is schematic, cross-sectional view of an example darted flute.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, and 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
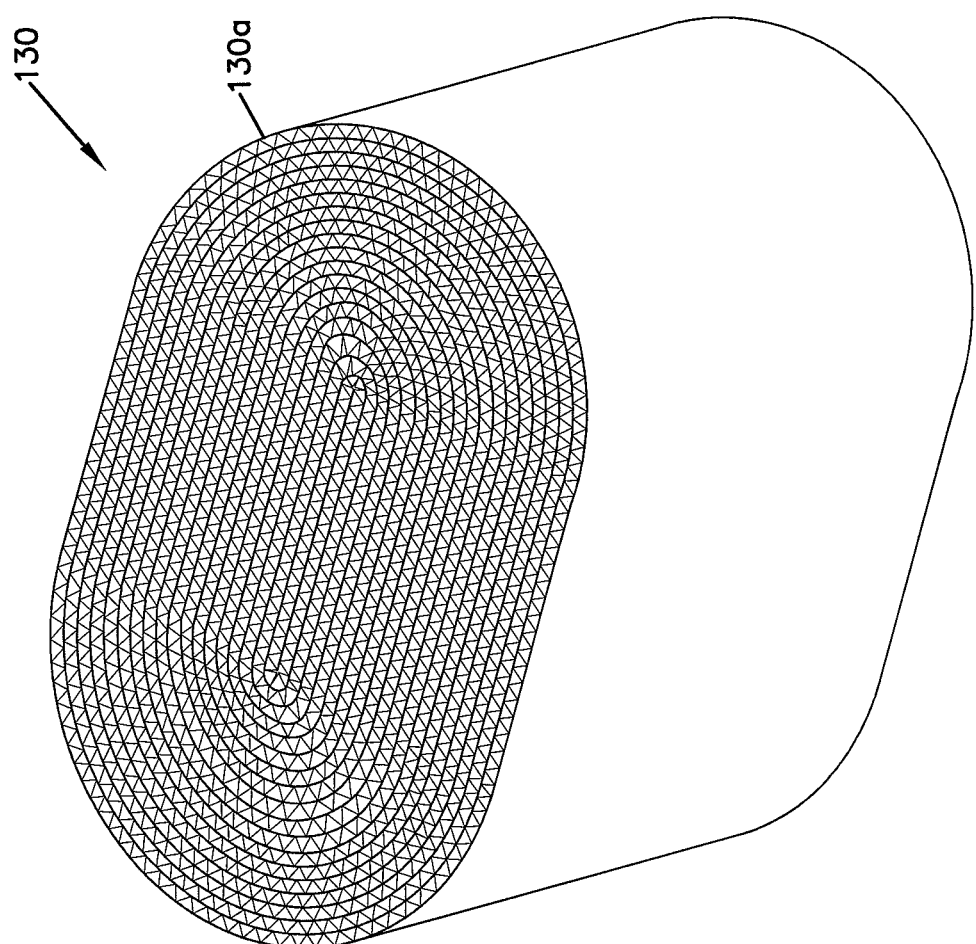
FIG. 6 is schematic, perspective view of a coiled media construction comprising a coiled sheet of single facer material.

Reference numeral 130, FIG. 6, generally indicates a coiled media pack 130. The coiled media pack 130 comprises a single strip 130a of single facer material comprising a fluted sheet secured to facing sheet coiled around a center, which can include a core, or which can be careless as illustrated. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

Figure 7:
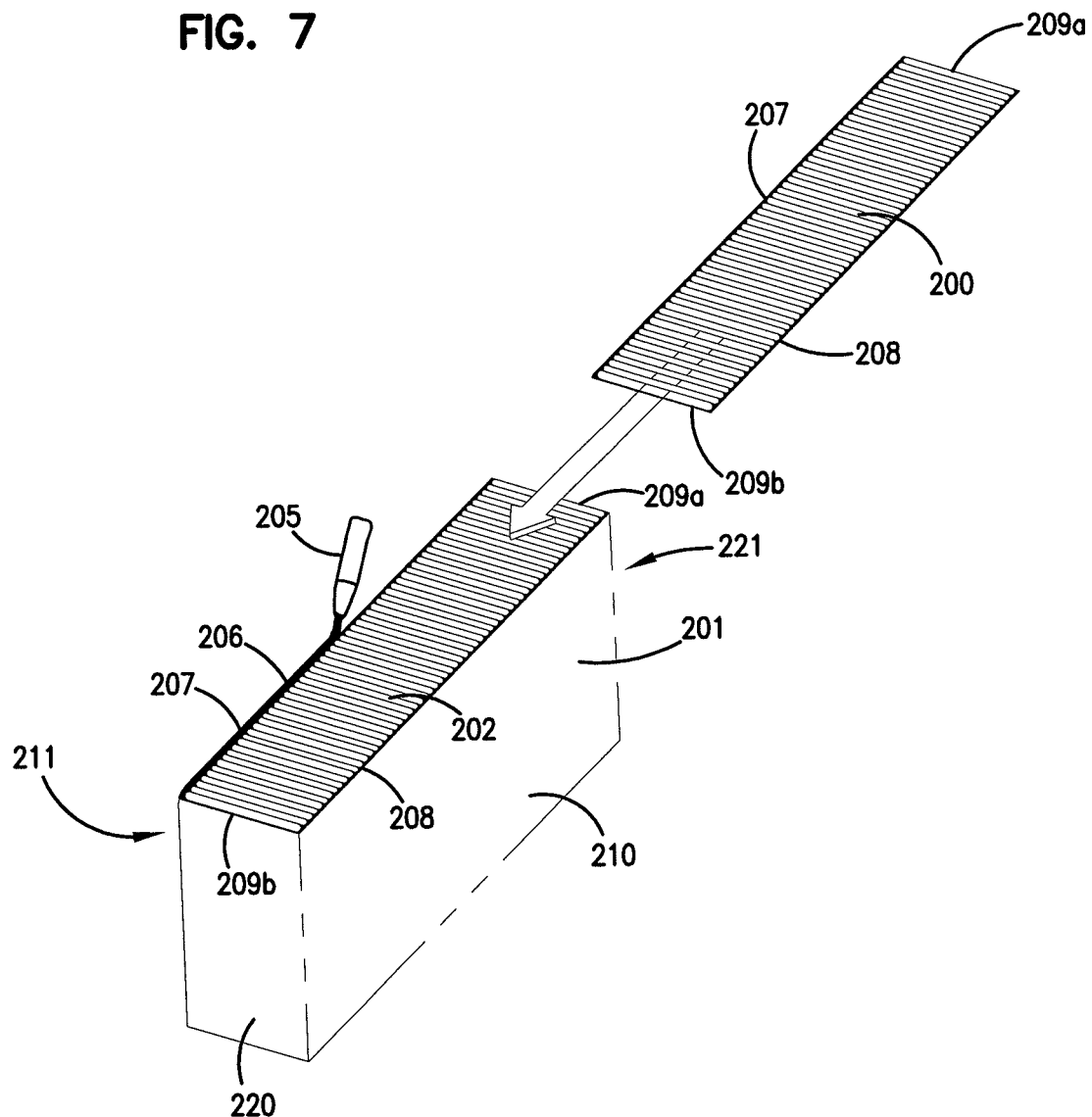
FIG. 7 is a schematic, perspective view of a stacked media construction.

In FIG. 7, schematically there is shown a step of forming a stacked z-filter media pack from strips of z-filter media, each strip being a fluted sheet secured to a facing sheet. Referring to FIG. 7, single facer strip 200 is being shown added to a stack 201 of strips 202 analogous to strip 200. Strip 200 can be cut from either of strips 76, 77, FIG. 4. At 205, FIG. 7, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

III. Example Air Cleaner and Components, FIGS. 8-34

A. Overview of Air Cleaner and Components, FIGS. 8-10

Figure 8:
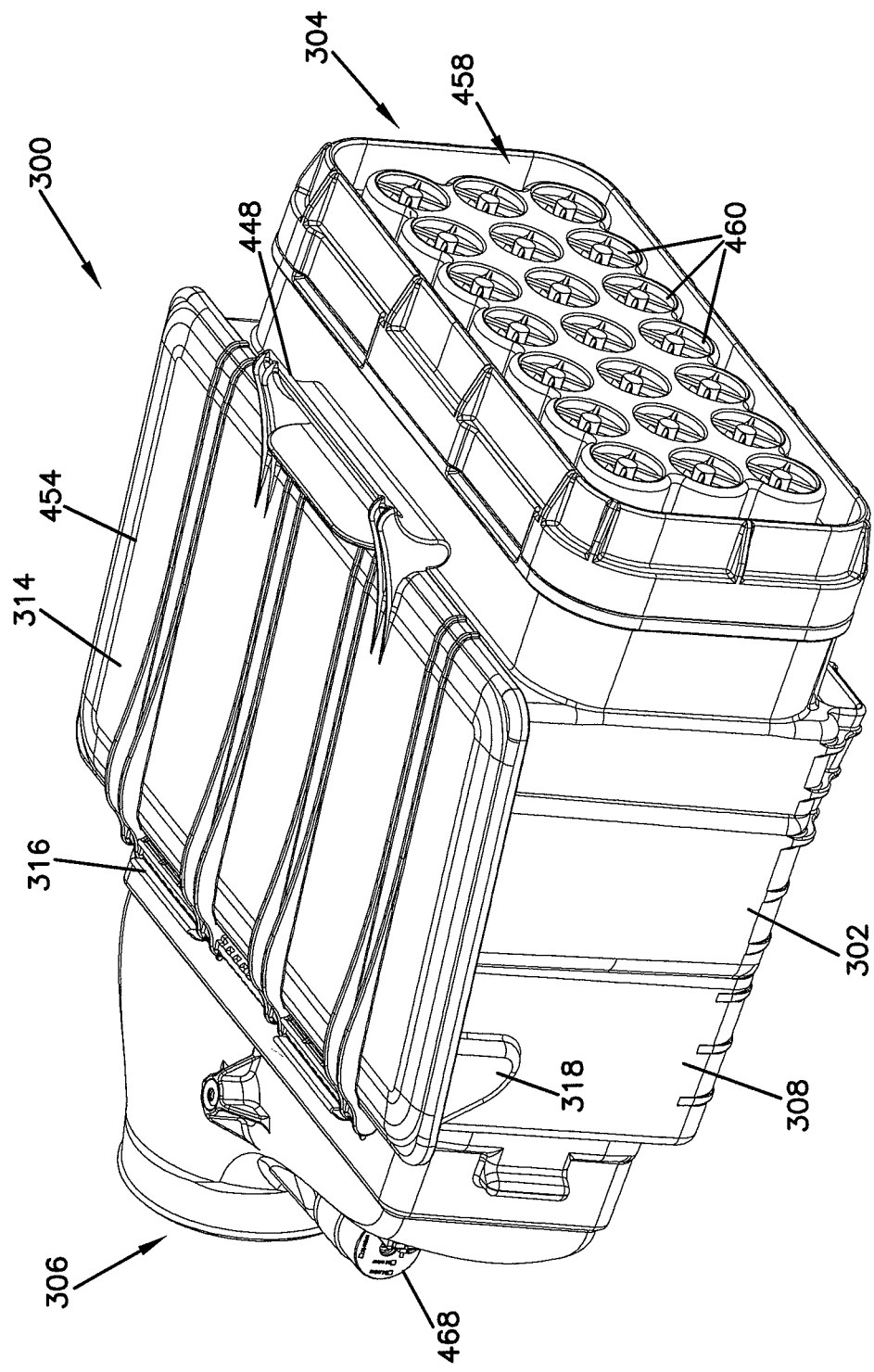
FIG. 8 is a perspective view of a first embodiment of an air cleaner constructed in accordance with principles of this disclosure.
Figure 9:
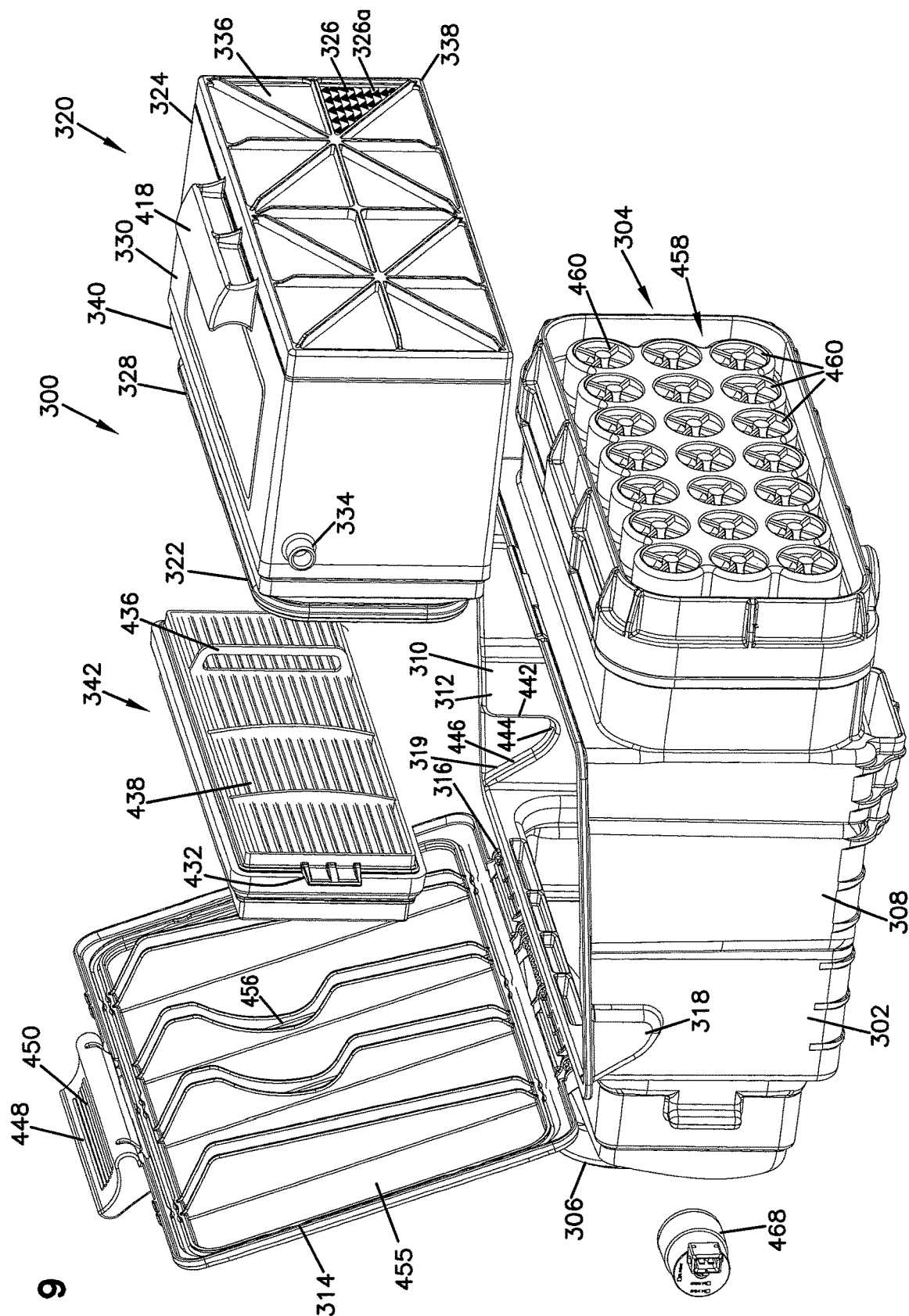
FIG. 9 is an exploded perspective view of the air cleaner of FIG. 8 showing the internal components including a filter cartridge and cassette assembly and a safety element.
Figure 10:
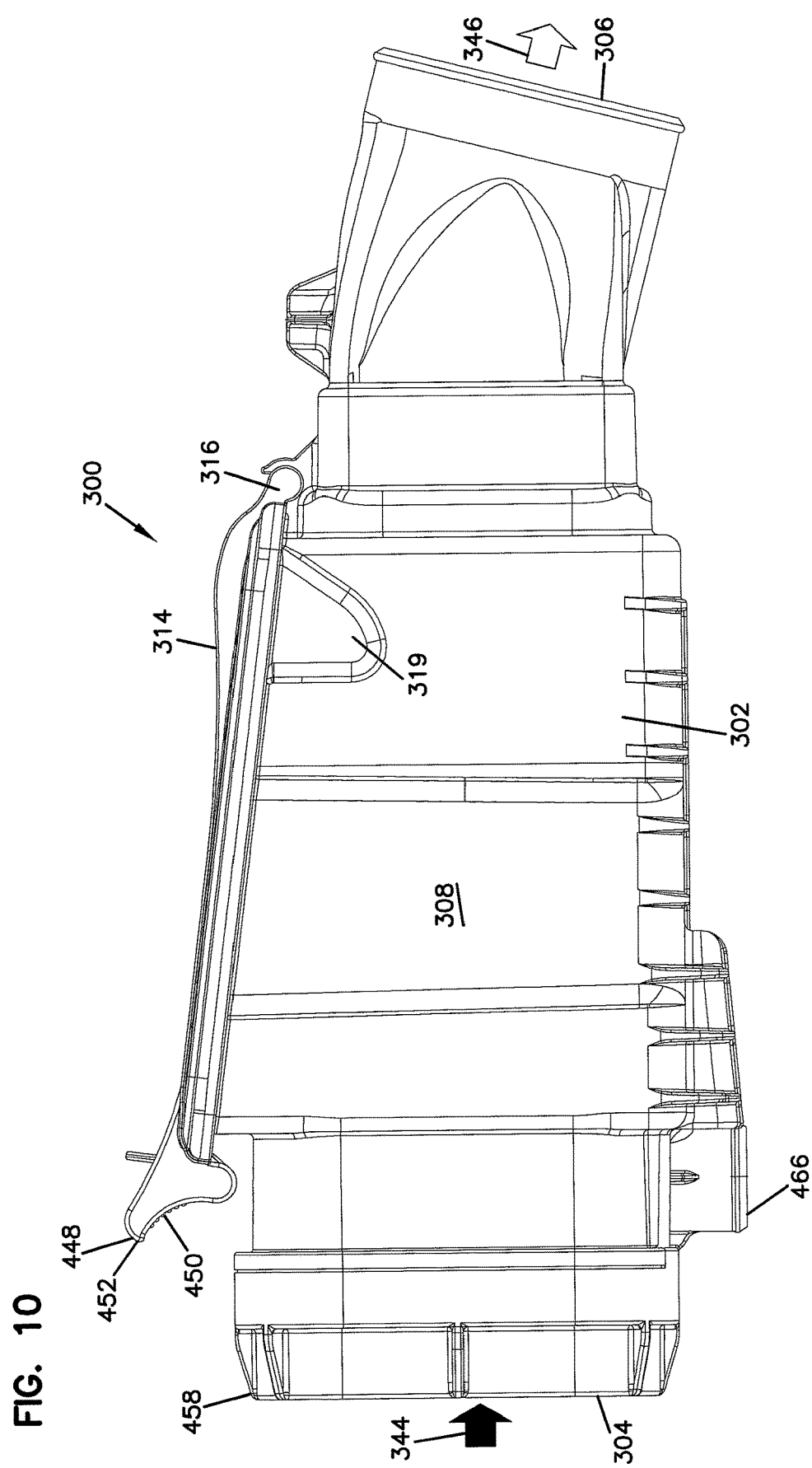
FIG. 10 is a side elevational view of the air cleaner of FIG. 8.

On embodiment of an air cleaner is depicted in FIGS. 8-10 at reference numeral 300. In the one shown, the air cleaner 300 includes a housing 302, an inlet arrangement 304, and an outlet arrangement 306. In this embodiment, the inlet arrangement 304 and the outlet arrangement 306 are at opposite ends of the housing 302.

The housing 302 includes a surrounding housing-wall 308 defining an open interior 310. The housing 302 further defines an access opening 312 in communication with the open interior 310. In the embodiment shown, the access opening 312 is located between the inlet arrangement 304 and the outlet arrangement 306. When the air cleaner 300 is in a normal, upright operable orientation, the access opening 312 will be at a top part of the air cleaner 300.

A cover 314 is removably secured to the housing 302 over the access opening 312. In this embodiment, the cover 314 is pivotably secured to the housing 302 by a hinge arrangement 316 located adjacent to the outlet arrangement 306. In this manner, the cover 314 is allowed to pivot about the hinge arrangement 316 between a closed position (FIGS. 8 and 10) and an open position (FIG. 9). When in the open position, the interior 310 may be accessed. Further features regarding the cover 314 are discussed below in section E.

In the embodiment shown in FIGS. 8-10, the housing-wall 308 defines a pair of opposing receiving grooves 318, 319.

Each of the grooves 318, 319 is in open communication with the access opening 312 and is located closer to the outlet arrangement 306 then to the inlet arrangement 304. In FIG. 9, the receiving groove 319 can be seen in the interior 310 of the housing 302. The receiving groove 318 is a mirror-image of the groove 319. In FIGS. 8 and 9, only the exterior of the receiving groove 318 is visible. The receiving grooves 318, 319 help to orient a filter cartridge and cassette assembly 320 into operable orientation and sealing engagement with the housing 302.

In FIG. 9, one embodiment of the filter cartridge and cassette assembly 320 can be seen removed from the housing 302. The cartridge and cassette assembly 320 includes a filter cartridge 322 removably oriented in a cassette 324. The filter cartridge and cassette assembly 320 is operably oriented for selective removal within the open interior 310 between the inlet arrangement 304 and the outlet arrangement 306.

The filter cartridge 322 includes z-media 326 as described in sections I and II, above. In FIG. 9, only a portion of the z-media 326 is illustrated, but it should be understood that the entire face of the cartridge 322 would have z-media 326 as illustrated at 326a. The cartridge 322 includes a seal member 328, which forms a releasable seal with a sealing surface in the housing 302. More details regarding the filter cartridge 322 and seal member 328 are discussed below in section B.

The cassette 324 includes a surrounding cassette-wall 330. The cassette-wall 330 defines an open interior volume 332 (FIG. 26) therewithin. The interior volume 332 is sized to receive the filter cartridge 322 therewithin.

Figure 27:
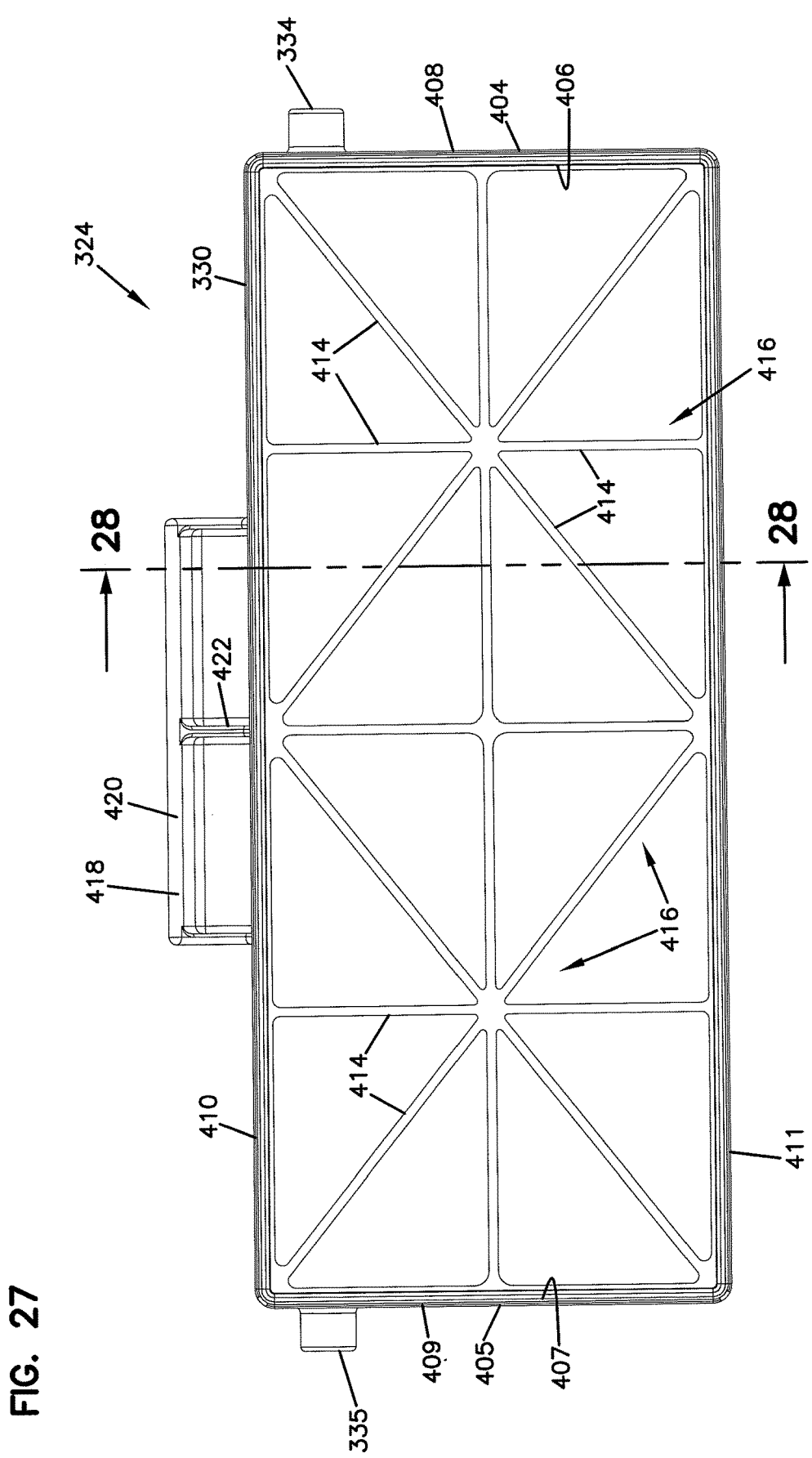
FIG. 27 is a front elevational view of the cassette of FIG. 25.
Figure 28:
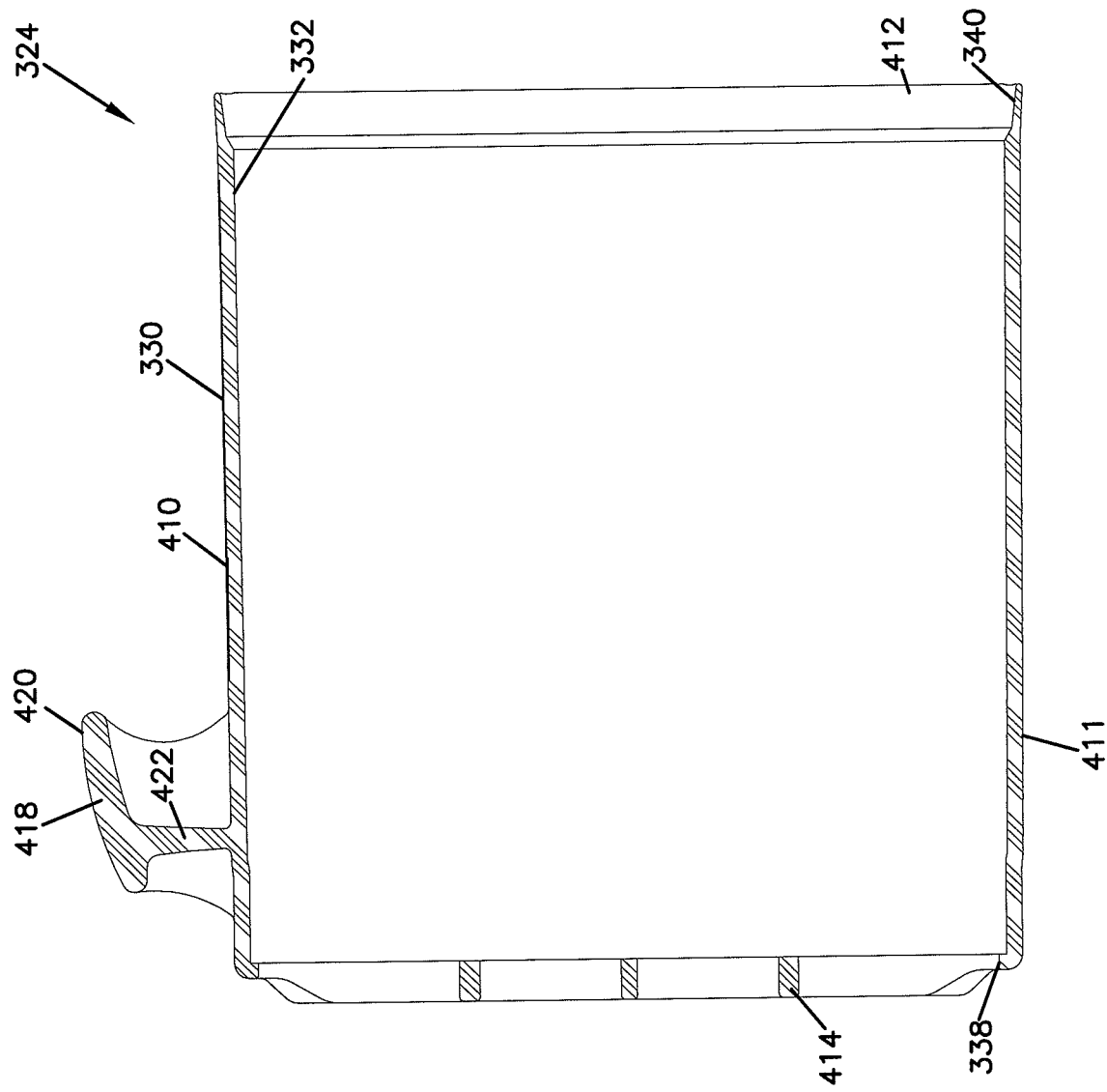
FIG. 28 is a cross-sectional view of the cassette of FIG. 27, the cross-section being taken along the line 28-28 of FIG. 27.

The cassette 324, in this embodiment, further includes a plurality of lugs extending therefrom. In the embodiment shown, there is depicted first and second lugs 334, 335 (FIG. 27). When the cartridge and cassette assembly 320 is operably oriented within the housing 302, each lug of the plurality of lugs in positioned in the receiving grooves. In the embodiment shown, the first and second lug 334, 335 is each positioned within a respective one of the receiving grooves 318, 319. This positioning of the lugs 334, 335 within the grooves 318, 319 will help the person installing assembly 320 to properly orient the assembly 320 into sealing engagement with the housing 302. This is discussed further below in sections E and F.

When operably installed, at least a portion of the filter cartridge 322 is removably oriented in the interior volume 332 of the cassette 324. The inlet flow face 336 is located adjacent to a first open end 338 of the cassette 324, and the seal member 328 is outside of the cassette 324 and adjacent to a second open end 340 of the cassette 324.

In FIG. 9, there is also depicted an optional safety element 342. The safety element 342 is removably sealed between the filter cartridge 322 and the outlet arrangement 306. More details about one example embodiment of safety element 342 is discussed in section D below.

FIG. 10 illustrates the air cleaner 300 in operation. Air to be filtered, such as air being drawn in to an engine enters the air cleaner 300 illustrated by arrow 344. The air goes through the inlet arrangement 304, which in this embodiment, functions as a pre-cleaner 458 (which will be discussed further below in section E). The air then flows from the inlet arrangement 304, through the inlet flow face 336 of the cartridge 322, then through the z-media 326, and then exits the cartridge 322. From there, the air flows through the safety element 342 and then through the outlet arrangement 306. The air exits the air cleaner 300 as shown by arrow 346 in FIG. 10. From there, the filtered air is used for downstream equipment, such as an engine.

With this overview, we now turn to a description of example embodiments of the components and operation.

B. Example Filter Cartridge, FIGS. 11-20

Figure 11:
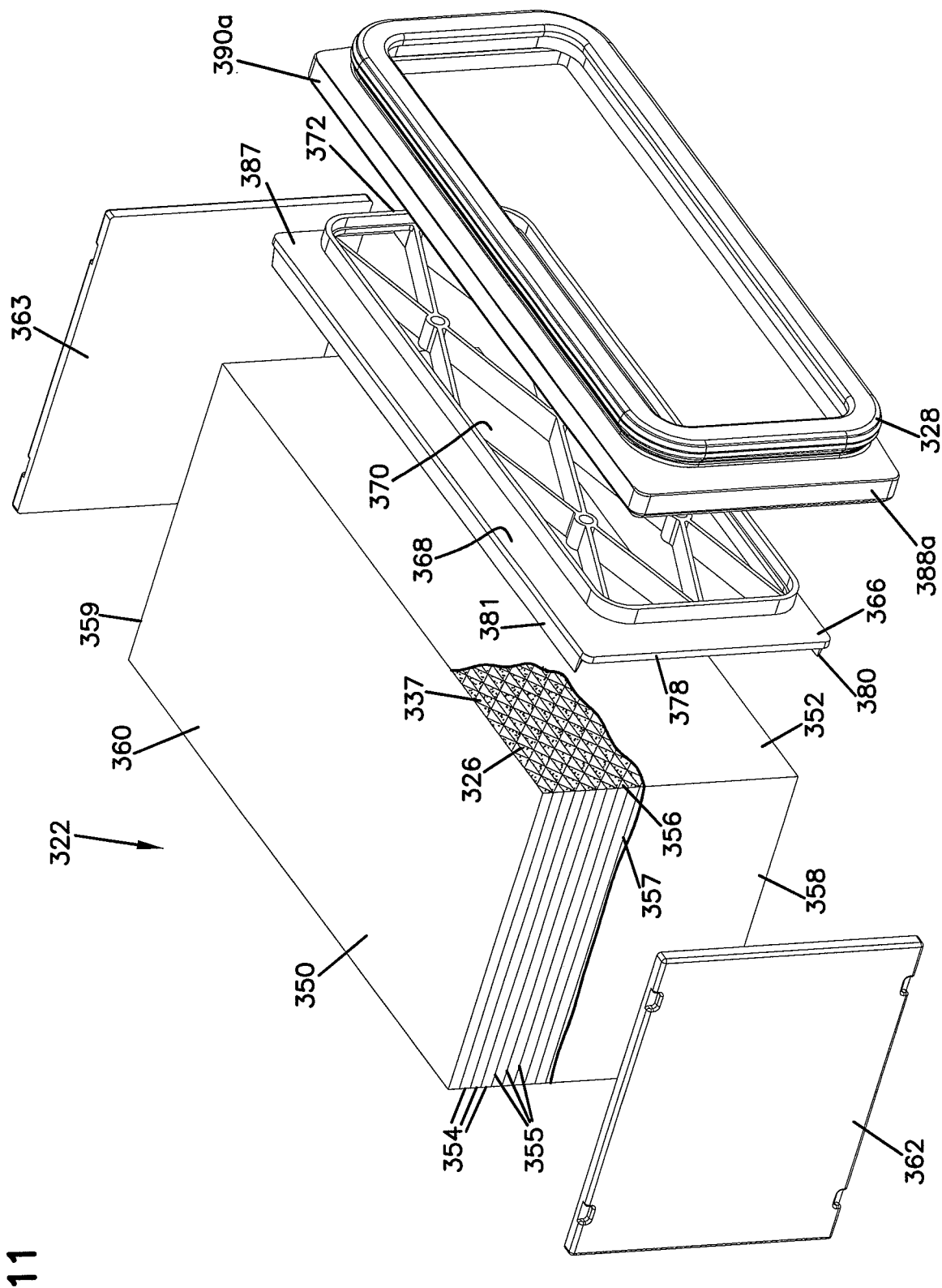
FIG. 11 is an exploded perspective view of an air filter cartridge utilized in the air cleaner of FIGS. 8-10.

In reference now to FIGS. 11-20, an example of embodiment of filter cartridge 322 is illustrated. FIG. 11 shows an exploded, perspective view of one example embodiment of the filter cartridge 322, which can be utilized in the air cleaner 300. Other embodiments are possible, but this is one usable embodiment that can be used, to advantage. However, it is not a requirement that the filter cartridge have all components or features. The individual features, techniques, and advantages can be selected and be selectively combined for various alternate arrangements.

In the embodiment depicted, the filter cartridge 322 includes a media pack 350 having first and second opposite flow faces 351, 352. The media pack 350 comprises z-media 326, as described above in Sections I and II. In this embodiment, the first flow face 351 (FIG. 12) also corresponds to the inlet flow face 336. The second flow face 352 corresponds to an outlet flow face 337. The z-media 326 is depicted schematically in the FIGS., and the individual flutes are only shown across a portion of the first and second flow faces 351, 352. It should be understood that the entire first and second flow faces 351, 352 include fluted z-media 326.

In the embodiment shown, the media pack 350 comprises a stack of strips 354 of single facer filter media material 355 (FIG. 11). Each strip 354 includes a fluted media sheet 356 secured to a facing media sheet 357 and oriented with flutes of each fluted sheet 356 extending in a direction between the first and second opposite flow faces, 351, 352. See FIG. 1, and the accompanying description above, for further explanation of the fluted sheet and facing sheet.

The media pack 350, in this embodiment, is shaped such that the first flow face 351 and the second flow face 352 each has a rectangular perimeter shape. As can be seen in FIG. 11, the media pack 350 has a generally rectangular cross section, such that the overall shape of the media pack 350 is rectangular. In this embodiment, the media pack 350 has first and second opposite sides, 358, 359 extending between the first and second flow faces 351, 352.

Figure 12:
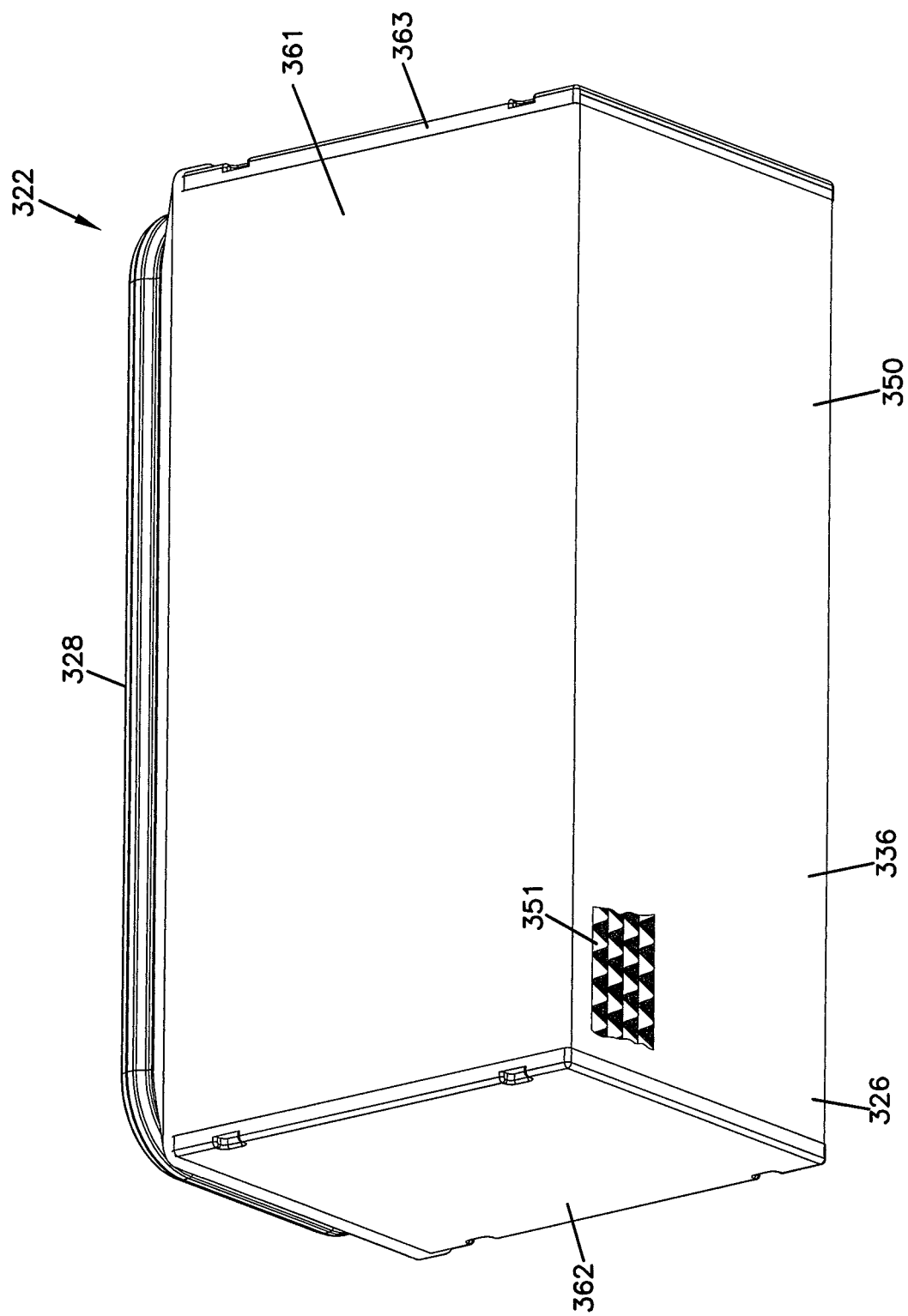
FIG. 12 is a perspective view of the assembled air filter cartridge of FIG. 11.
Figure 13:
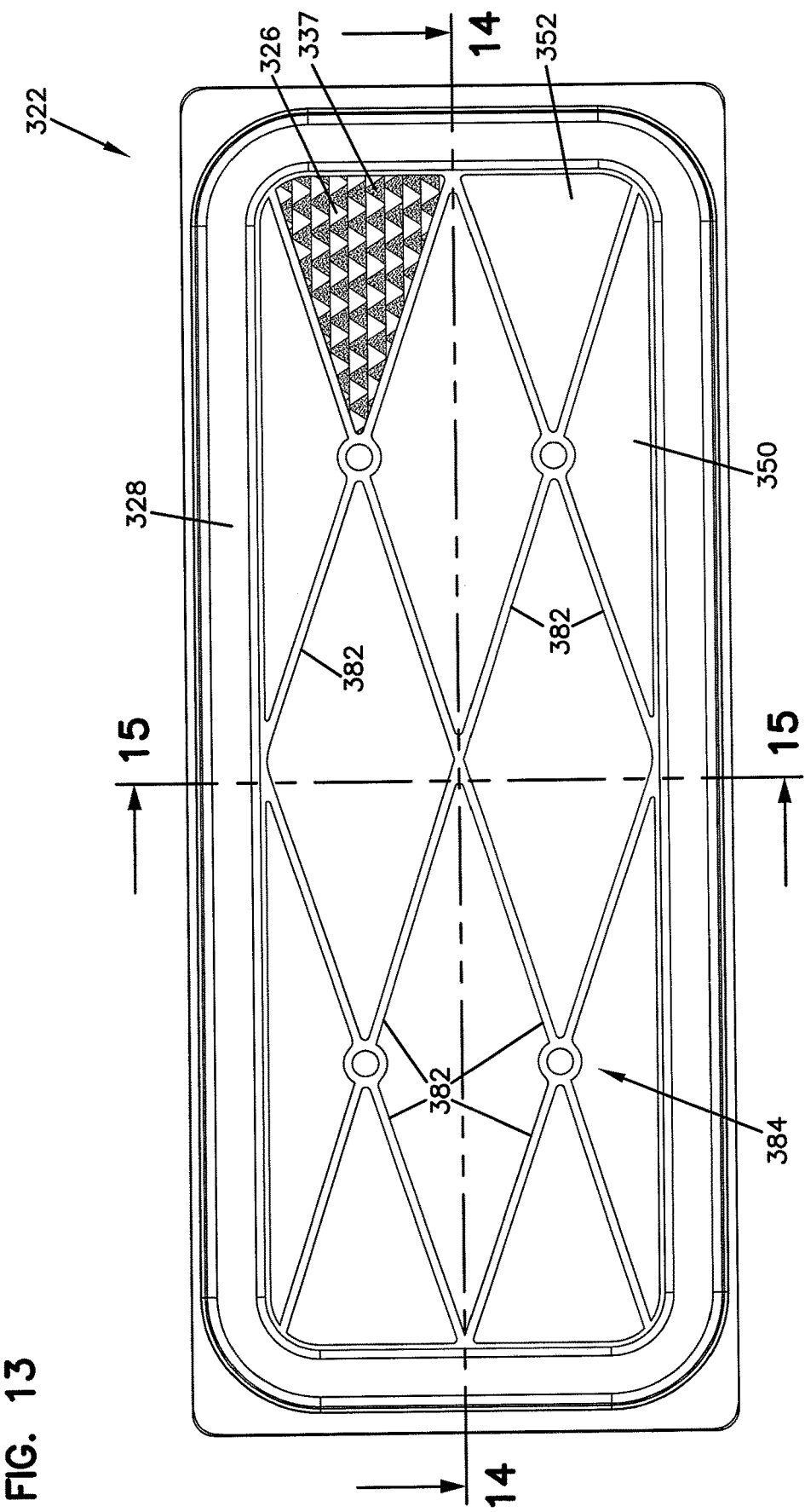
FIG. 13 is an end view of the air filter cartridge of FIG. 12.
Figure 15:
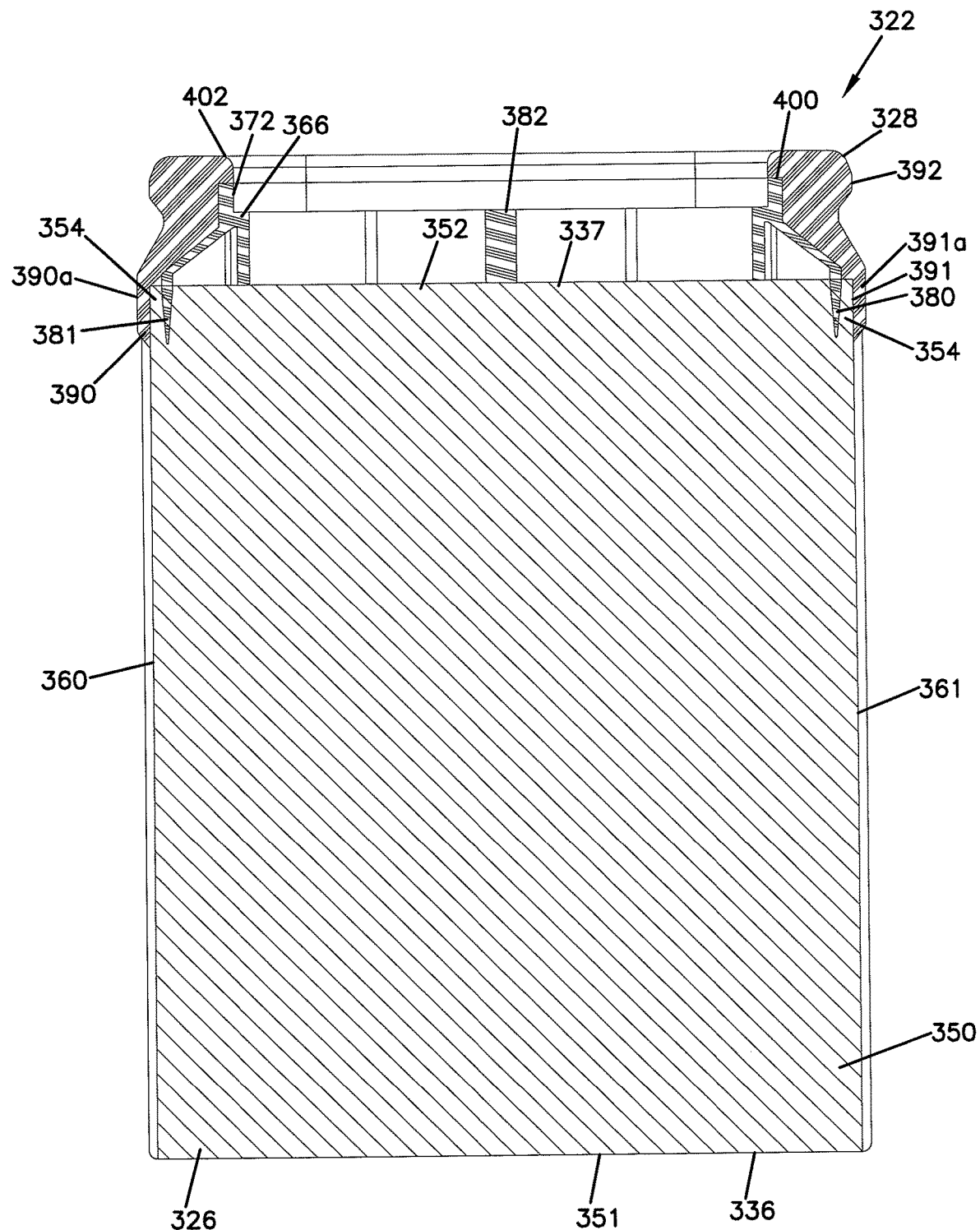
FIG. 15 is a cross-sectional view of the filter cartridge of FIGS. 12 and 13, the cross-section being taken along the line 15-15 of FIG. 13.

As can also be seen in FIGS. 11, 12, and 15, this embodiment of the media pack 350 further includes third and fourth opposite sides 360, 361 extending between the first and second opposite flow faces 351, 352. The third and fourth sides 360, 361 also extend between the first and second sides 358, 359.

Preferably, each strip 354 of the single facer filter media material has facing sheet 357 that is non-fluted, preferably flat. When arranged in the manner shown, the media pack 350 comprises a plurality of flutes extending in a direction between the inlet flow face 336 and the outlet flow face 337. Selected ones of the flutes are closed at the inlet flow face 336 while being open at the outlet flow face 337, while selected ones of other flutes are open at the inlet flow face 336 and closed at the outlet flow face 337. When constructed this way, the media pack 350 is closed to air entering the inlet flow face 336 and passing outwardly from the outlet flow face 337 without being forced to filter flow through the z-media 326 of the media pack 350.

In the embodiment shown, the filter cartridge 322 further includes a first side panel 362 secured to the first side 358 of the media pack 350. Similarly, there is a second side panel 363 secured to the second side 359 of the media pack 350. The first and second panel 362, 363 are secured to the media pack 350 at the first and second sides 358, 359 in order to close or otherwise seal what might be a leak-path for unfiltered air. The first and second side panels 362, 363 may be made from urethane, and the media pack 350 can be secured to the sides 358, 359 by way of directly molding the media pack 350 into urethane that results in the panels 362, 363. Alternate methods can be used, such as by adhesive or other types of securing or molding techniques. As can be seen in FIG. 11, the first and second side panels 362, 363 are sized and shaped to match the shape of the first and second sides 358, 359. In this embodiment, they are rectangular in shape.

The filter cartridge 322, in the embodiment shown, further includes a frame 366. The frame 366 is depicted as mounted on the second flow face 352 of the media pack 350. Referring now to FIGS. 17-20, the frame 366 includes a base member 368. The base member 368 defines an air flow opening arrangement 370 in air flow communication with the second flow face 352.

The frame 366, in this embodiment, further includes a seal support section 372 extending from the base member 368 along a perimeter 373 of the air flow opening arrangement 370. The seal support section 372 is for supporting the seal member 328, as will be described further below.

Figure 17:
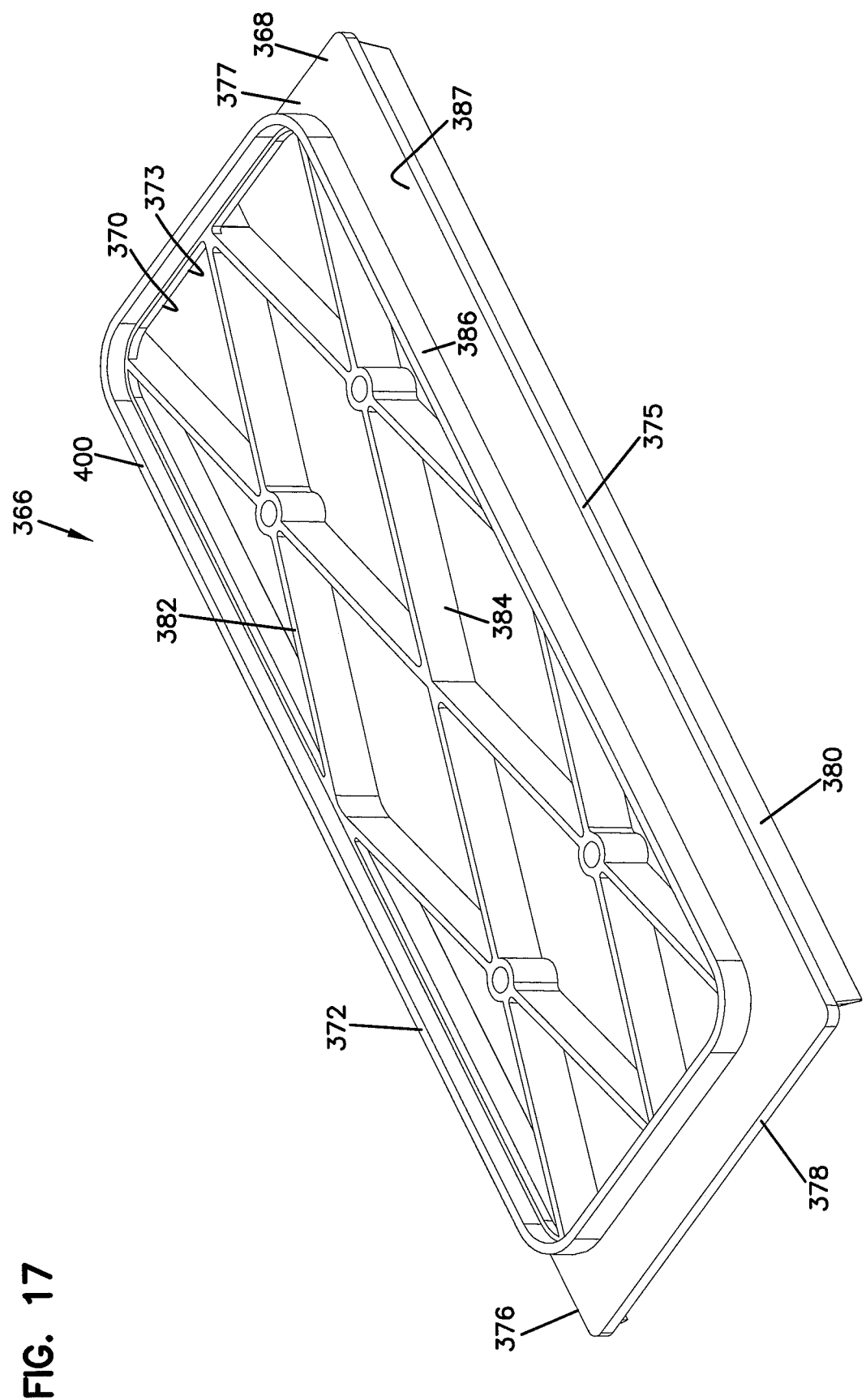
FIG. 17 is a perspective view of a frame that is part of the air filter cartridge of FIGS. 12-15.
Figure 18:
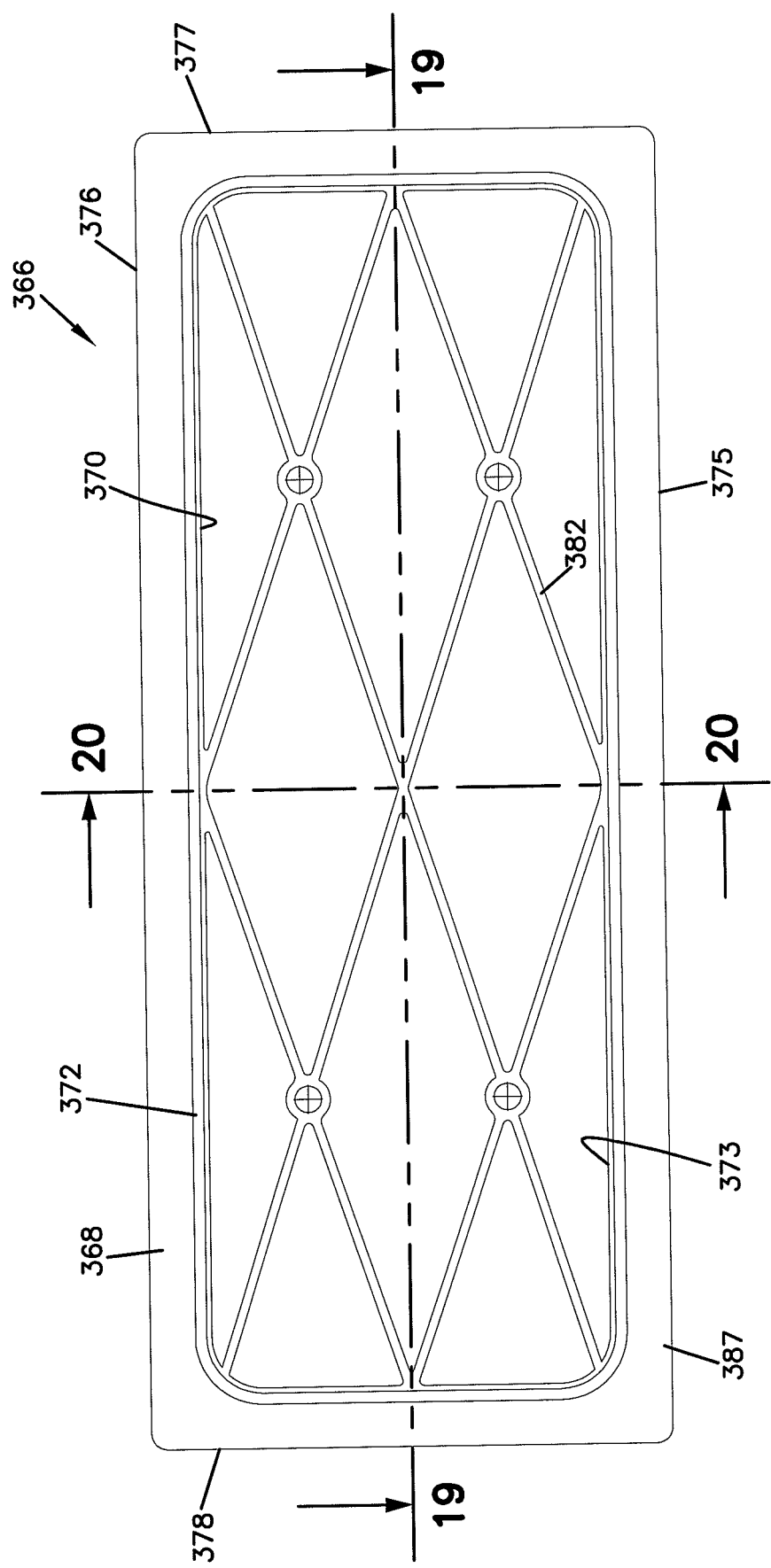
FIG. 18 is a top plan view of the frame of FIG. 17.
Figure 19:
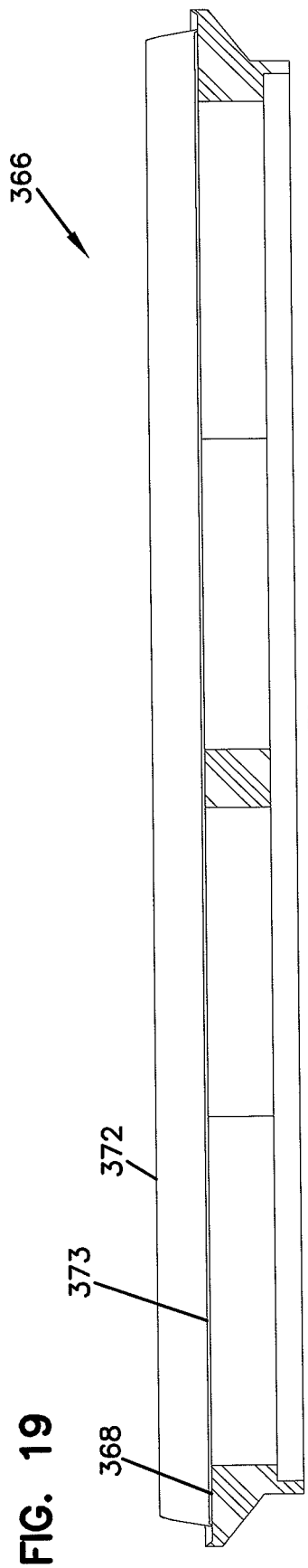
FIG. 19 is a cross-sectional view of the frame of FIG. 18, the cross-section being taken along the line 19-19 of FIG. 18.
Figure 20:
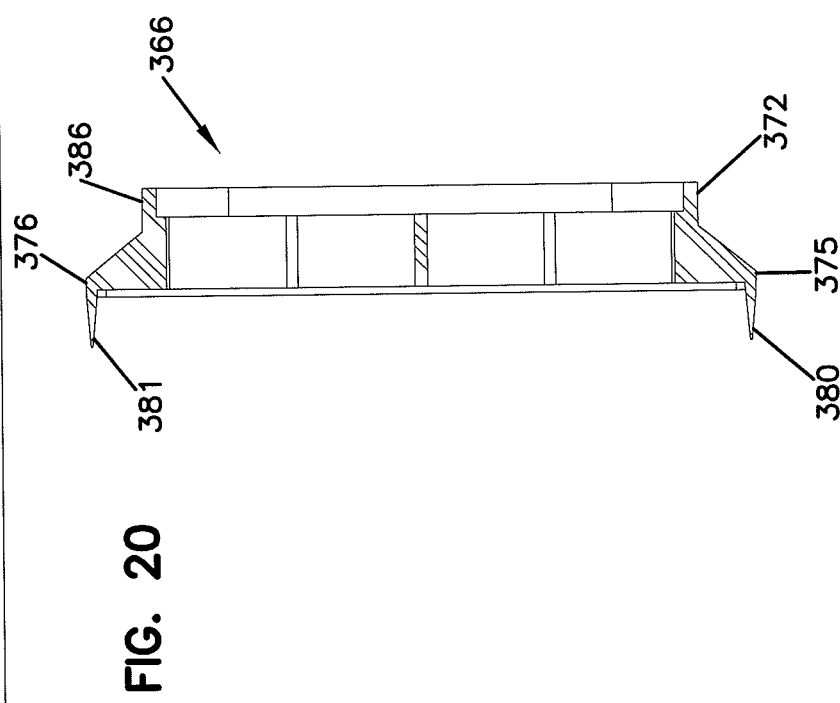
FIG. 20 is a cross-sectional view of the frame of FIG. 18, the cross-section being taken along the line 20-20 of FIG. 18.

The base member 368, in this embodiment, has first and second opposite edges 375, 376. Extending between the first and second opposite edges, 375, 376 are third and fourth opposite edges 377, 378. As can be seen in FIGS. 17 and 18, in this example embodiment, the edges 375-378 form a generally rectangular structure. In the particular preferred embodiment depicted, the third and fourth edges 377, 378 are structure-free; that is, there are no other edges, flanges, or other structure depending therefrom.

In the embodiment depicted, the frame 366 further includes first and second opposite spaced blades 380, 381 extending from the base member 368 and in a different direction from the base member 368 as the seal support section 372. That is, in this embodiment, the first and second blades 380, 381 extend from the base member 368 in a direction toward the media pack 350, while the seal support section 372 extends from the base member 368 in a direction away from the media pack 350. In the embodiment shown, the first and second blades 380, 381 extend from the first and second edges 375, 376 of the base member 368. Preferably, and in the embodiment shown, the first and second blades 380, 381 are connected together only by an intervening portion of the base member 368. That is, there is no other structure that connects the first and second blades 380, 381. As such, in this embodiment, the first and second blades 380, 381, are generally parallel to each other and extend between the third and fourth edges 377, 378.

Turning now to FIG. 15, one of the purposes of the first and second blades 380, 381 can be appreciated. In this arrangement, the first and second blades, 380, 381 are embedded within the media pack 350 through the second flow face 352, which corresponds to the outlet flow face, 337. Embedding the first and second blades 380, 381, within the media pack 350 can be helpful when manufacturing the filter cartridge 322. The first and second blades 380, 381 are embedded sufficiently far to help secure the frame 366 in place on the media pack 350 before the other structure (such as the first and second side panels 362, 363 and the seal member 328) are added. It is convenient to have the first and second blades 380, 381 be sufficiently long to hold the frame 366 in place on the media pack 350. For example, the first and second blades 380, 381 each has a length extending from the base 368 of at least 5 mm. The length of the first and second blades 380, 381 does not have to be so long that it may interfere with the filtering function. For example, the first and second blades 380, 381 will have a length extending from the base 368 no greater than 30 mm.

When the media pack 350 comprises a stack of strips 354 of single facer filter media material 355, such as in the example depicted, then the first and second blades 380, 381 can be used to extend from the base member 368 and between adjacent strips 354 (FIG. 11) of the single facer filter media material 355. As can be seen in FIG. 15, the first blade 380 will have at least one strip 354 of single facer filter media material 355 between it and the fourth side 361 of the media pack 350. It may also have more than one strip 354 between it and the fourth side 361. Similarly, the second blade 381 will have at least one strip 354 between it and the third side 360, although it may have more than one strip 354 between it and the third side 360.

Preferably, the first and second blades 380, 381 will have a relatively thin cross-sectional thickness so that it may be easily accommodated between adjacent strips 354 of the single facer media material 355. For example, the first and second blades 380, 381 each has a cross-sectional thickness of no greater than 4 mm.

In this embodiment, the frame 366 further includes a media face cross-piece arrangement 382 in engagement with the base member 368. In the embodiment shown, the cross-piece arrangement 382 is depicted as a grid 384 forming a pattern of diamond-shapes. The grid 384 helps to hold the media pack 350 in place, and can help to prevent telescoping of the media pack 350.

In this embodiment, the filter cartridge 322 includes the seal member 328 oriented against the seal support section 372. This can be seen in, for example, FIG. 15. While a variety of embodiments can be used, in this embodiment, the seal member 328 includes a portion 386a (FIG. 16) positioned against an exterior surface 386 (FIG. 20) of the seal support section 372; an exterior surface 387 of the base member 368; a portion 388 (FIG. 14) of the first side panel 362; and a portion 389 (FIG. 14) of the second side panel 363. The seal member 328 correspondingly includes portions 387a, 388a, and 389a which are against the surfaces 387, 388, and 389.

When formed like this, the seal member 328 can be over-molded to the frame 366 and the media pack 350. That is, in one example of manufacturing the media pack 350, the frame 366 will be secured to the media pack 350 by embedding the first and second blades 380, 381 within the media pack 350. Next, the first and second side panels 362, 363 are secured to the first and second sides 358, 359. Finally, the seal member 328 is over-molded so that it goes over the seal support section 372, and against the exterior surface 386, the exterior surface 387 of the base member 368, the portion 388 of the first side panel 362 and the portion 389 of the second side panel 363. Note that the portions 388a, 389a only extend a small fraction of the length of the first and second sides 358, 359. In this case, they do not extend much further than the length of the first and second blades 380, 381. For example, they may extend a length of at least 5 mm and no greater than 30 mm.

As can also be seen in the view of FIG. 15, the seal member 328 includes a portion 390a which extends over a portion 390 of third side 360 and a portion 391a which extends over a portion 391 of the fourth side 361. The portions 390a, 391a only extend a relatively small length along the third and fourth sides 360, 361, for example, less than 10% of the length. As can be seen in FIG. 15, the portions 390a, 391a can have a length similar to the length of the first and second blades 380, 381. These portions 390a, 391a, in this embodiment, directly attach to the third and fourth sides 360, 361 of the media pack 350. This is at least because the frame 366 is open or structure-free along the third and fourth edges 377, 378.

Figure 14:
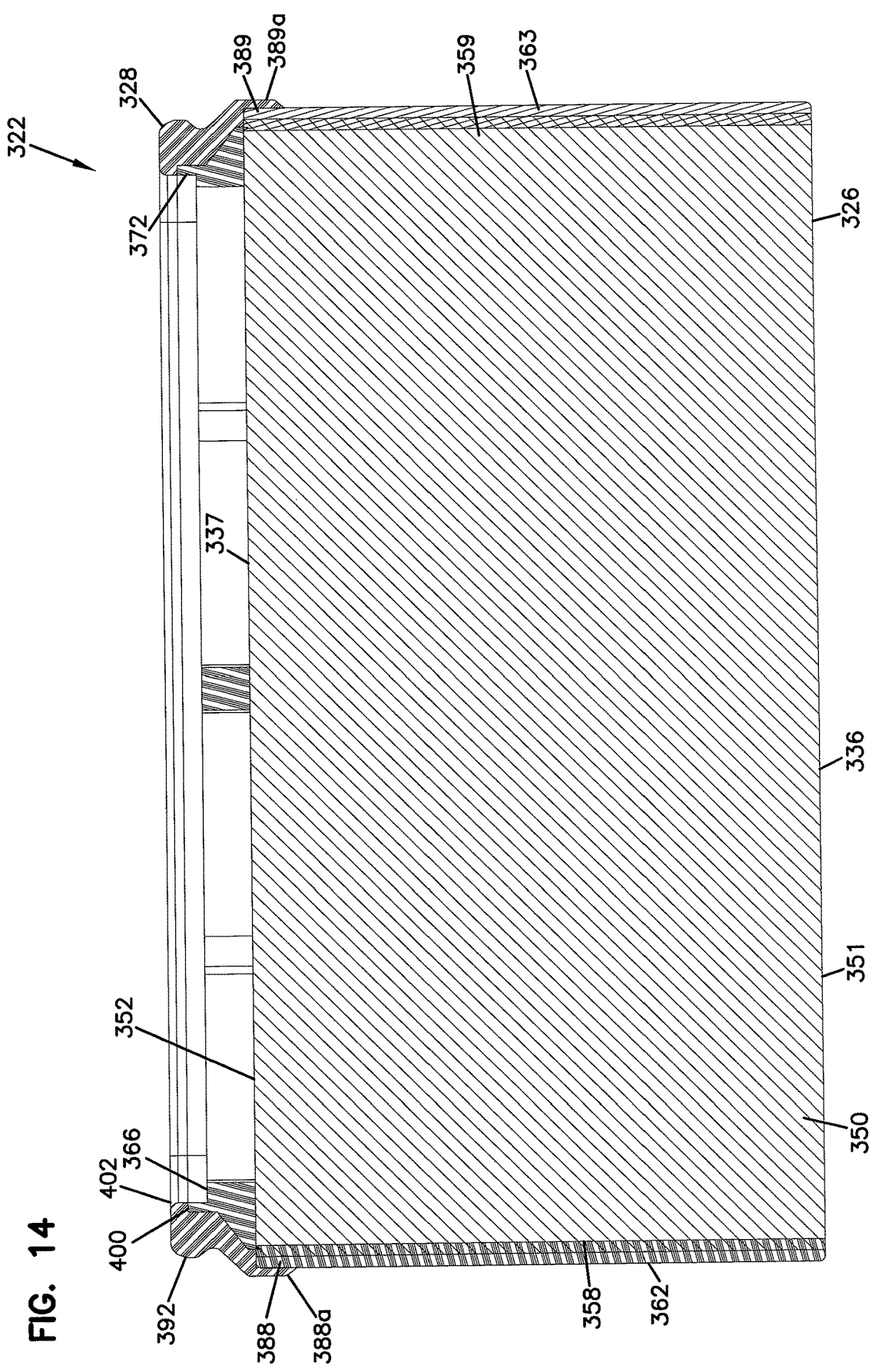
FIG. 14 is a cross-sectional view of the filter cartridge of FIGS. 12 and 13, the cross-section being taken along the line 14-14 of FIG. 13.

As can be seen in FIGS. 14-16, in this embodiment, the seal member 328 has an outer peripheral surface 392 configured to form a radially outwardly directed seal 394 (FIGS. 31 and 32) with the air cleaner housing 302. The seal 394 is preferably an outwardly directed radial seal 464. The seal member 328 forms the seal 464 by compression of the seal member 328 between and against the exterior surface 386 of the seal support section 372 and an internal sealing surface 462 within the air cleaner housing 302.

In reference now to FIGS. 16 and 16a, an outer profile of the seal member 328 is shown in detail. A sealing portion 396 is along the outer peripheral surface 392. In the embodiment shown, it is generally radially inwardly of the frame contact section forming portions 388, 389. Between the sealing portion 396 and the frame-contacting portions 388, 389, there is an inward step 398.

The seal support section 372 defines an end tip 400. In this embodiment, the seal member 328 includes a portion 402 that is positioned over the end tip 400.

C. Cartridge and Cassette Assembly, FIGS. 21-28

In reference now to FIGS. 21-28, the cartridge/cassette assembly 320 is depicted. As mentioned above, the cassette 324 includes a cassette surrounding wall 330 defining cassette open interior volume 332 therewithin. As also mentioned above, the wall 330 includes first and second opposite open ends 338, 340 in communication with the interior volume 332.

In this embodiment, the cassette wall 330 has first and second opposite side walls 404, 405, each defining an interior surface 406, 407 in communication with the interior volume 332. The first and second side walls 404, 405 also define an opposite exterior surface 408, 409.

The cassette surrounding wall 330, in the embodiment shown, has a rectangular cross-section and includes a third side wall 410 in extension between the first side wall 404 and the second side wall 405.

In the embodiment depicted, the cassette surrounding wall 330 further includes a fourth side wall 411 extending between the first side wall 404 and the second side wall 405. The fourth side wall 411, in the embodiment shown, is generally parallel to the third side wall 410.

Figure 21:
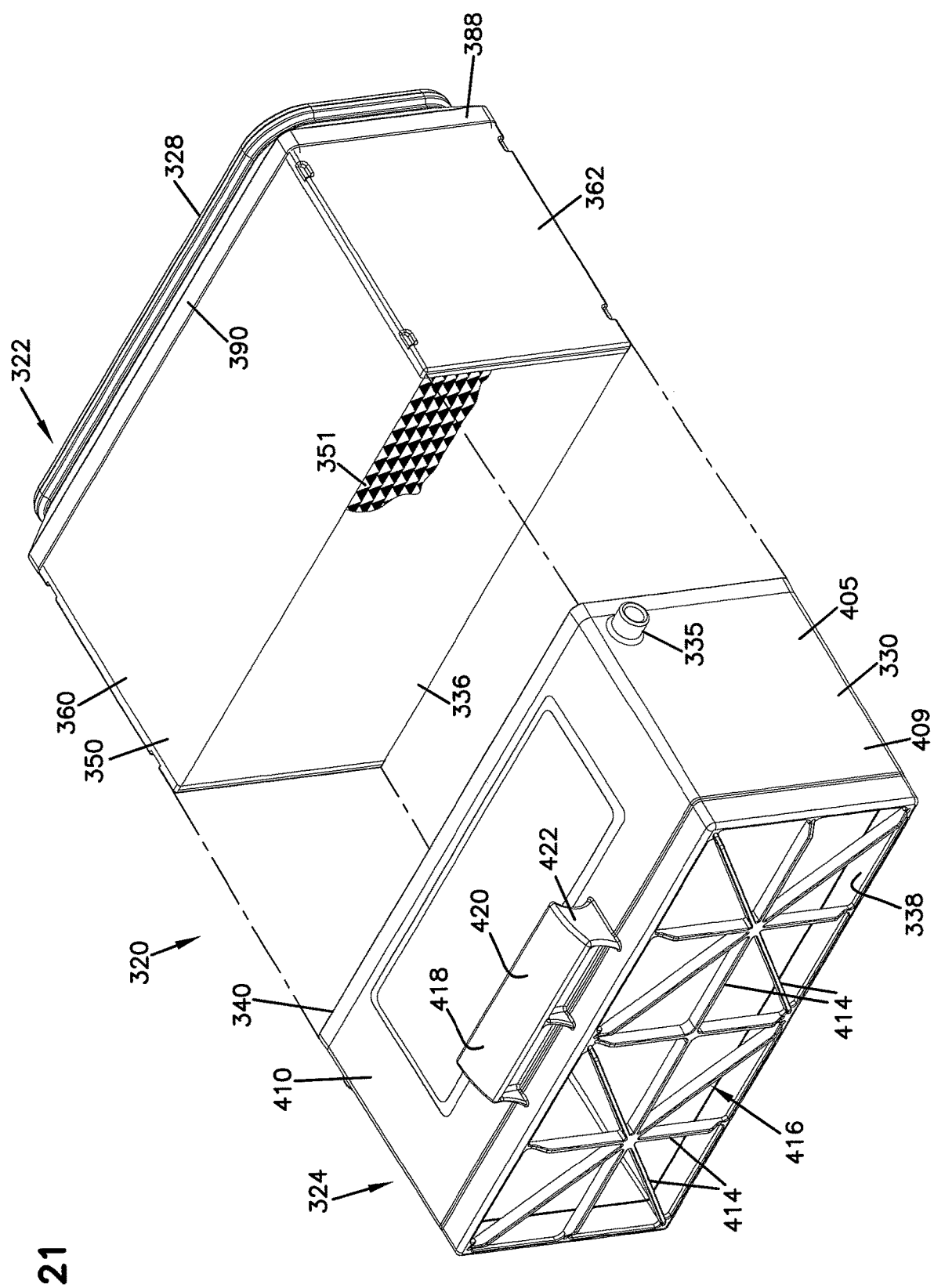
FIG. 21 is a perspective view of the filter cartridge and cassette assembly which is utilized in the air cleaner assembly of FIGS. 8-10.
Figure 22:
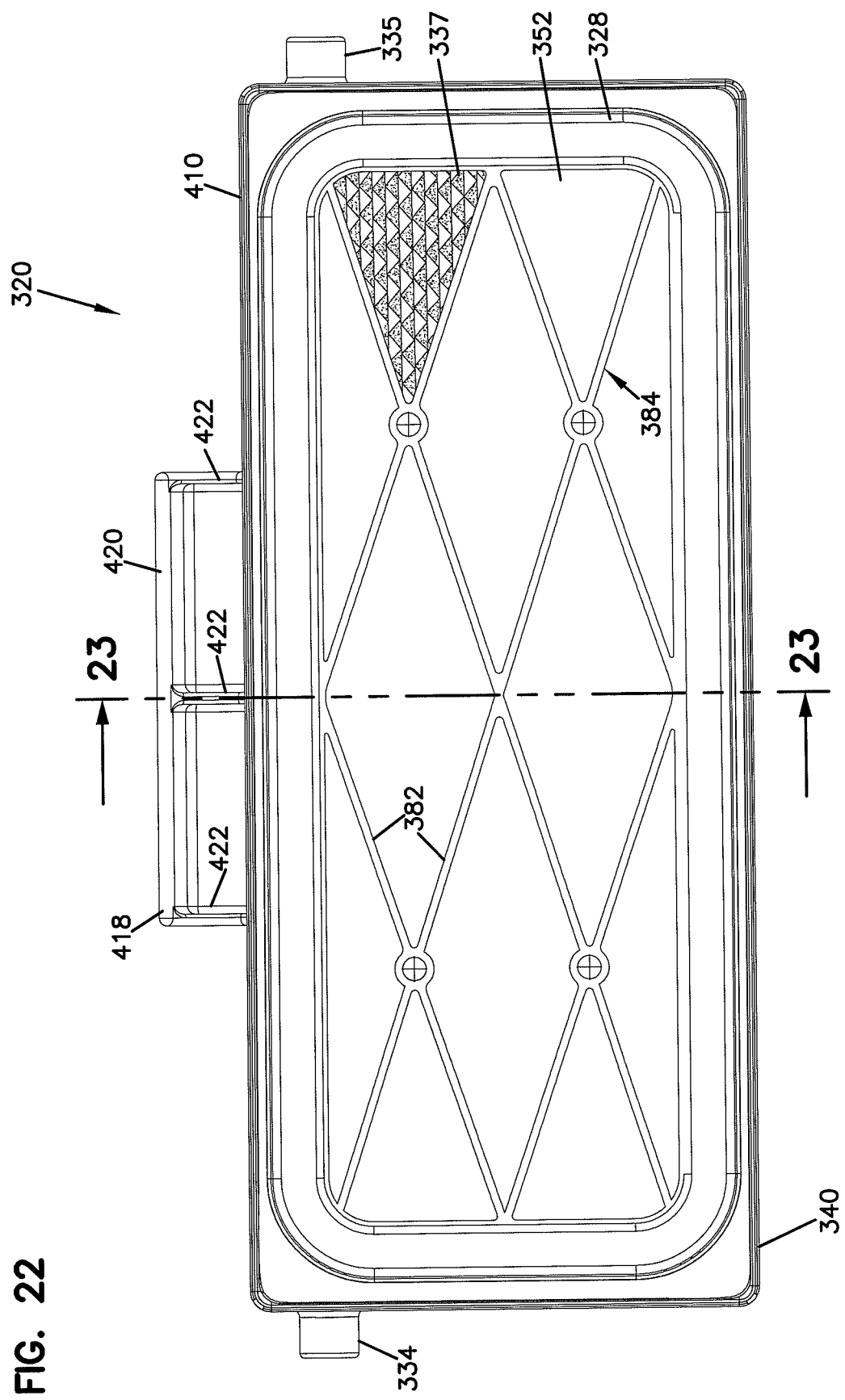
FIG. 22 is an end elevational view of the filter cartridge and cassette assembly of FIG. 21.
Figure 23:
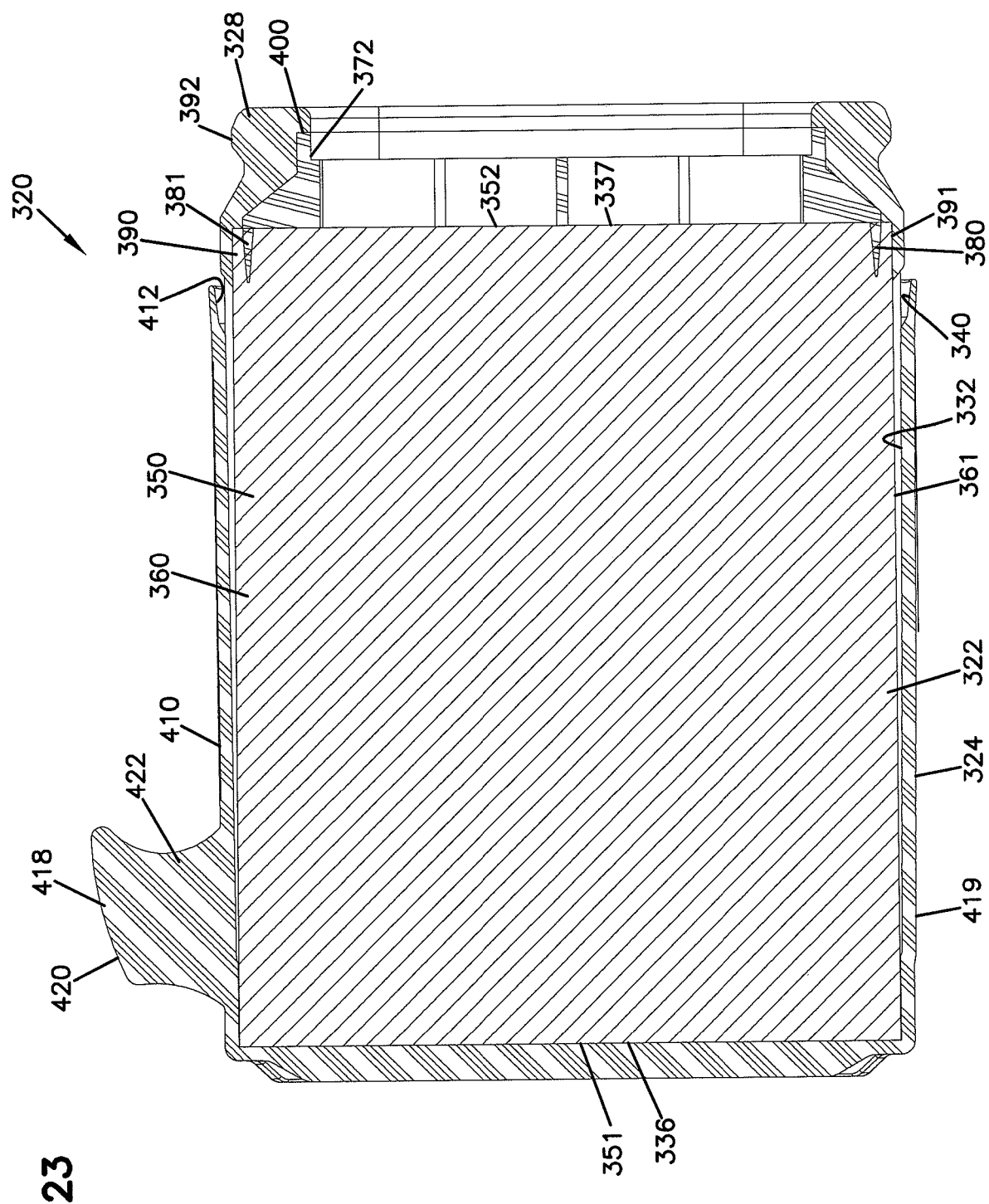
FIG. 23 is a cross-sectional view of the filter cartridge and cassette assembly of FIG. 22, the cross-section being taken along the line 23-23 of FIG. 22.
Figure 24:
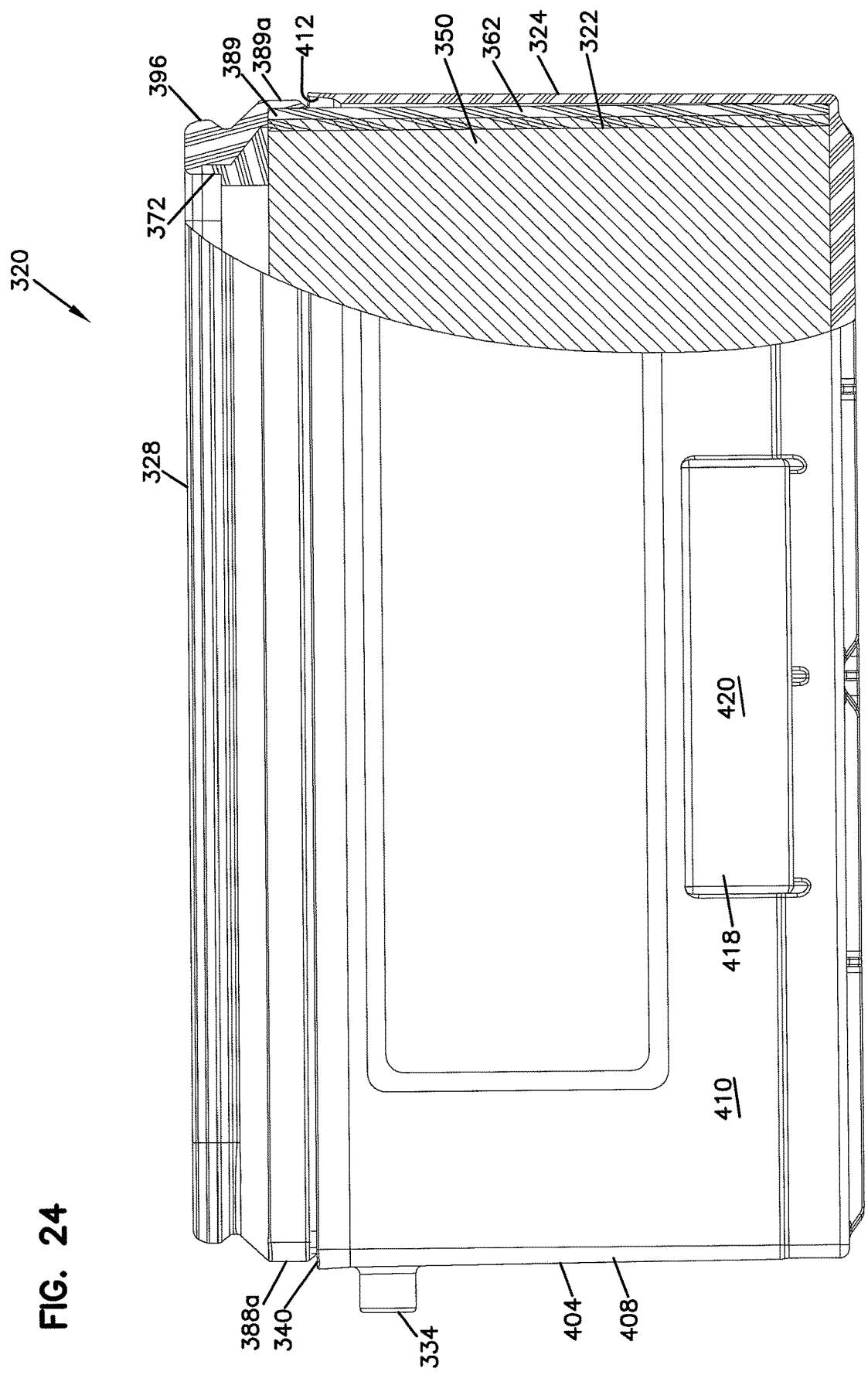
FIG. 24 is a side elevational view of the filter cartridge and cassette assembly of FIG. 22, with a portion of the cassette broken away to show an internal cross-section.
Figure 25:
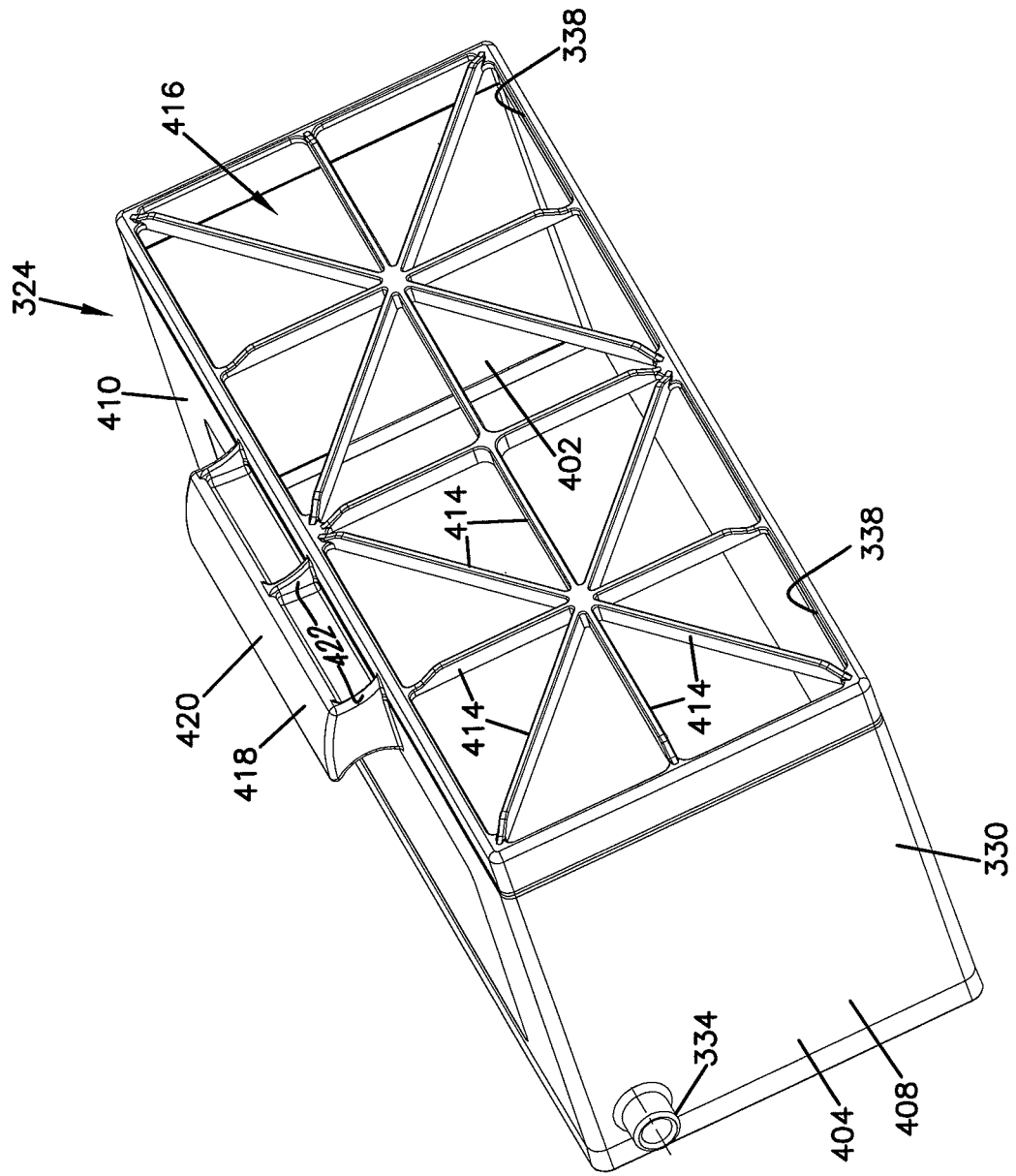
FIG. 25 is a perspective view of the cassette utilized in the filter cartridge and cassette assembly of FIGS. 21-24.
Figure 26:
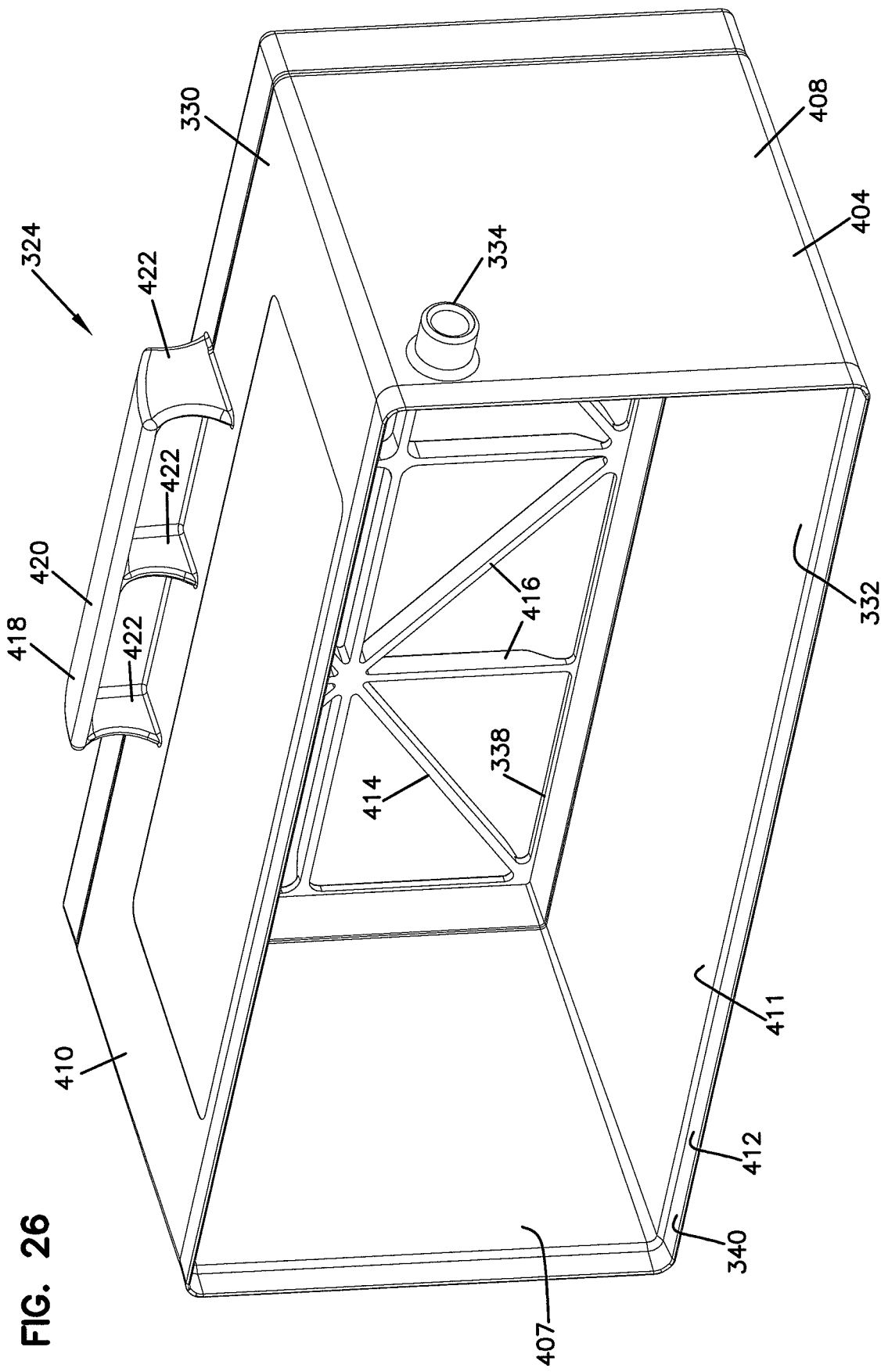
FIG. 26 is another perspective view of the cassette of FIG. 25.

As can be appreciated by reviewing FIGS. 21-23, the second open end 340 is sized to be an access opening 412 to permit the filter cartridge 322 to be operably inserted and removed from the interior volume 332 of the cassette 324.

At the first open end 338, there is at least one cross piece 414 extending over the first open end 338 and in engagement with the cassette surrounding wall 330. The cross piece 414 in the embodiment shown, includes a grid arrangement 416. The grid arrangement 416 helps to hold the filter cartridge 322 in place within the cassette 324, while still allowing for the passage of air flow through the first open end 338 and to the inlet flow face 336 of the cartridge 322. In FIG. 23, it can be seen how when the filter cartridge 322 is operably oriented in the interior volume 332 of the cassette 324, the inlet flow face 336 is opposing, and may be against, the at least one cross piece 414 of the first open end 338 of the cassette 324. It can also be appreciated that the filter cartridge 322 is removably oriented within the interior volume 332 of the cassette 324, so that the seal member 328 is outside of the cassette 324 and adjacent to the second open end 340 of the cassette 324. In the embodiment shown, the frame 366 is also outside of the cassette 324 when the cartridge 322 is operably oriented within the volume 332 of the cassette 324. As such, in the example illustrated, only at least a portion of the filter cartridge 322 is removably oriented in the interior volume 332 of the cassette 324.

As mentioned above in section A, in this example embodiment, the cassette 324 includes a plurality of lugs. In the embodiment depicted, there are first and second lugs 334, 335. In the embodiment shown, the first lug 334 extends from the exterior surface 408 of the first side wall 404. In this example, the second lug 335 extends from the exterior surface 409 of the second side wall 405. In this embodiment, the first and second lugs 334, 335 are embodied as projecting cylinders, with circular cross-sections. The first and second lugs 334, 335 project from the first and second side walls 404, 405 a distance of at least 5 mm, for example 10-40 mm, and no greater than 100 mm. In some implementations, there are no more than two lugs used (the first lug 334 and second lug 335).

As can be seen in FIGS. 21, 22, and 25-27, in this embodiment, the first and second lug 334, 335 is each located adjacent to the second open end 340 of the cassette 324. Further, the first and second lugs 334, 335 in this embodiment, is each located adjacent to the third side wall 410. By the term "adjacent" in this context, it is meant that the first and second lugs 334, 335 are located no greater than 20% of the overall length from the edge of the second open end 340 and no greater than 20% of the overall length of the first and second side walls 404, 405 from the third side wall 410.

In the embodiment depicted, the cassette 324 further includes a handle 418 sized to accommodate at least a portion of a human hand. The handle 418 is provided so that the user may have structure to grasp in order to manipulate the cassette 324 alone, and also the cartridge/cassette assembly 320.

In the embodiment shown, the handle 418 is projecting from the surrounding wall 330. The handle 418, in this embodiment, includes a flange 420 connected to the surrounding wall 330 by gussets 422. By spacing the flange 420 from the cassette surrounding wall 330, space is provided to accommodate portions of a human hand, such as 4 fingers. The flange 422 can be spaced at least 5 mm, for example 10-75 mm from the surrounding wall 330.

While a variety of embodiments are possible, in the particular one illustrated, the handle 418 projects from the third side wall 410. Further, in the one depicted, the handle 418 is adjacent to the first open end 338 of the cassette 324. By the term "adjacent" it is meant that the handle 420 is no greater than 20% of the overall length of the third side wall 410 away from the first open end 338.

D. Example Safety Element, FIG. 29

Figure 29:
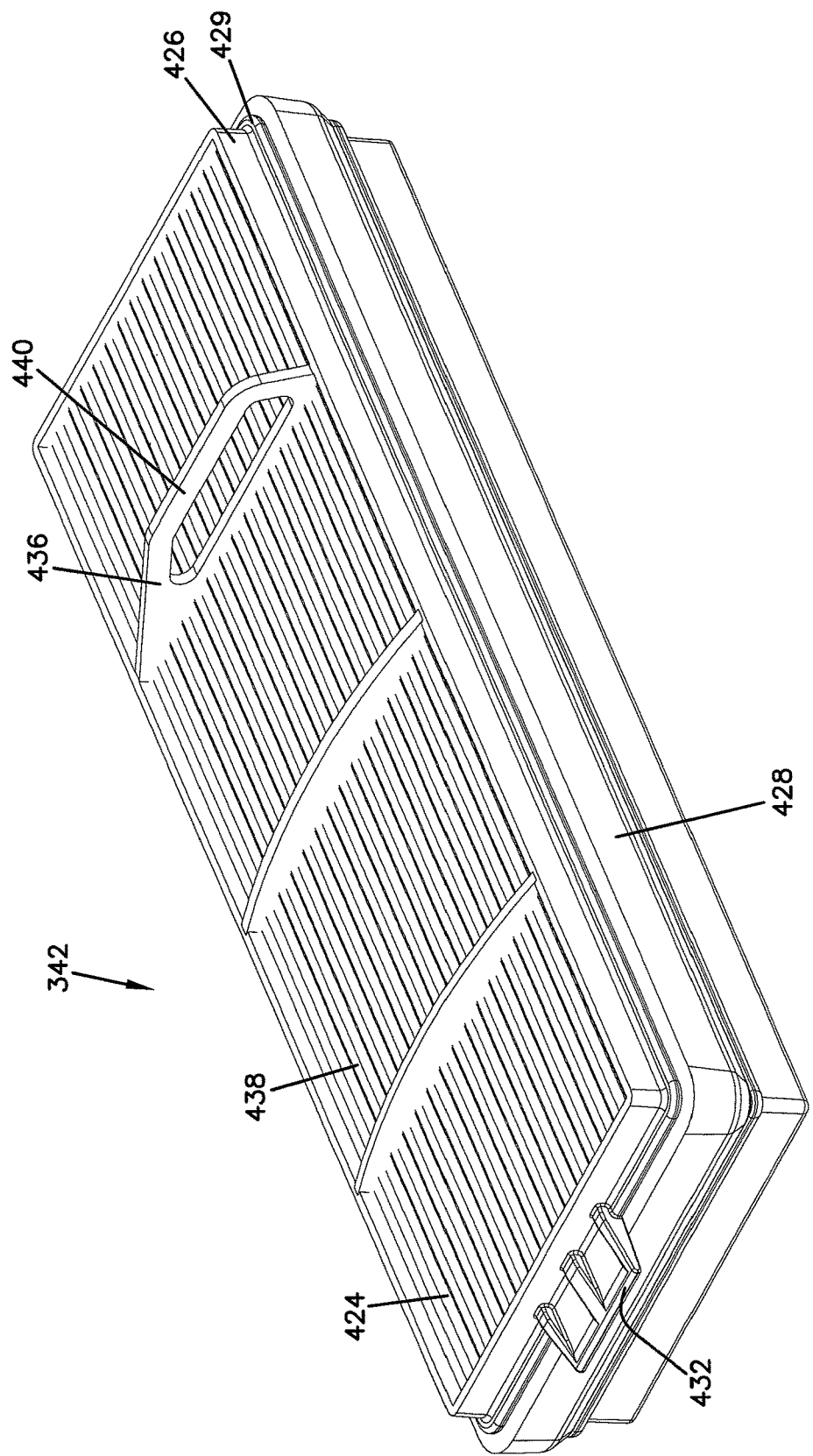
FIG. 29 is a perspective view of a safety filter element utilized in the air cleaner of FIGS. 8-10.
Figure 30:
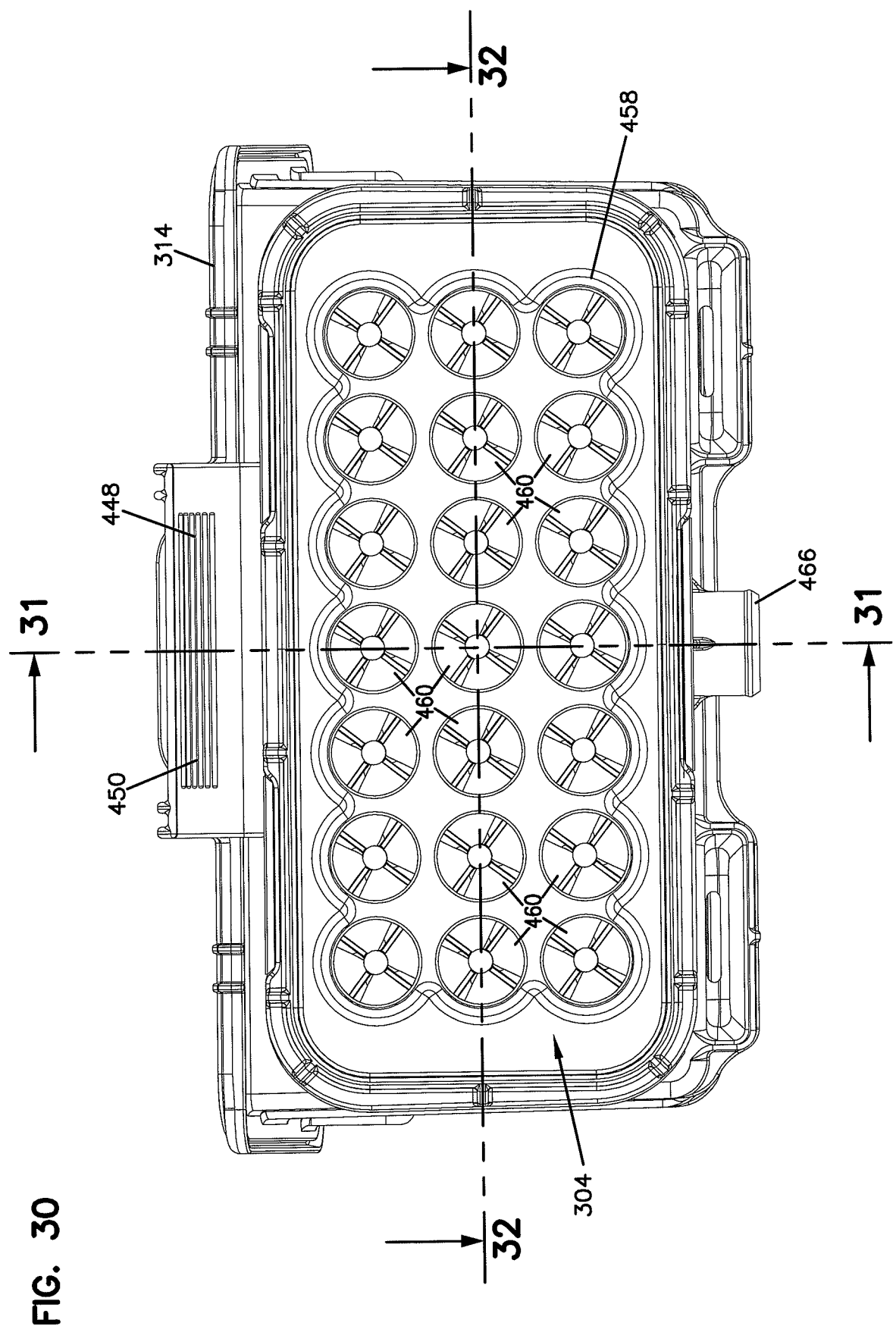
FIG. 30 is an end elevational view of the air cleaner of FIG. 8.

As mentioned in section A, above, the air cleaner 300 may include safety element 342. One example embodiment of safety element 342 is illustrated in FIG. 29. In this embodiment, the safety element 342 includes a media pack of pleated filter media 424. The media pack 424 is circumscribed by a safety frame 426. In this embodiment, the frame 426, as well as the overall safety element 342 is rectangular.

The safety element 342 includes a seal member 428 around an outer perimeter 429 of the frame 426. The seal member 428 forms a seal (FIGS. 31 and 32) with the housing-wall 308 of the housing 302. In this example, the seal 430 is a radial seal 431.

Figure 31:
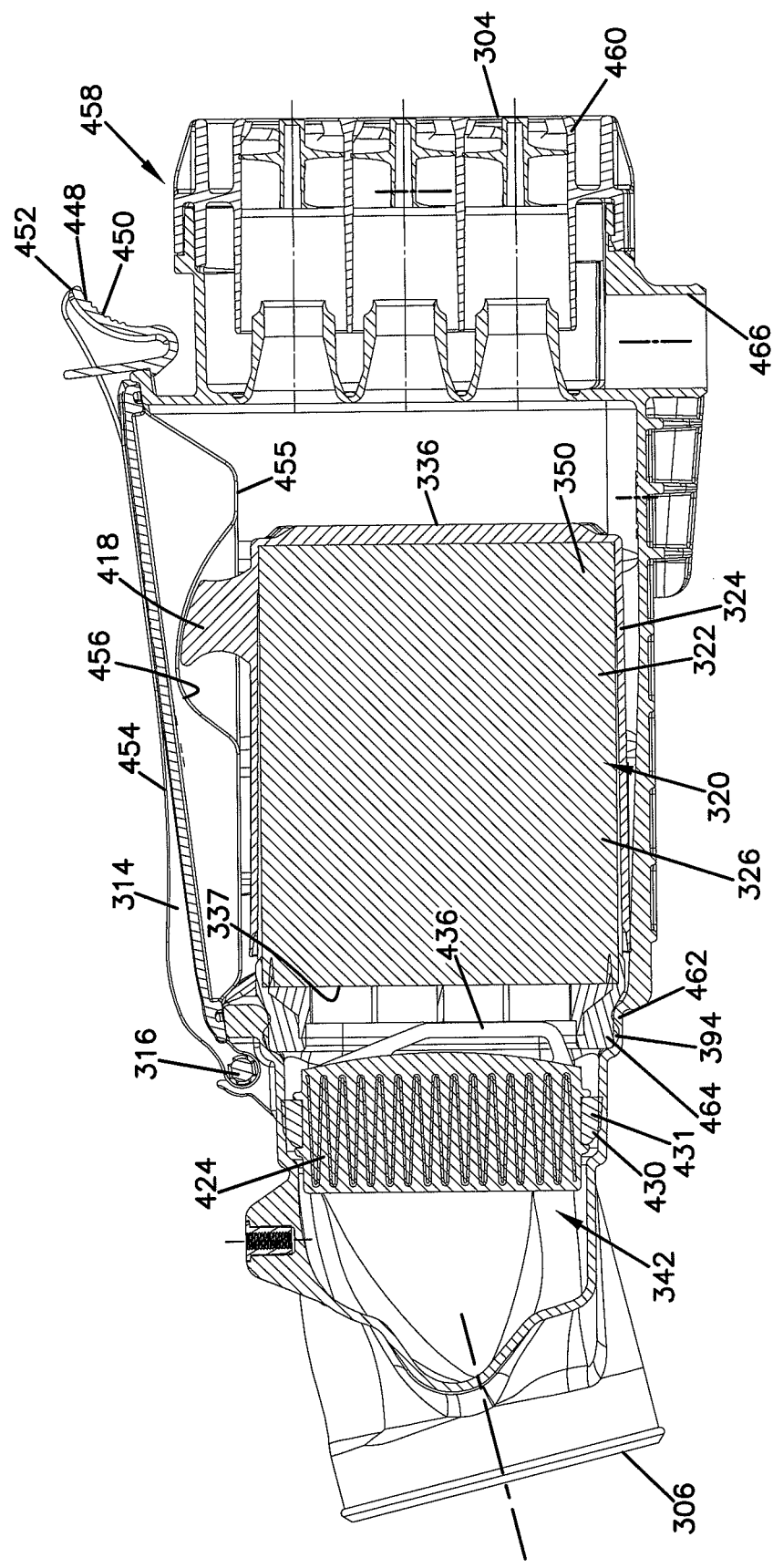
FIG. 31 is a cross-sectional view of the air cleaner of FIG. 30, the cross-section being taken along the line 31-31 of FIG. 30.
Figure 32:
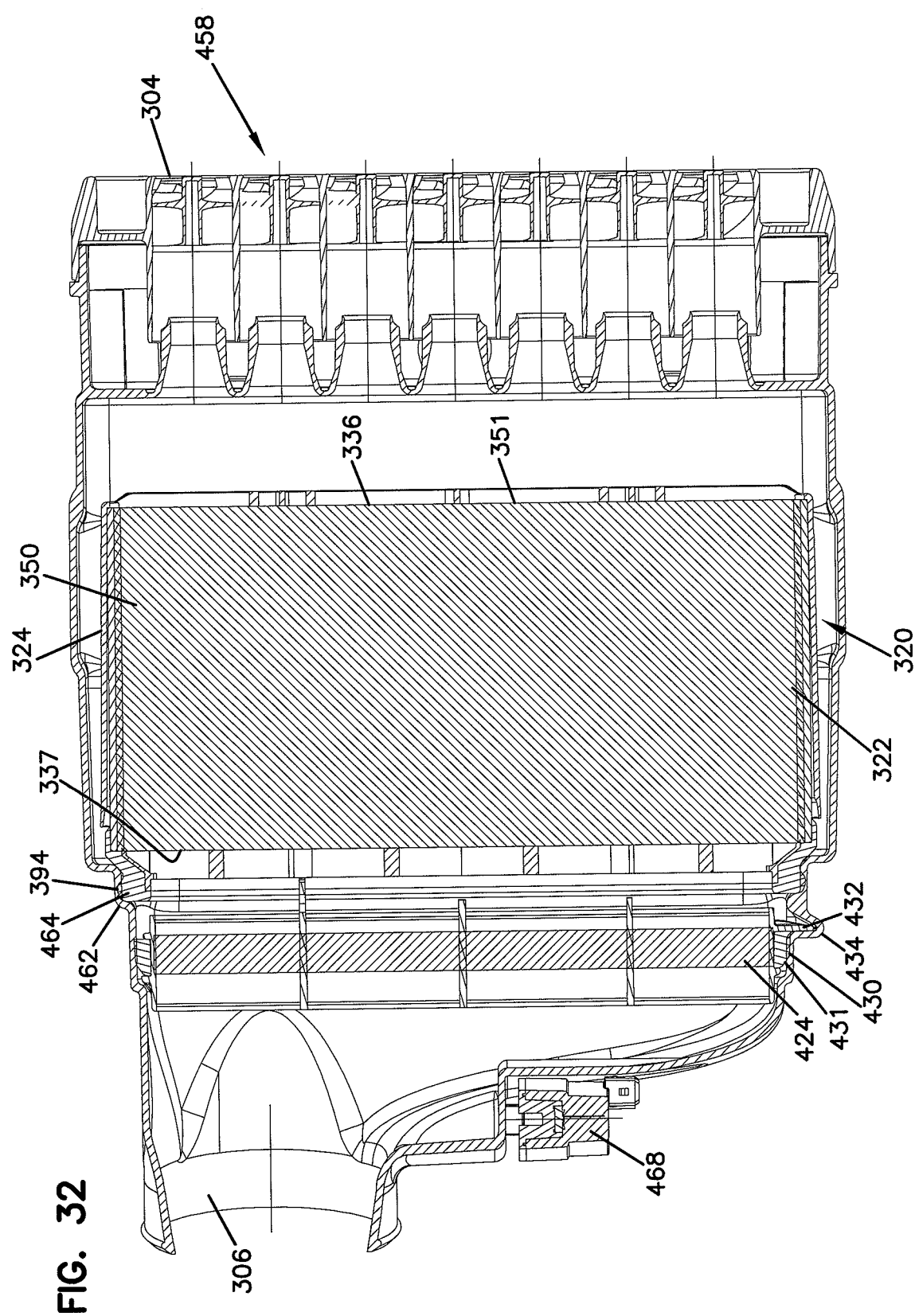
FIG. 32 is a cross-sectional view of the air cleaner of FIG. 30, the cross-section being taken along the line 32-32 of FIG. 30.
Figure 33:
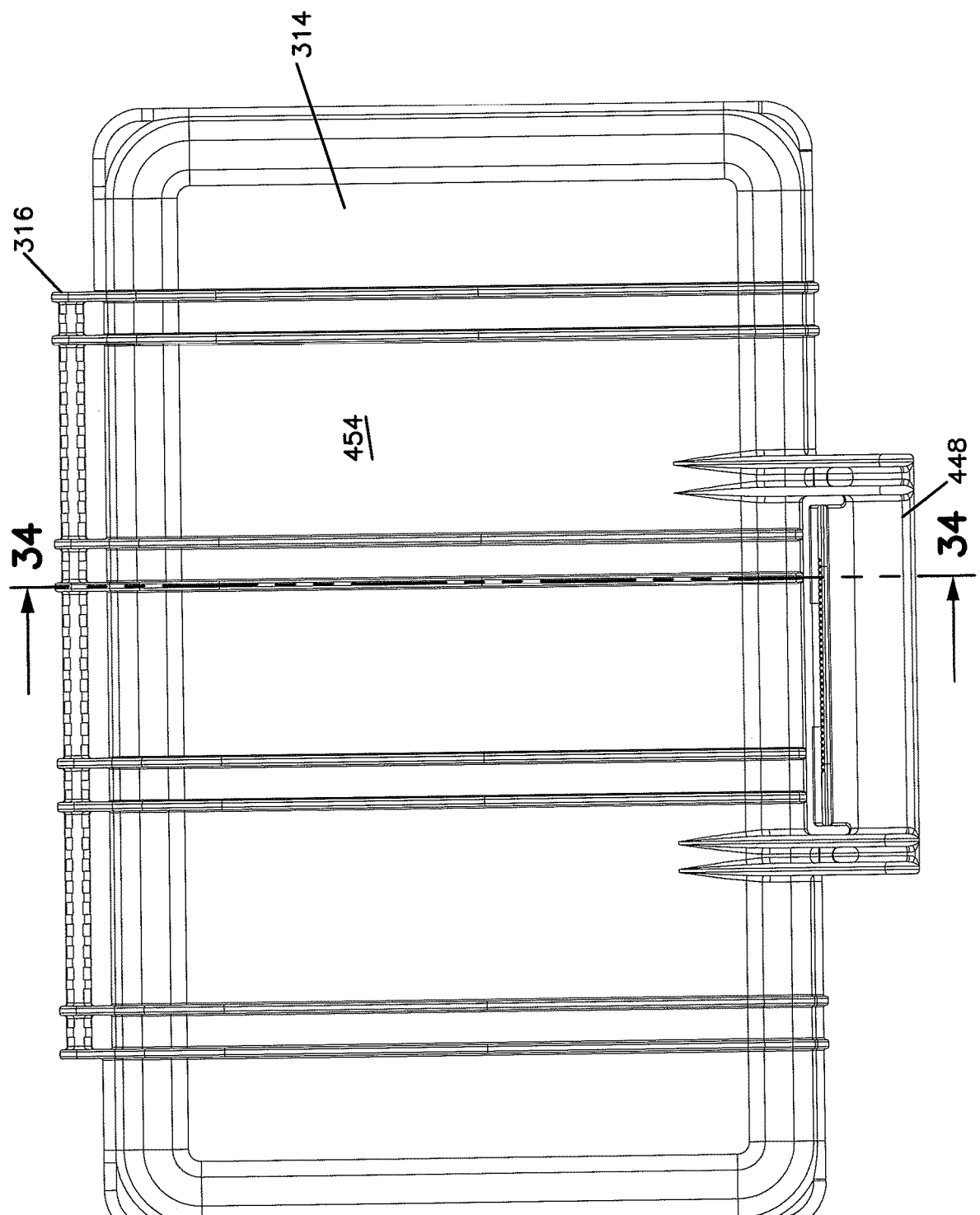
FIG. 33 is a top plan view of the access cover for the air cleaner of FIGS. 8-12.

The safety element 342 is removably sealed between the filter cartridge 322 and the outlet arrangement 306, as can be seen in FIGS. 31 and 32.

In this embodiment, the safety element 342 is constructed and arranged to be pivotably mounted within the air cleaner housing 302. In the example shown, the safety element 342 includes a pivot member 432 which is received within a pivot catch 434 (FIG. 32) of the housing 302.

In use, the safety element 342 can be mounted for operable use within the air cleaner 300 by orienting the pivot member 432 within the pivot catch 434 in the housing wall 308. The element 342 is then rotated or pivoted about the pivot member 432 in a direction toward the outlet arrangement 306 to slide the seal member 428 into sealing engagement to form radial seal 431 with the housing-wall 308.

In the example illustrated, this embodiment of the safety element 342 also includes a projecting safety element handle 436. The safety element handle 436 is preferably part of the safety frame 426 and projects from the inlet flow face 438 of the pleated media 424. The handle 436 includes a gripper 440 that extends projecting away from the inlet flow face 438, to provide an open volume between the gripper 440 and the media 424. As such, the gripper 440 can be grasped with a human hand, and the volume between the gripper 440 and the inlet flow face 438 will accommodate one or more fingers of a human hand. This will allow the safety element 342 to be handled and manipulated. For example, the handle 436 can be grasped when removing the safety element 342 from the air cleaner housing 302.

E. Example Air Cleaner and Components, FIGS. 8-10 and 30-34

Section A, above, provides an overview of the air cleaner 300 and example embodiments of various usable components. This section provides further detail on the air cleaner 300.

As mentioned above, the housing wall 308 includes grooves 318, 319. As can be seen in FIG. 9, the grooves 318, 319 each have a straight, vertical wall 442, a bottom bight section 444, and a generally sloped wall 446 extending from the bight section 444 and to the access opening 312. The grooves 318, 319 receive the first and second lugs 334, 335 when installing the cartridge/cassette assembly 320. The lugs 334, 335 will rest in each respective bight 444, and the cartridge/cassette assembly 320 can be rocked about the pivot point created between the first and second lugs 334, 335 in the respective bights 444, in order to rock or pivot the cartridge/cassette assembly 320 into sealing engagement with the housing 302. The person installing the cartridge/cassette assembly 320 can grasp the handle 418 of the cassette 324 in order to rock the cartridge/cassette assembly 320 into operably sealing engagement.

As can be seen in FIG. 9, each of the receiving grooves 318, 319 is located adjacent to the outlet arrangement 306.

Figure 34:
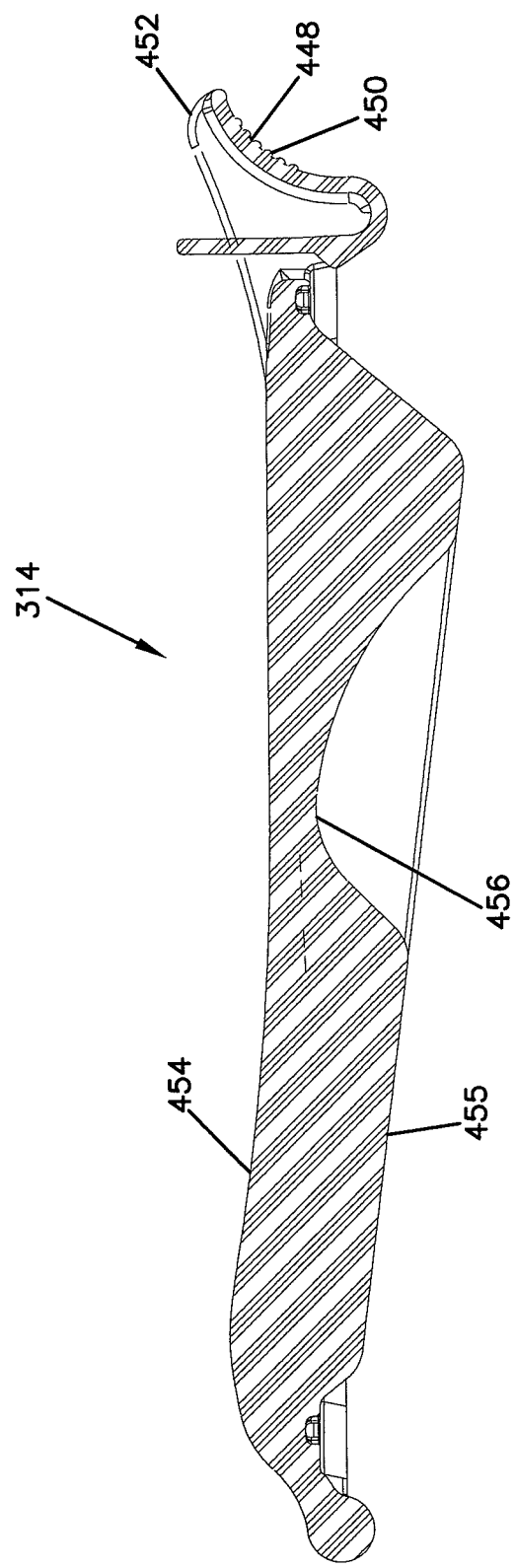
FIG. 34 is a cross-sectional view of the access cover of FIG. 33, the cross-section being taken along the line 34-34 of FIG. 33.

The cover 314, in the embodiment shown, includes a grip 448 projecting from a remaining portion of the cover 314 and extending over a portion of the inlet arrangement 304. The grip 448, as can be seen in FIG. 34, includes ribs 450 to help enhance the grip 448. In use, a persons fingers would contact the ribs 450 while a remaining portion of the hand is curled around an end portion 452 (FIG. 34) of the grip 448.

The cover 314 has an exterior surface 454 and an opposite interior surface 455. The interior surface 455 faces the housing open interior 310. In the particular embodiment shown, the interior surface 455 includes a receiver 456 that is sized to receive the cassette handle 418. When the cartridge/cassette assembly 320 is operably oriented within the housing 302, the receiver 456 contains at least a portion of the cassette handle 418 when the cover 314 is secured over the access opening 312. FIG. 31 shows the cassette handle 418 projecting within and being received by the receiver 456.

The inlet arrangement 304, in the embodiment shown, includes a pre-cleaner 458. In this embodiment, the pre-cleaner 458 includes a plurality of centrifugal separator tubes 460. The tubes 460 cause incoming air to swirl around and helps to separate and remove particulate matter from the incoming air before the air is drawn into a remaining portion of the air cleaner 300.

As can be seen in FIGS. 31 and 32, the seal 394 formed between the filter cartridge 322 and a sealing surface 462 of the housing-wall 308 is radial seal 464.

An indicator 468, such as a restriction indicator or a mass air flow sensor is provided downstream of the safety element 342 to insure air flow before the air exit through the outlet arrangement 306. This indicator 468 helps to provide information on the cartridge 322, such as the amount of restriction across it.

F. Example Methods

The air cleaner 300 can be used in a method for cleaning air. In such a method, air to be filtered enters the air cleaner housing 302 at the inlet arrangement 304. At that point, the air enters the pre-cleaner 458. The air passes into individual cyclonic or centrifugal separators shown as tubes 460 in the pre-cleaner 458. The centrifugal separator tubes 460 can be those as described in, for example, U.S. Pat. Nos. 4,242,115 and 4,746,340, each incorporated by reference herein. The pre-cleaner 458 separates dust or other particulate material, and the dust separated at this location is ejected from the pre-cleaner 458 through a dust ejector 466 (FIG. 31). The pre-cleaner 458 causes dust separation through centrifugal or cyclonic process, as opposed to a process of passing the air through filter media.

From the pre-cleaner 458, the air flows downstream and to the filter cartridge 322. From there, the air is cleaned or filtered by flowing through the inlet flow face 336, into the fluted media pack 350 and then out of the filter cartridge 322 by exiting through the outlet flow face 337. The air is not allowed to bypass the filter cartridge 322 because of the radial seal 464 that is formed between the filter cartridge 322 and the sealing surface 462 of the housing 302.

From the filter cartridge 322, the filtered air flows through the safety element 342 by passing through the inlet flow face 438 of the pleated media 424. The air then exits the safety element 342 and passes through the outlet arrangement 306. From there, the filtered air is used by downstream equipment, such as a diesel engine.

Periodically, it will be necessary to service the air cleaner 300. To service the air cleaner 300, the filter cartridge 322 will need to be removed and replaced with a new filter cartridge 322. To do so, first, a new filter cartridge 322 is provided. The filter cartridge 322 will include media pack 350 having opposite inlet and outlet flow faces 336, 337. The media pack 350, comprises a plurality of flutes extending in a direction between the inlet flow face 336 and the outlet flow face 337. The media pack 350 is closed to air entering the inlet face 356 and passing outwardly from the outlet flow face 337 without filtering flow through the media of the media pack 350. Seal member 328 is secured to the media pack 350.

Next, cassette 324 is provided. The cassette 324 includes cassette surrounding wall 330, first and second lugs 334, 335 projecting from an exterior portion 408, 409 of the cassette wall 330, and cassette handle 418 extending from the cassette wall 330.

Next, the filter cartridge 322 is oriented partially into the interior volume 332 of the cassette 324 so that the seal member 328 is outside of the cassette 324 to provide the filter cartridge/cassette assembly 320.

Next, the filter cartridge and cassette assembly 320 is oriented into the access opening 312 in the air cleaner housing 302. The access opening 312 is between the inlet arrangement 304 and the outlet arrangement 306. While orienting the filter cartridge and cassette assembly 320 into the access opening 312, the first and second lugs 334, 335 are oriented into respective receiving grooves 318, 319 in the housing 302 adjacent to the air cleaner outlet arrangement 306.

Next, the cassette handle 418 is grasped to move the filter cartridge and cassette assembly 320 so that the seal member 328 is urged against the sealing surface 462 in the housing 302 to form releasable seal 394. This can be done by rocking the assembly 320 about the lugs 334, 336 in the grooves 318, 319 while holding the handle 418 to move the assembly 320 in place to form radial seal 464.

IV. The Embodiment of FIGS. 37-46

A. Overview

Turning now to FIGS. 37-46, another embodiment of an air cleaner is shown generally at 550. The air cleaner 550 includes a housing 552, an inlet arrangement 554, and an outlet arrangement 556. The inlet arrangement 554 and outlet arrangement 556 are depicted in this embodiment as being at opposite ends of the housing 552.

Figure 38:
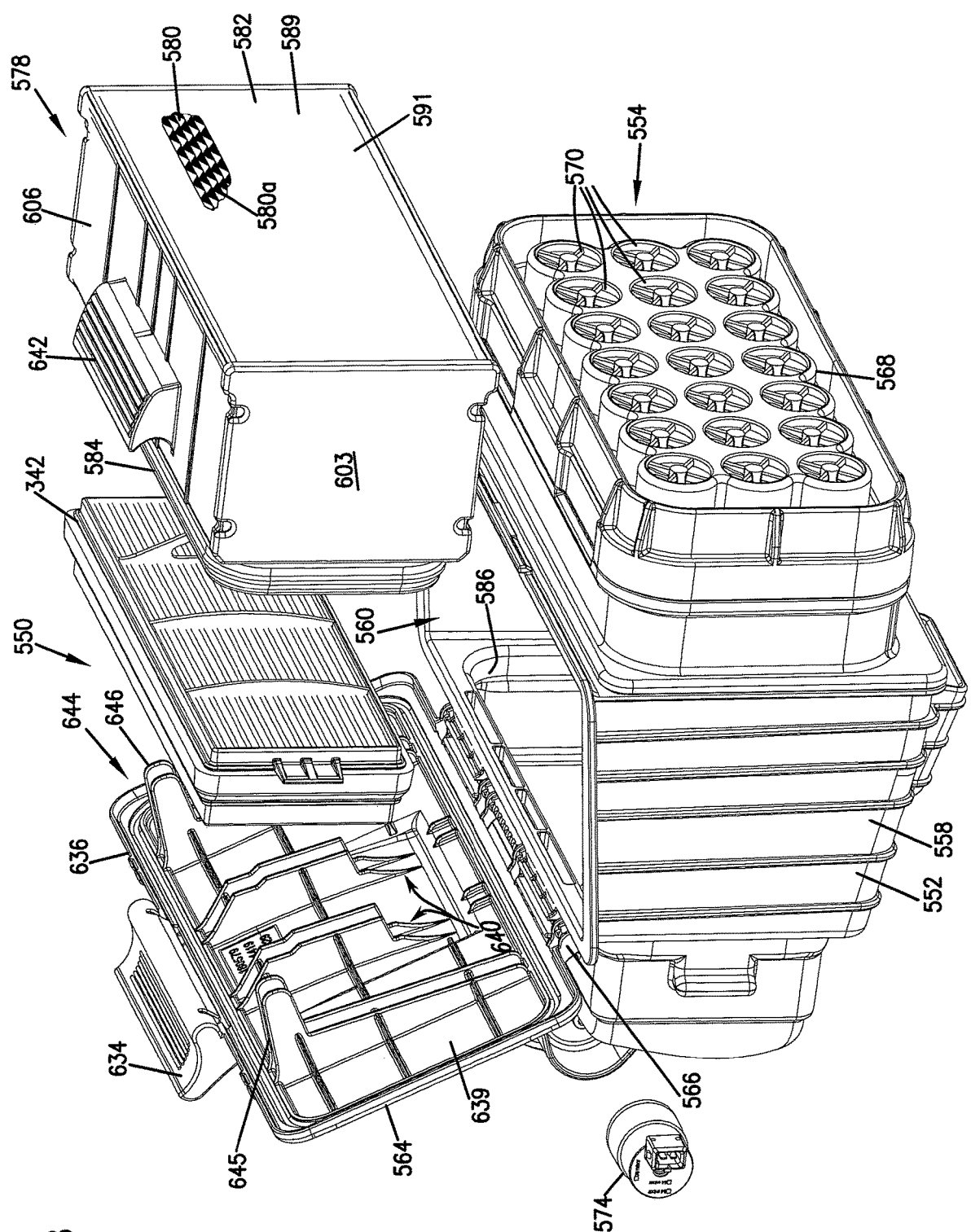
FIG. 38 is an exploded perspective view of the air cleaner of FIG. 37 showing the internal components including a filter cartridge and a safety element.
Figure 40:
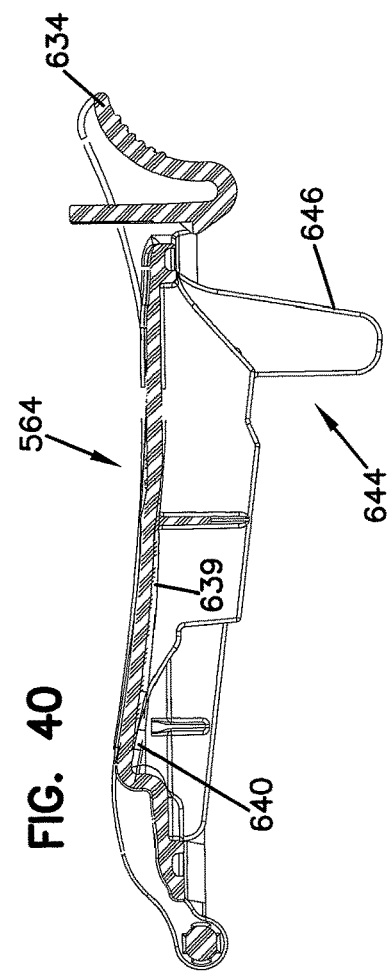
FIG. 40 is a cross-sectional view of the access cover of FIG. 39, the cross-section being taken along the line 40-40 of FIG. 39.
Figure 39:
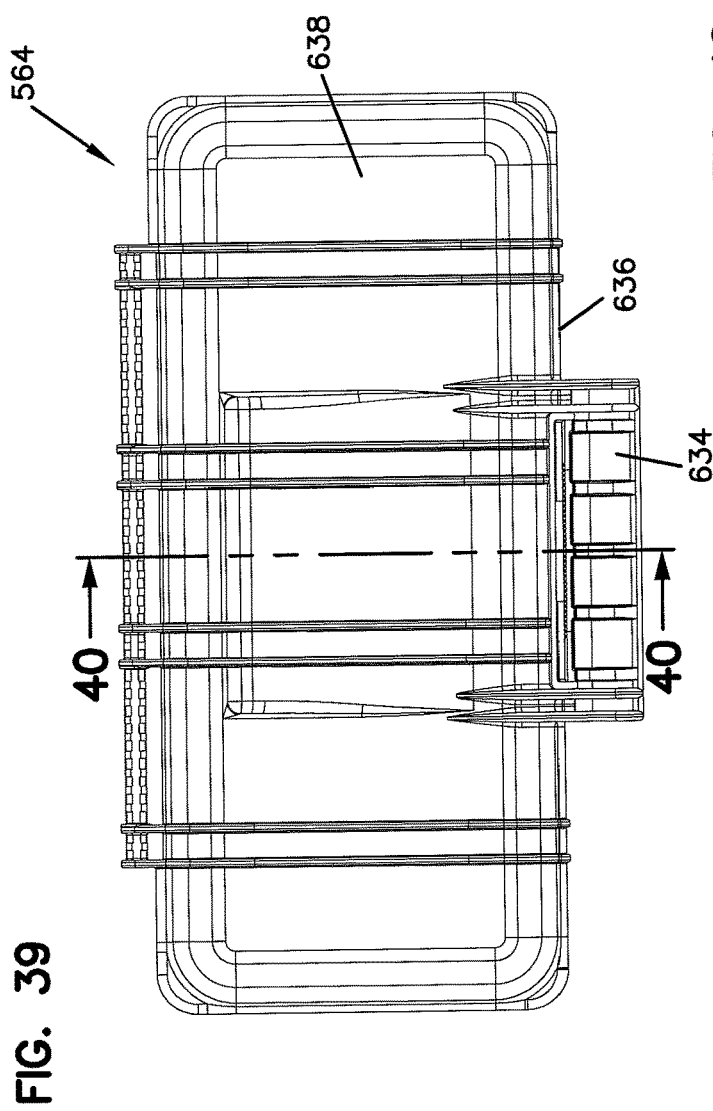
FIG. 39 is a top view of the access cover for the air cleaner of FIG. 37.

The housing 552 includes a surrounding housing wall 558 defining an open interior 560. The housing 552 further defines an access opening 562 in communication with the open interior 560 (FIG. 38). In the embodiment shown, the access opening 562 is located between the inlet arrangement 554 and outlet arrangement 556. When the air cleaner 550 is in a normal, upright operable orientation, the access opening 562 will be at a top part of the air cleaner 550.

A cover 564 is provided. The cover 564 is removably secured to the housing 552 over the access opening 562. In this embodiment, as with the previous embodiment, the cover 564 is pivotably secured to the housing 552 by a hinge arrangement 566. In this embodiment, the hinge arrangement 566 is located adjacent to the outlet arrangement 556. As such, the cover 564 is allowed to pivot about the hinge arrangement 566 between a closed position (FIG. 37) and an open position (FIG. 38). When in the open position, the interior 560 may be accessed. Further features regarding the cover 564 are discussed below.

In the previous embodiment, the housing wall 308 defined pair of opposing receiving grooves 318, 319. In this embodiment, the housing wall 558 does not include such receiving grooves and is groove-free by having a groove free wall 558.

Figure 37:
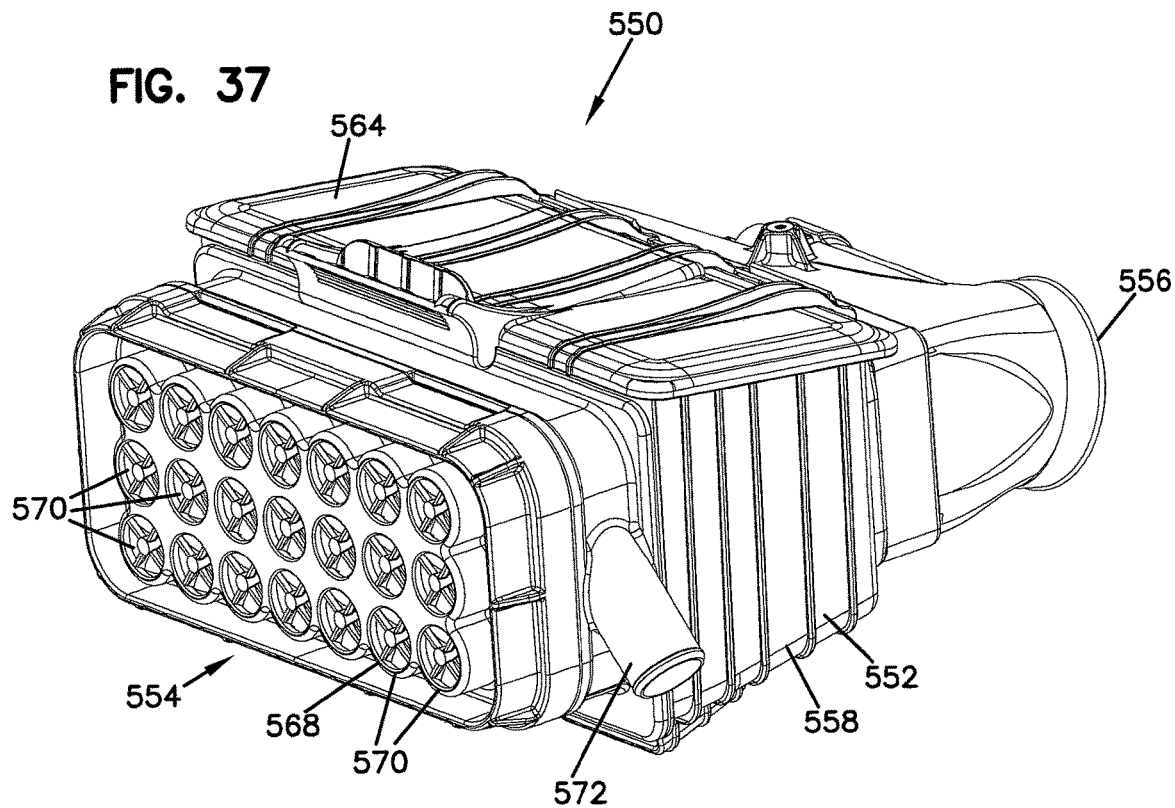
FIG. 37 is a perspective view of another embodiment of an air cleaner, constructed in accordance with principles of this disclosure.

Still in reference to FIG. 37, as with the previous embodiment, in this embodiment, the inlet arrangement 554 includes a pre-cleaner 568. The pre-cleaner 568 includes a plurality of centrifugal separator tubes 570. The tubes 570 cause incoming air to swirl around and help to separate and remove particulate material from the incoming air before the air is drawn into a remaining portion of the air cleaner 550. An ejector tube 572 can be seen in FIG. 37, in which the particulate matter separated by the pre-cleaner 568 may be expelled from the air cleaner 550.

In FIG. 38, an indicator 574, such a restriction indicator or a mass air flow sensor, is provided downstream of safety element 342. The indicator 574 provides information, such as the amount of restriction within the air cleaner 550. The safety element 342 is as described above with respect to FIG. 29.

B. Filter Cartridge

In FIG. 38, a filter cartridge 578 can be seen removed from the housing 552. Unlike previous embodiments, this embodiment does not include a cassette. Rather, the filter cartridge 578 is placed directly into the housing 552 without the use of a cassette; hence, the filter cartridge 578 is cassette-free. The filter cartridge 578 is operably oriented for selective removal within the open interior 560 between the inlet arrangement 554 and the outlet arrangement 556.

The filter cartridge 578 includes z-media 580 as described in sections I and II, above. In FIG. 38, only a portion of the z-media 580 is illustrated, but it should be understood that the entire face 582 of the cartridge 578 would have z-media 580 as illustrated at 580*a*. The cartridge 578 includes a seal member 584, which forms a releasable seal with the housing 552. As with the previous embodiment, in this embodiment, the seal member 584 forms a radial seal 618 with an internal surface 586 of the housing wall 558.

Figure 41:
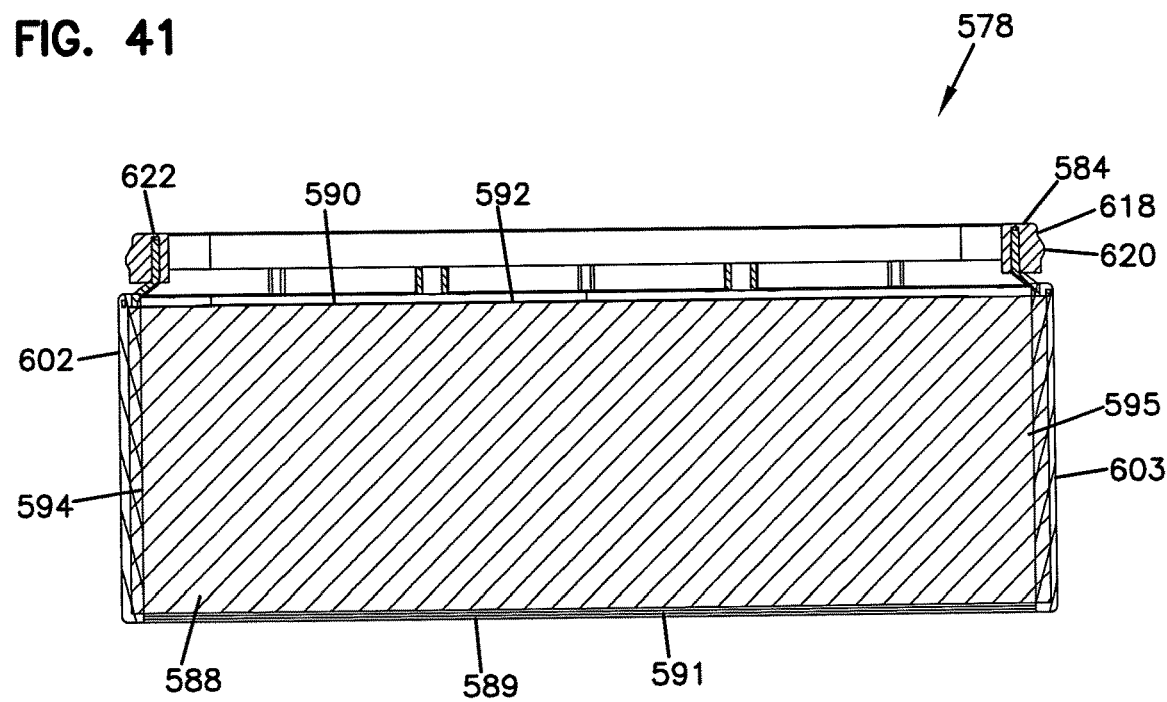
FIG. 41 is a cross-sectional view of the filter cartridge used in the air cleaner of FIG. 37, the cross-section being taken along the line 41-41 of FIG. 42.
Figure 42:
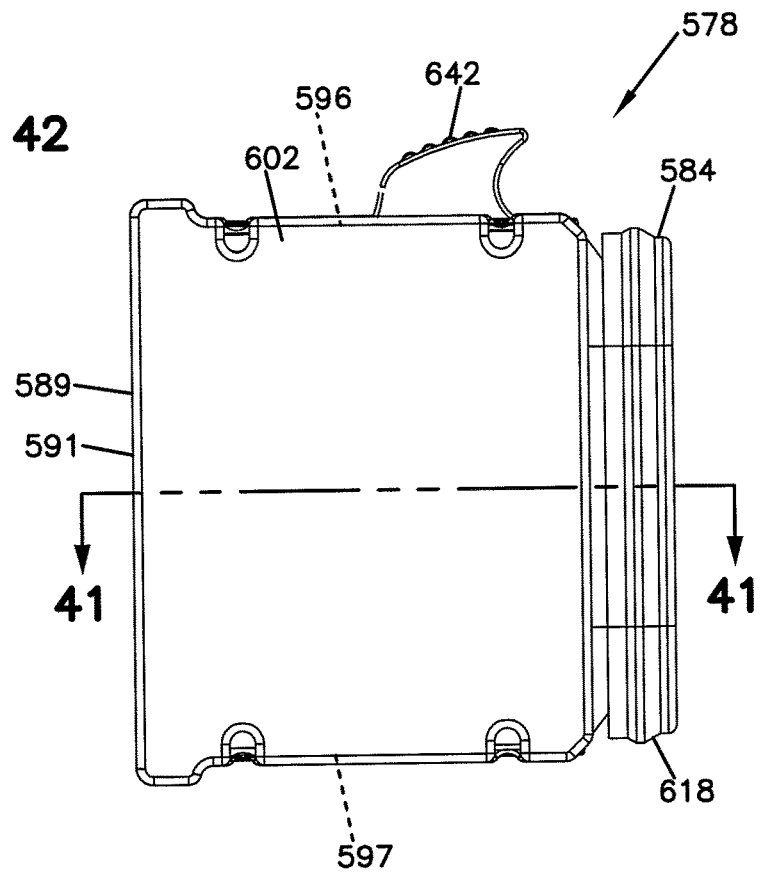
FIG. 42 is a side elevational view of the filter cartridge used in the air cleaner of FIG. 37.
Figure 43:
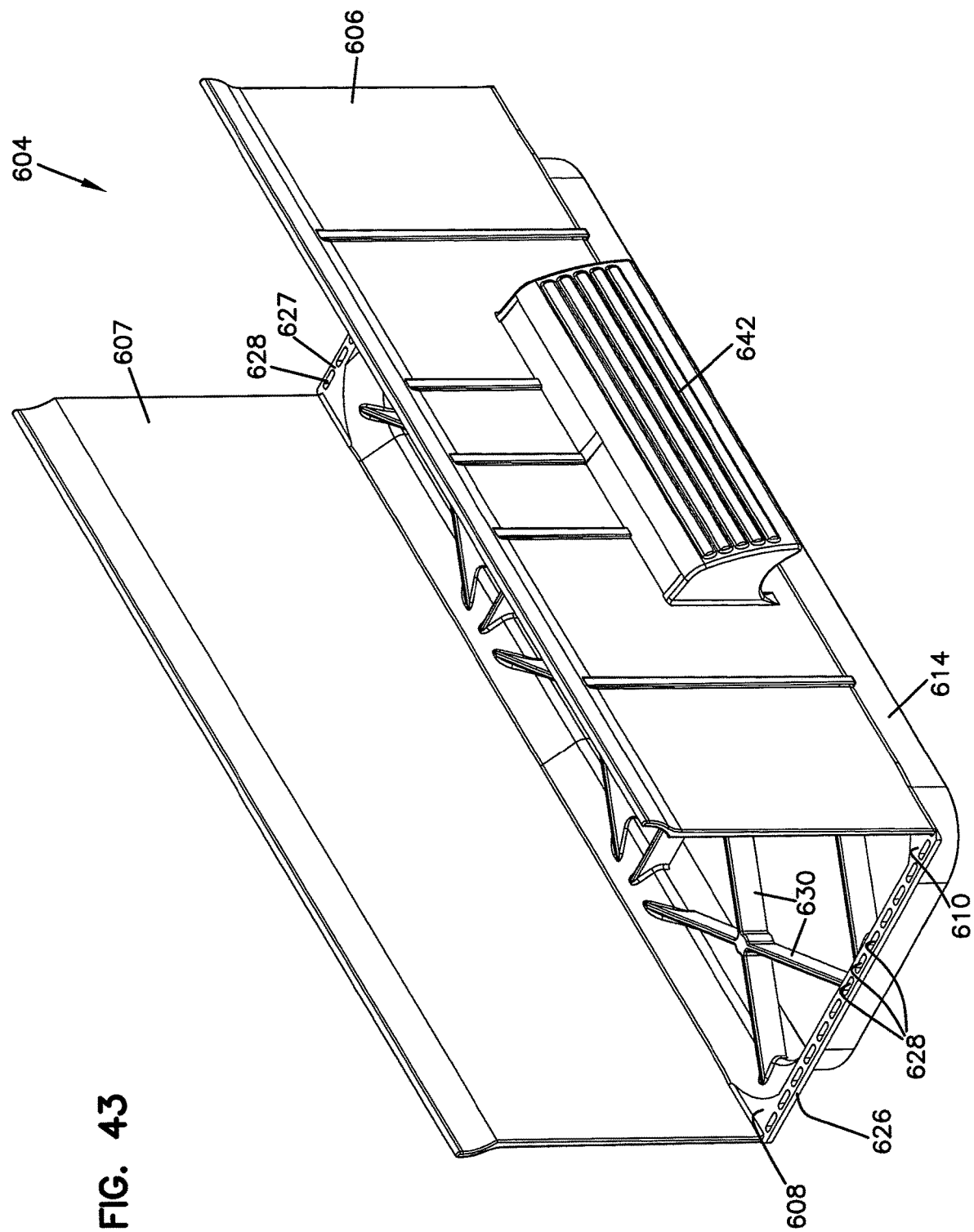
FIG. 43 is a perspective view of a shell that is part of the filter cartridge of FIGS. 41 and 42.
Figure 44:
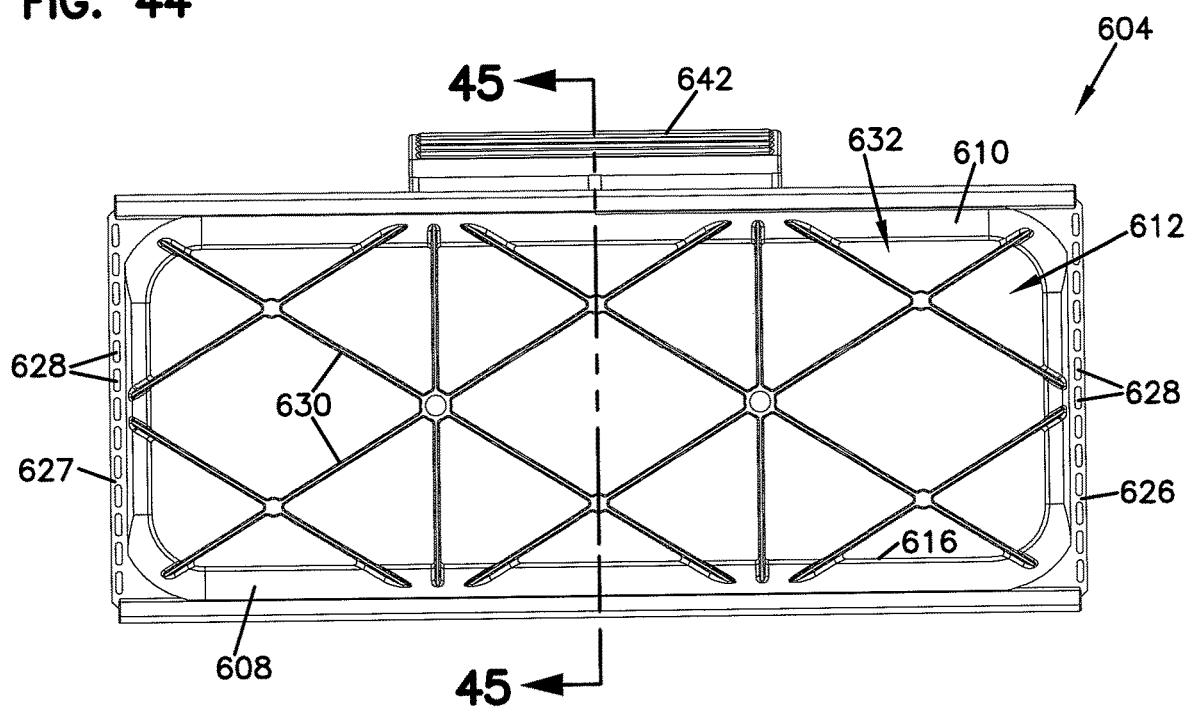
FIG. 44 is a top view of the shell of FIG. 43.

In reference now to FIGS. 41 and 42, example embodiment of the cassette-free filter cartridge 578 is depicted. The filter cartridge 578 includes a media pack 588 having first and second opposite flow faces 589, 590. In this embodiment, the first flow face 589 corresponds to an inlet flow face 591, while the second flow face 590 corresponds to an outlet flow face 592.

In this embodiment, the media pack 588 comprises a stack of strips of single facer filter media, as described above in connection with FIGS. 1 and 11. In this embodiment, the media pack 588 is shaped such that the first flow face 589 and the second flow face 590 each has a rectangular perimeter shape. The media pack 588, in the embodiment shown, has a generally rectangular cross-section with first and second opposite sides 594, 595 extending between the first and second flow faces 589, 590. The media pack 588 further includes third and fourth opposite sides 596, 597 (shown in phantom, FIG. 42) extending between the first and second flow faces 589, 590. The third and fourth sides 596, 597 also extend between the first and second sides 594, 595.

The media pack 588 comprises a plurality of flutes extending in a direction between the inlet flow face 591 and the outlet flow face 592. Selected ones of the flutes are closed at the inlet flow face 591 while being open at the outlet flow face 592 (outlet flutes), while selected ones of other flutes are open at the inlet flow face 591 (inlet flutes) and closed at the outlet flow face 592. When constructed this way, the media pack 588 is closed to air entering the inlet flow face 591 and passing outwardly from the outlet flow face 592 without being forced to filter flow through the z-media 580 of the media pack 588.

In this embodiment, the filter cartridge 578 further includes a first side panel 602 secured to the first side 594 of the media pack 588. Similarly, there is a second side panel 603 secured to the second side 595 of the media pack 588. The first and second panels 602, 603 are secured to the media pack 588 at the first and second sides 594, 595 in order to close or otherwise seal what might be a leak path for unfiltered air. The first and second side panels 602, 603 may be made from urethane, and the media pack 588 can be secured to the side panels 602, 603 by way of directly molding the media pack 588 into urethane that results in the panels 602, 603. Other methods can be used, such as by adhesive or other types of securing or molding techniques. The first and second side panels 602, 603 are sized and shaped to match the shape of the first and second sides 594, 595. In this embodiment, they are rectangular in shape.

The filter cartridge 578, in this embodiment, further includes a shell 604. The shell 604 (FIGS. 43-45) is mounted on the media pack 588. In this embodiment, the shell 604 has first and second opposing shell walls 606, 607 that are secured to and against the media pack 588. Specifically, in the embodiment shown, the first shell wall 606 is secured to and against the third side 596, while the second shell wall 607 is secured to and against the fourth side 597.

In this embodiment, the shell 604 further includes a frame 608. In the embodiment depicted, the frame 608 extends between and joins the first and second shell walls 606, 607. The frame 608 is mounted against the second flow face 590. The frame 608 includes a base member 610, which defines an air flow opening arrangement 612 in air flow communication with the second flow face 590. The frame 608, in this embodiment, further includes a seal support section 614. The seal support section 614, as depicted, extends from the base member 610 along a perimeter 616 (FIG. 44) of the air flow opening arrangement 612. The seal support section 614 is for supporting the seal member 584.

The seal support section 614, in the embodiment shown, extends in an axial direction that is generally parallel to the first and second side panels 602, 603, or the first and second shell walls 606, 607, and in preferred embodiments will extend in a same direction as the direction of flutes of the z-media 580.

The seal member 584 can be made out of a compressible material, for example, urethane, or foamed polyurethane, or rubber. The seal member 584 can be secured to the seal support section 614 using a variety of techniques. Example techniques include securing it with adhesive or glue, or by molding onto the seal support section 614 such as by over-molding. When mounted onto the seal support section 614, as shown in FIGS. 41 and 42, the seal member 584 forms a radially directed seal 618. In the embodiment shown, the radially directed seal 618 is outwardly directed, so that the seal 618 is formed by compression of the seal member 584 between and against the sealing surface 586 (FIG. 38) and the seal support section 614 of the filter cartridge 578.

The seal member 584, in the embodiment shown, has a profile with at least one step 620 that is larger in outermost dimension than the end tip 622 of the seal member 584. This helps to orient the seal member 584 against the sealing surface 586 during installation.

One example of a useable seal member is described in U.S. Pat. No. 6,350,291, incorporated herein by reference in its entirety.

Figure 45:
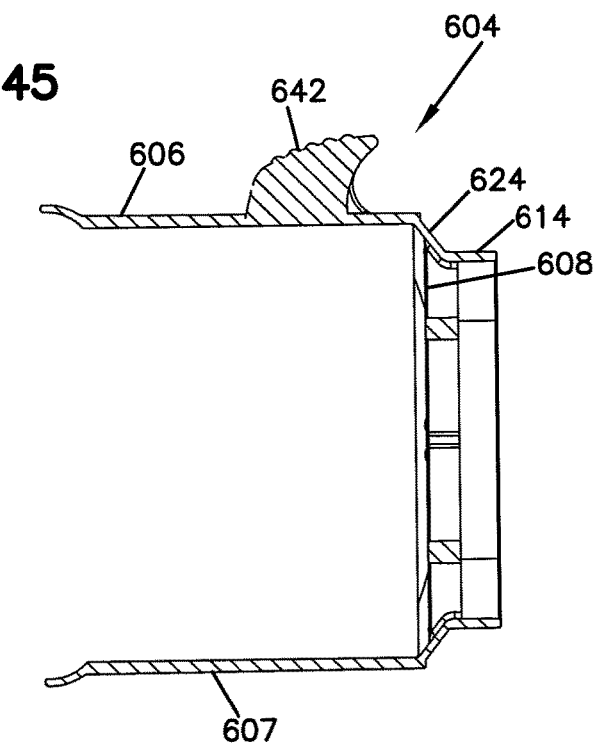
FIG. 45 is a cross-sectional view of the shell of FIGS. 43 and 44, the cross-section being taken along the line 45-45 of FIG. 44.

As can be seen in the embodiment of FIGS. 41 and 45, the seal support section 614 has a smaller outermost dimension than the outermost dimension of the base member 610. Between the base member 610 and the seal support section 614 is an inwardly directed step 624.

The base member 610 defines opposite first and second edges 626, 627 extending between the first and second shell walls 606, 607. The first edge 626 is adjacent to the first side 594, while the second edge 627 is adjacent to the second side 595. In this embodiment, the first and second edges 626, 627 define a plurality of through-holes 628. The through-holes 628 may be used to attach the first and second side panels 602, 603 to the first and second sides 594, 595, particularly if the first and second side panels 602, 603 are molded directly to the media pack 588. The holes 628 would receive the flow of uncured urethane, for example, to help secure the first and second side panels 602, 603 in place, if made in this manner.

The frame 608 further includes a media face cross-piece arrangement 630. In the embodiment shown, the cross-piece arrangement 630 is in engagement with the base member 610. In the embodiment shown, the cross-piece arrangement 630 is depicted as a grid 632. This embodiment shows the grid 632 as forming a pattern of diamond-shapes. The grid 632 helps to hold the media pack 588 in place and can help to prevent telescoping of the media pack 588.

In this embodiment, the filter cartridge 578 further includes a cartridge-handle 642. The cartridge-handle 642 projects from a portion of the media pack 588 to allow the filter cartridge 578 to be easily manipulated by the user. In this embodiment, the cartridge-handle 642 is part of the shell 604. In particular, the cartridge-handle 642 projects from the first shell wall 606. The cartridge-handle 642 extends from the first shell wall 606 a sufficient distance to accommodate portions of a human hand between the cartridge-handle 642 and the first shell wall 606. For example, the cartridge-handle 642 may accommodate 4 fingers of a human hand, while the thumb is on the opposite side of the cartridge-handle 642.

C. Cover

Attention is directed to FIGS. 38-40 and 46, in which details of the cover 564 are shown. The cover 564, in the embodiment shown, includes a grip 634 projecting over the inlet arrangement 554, and in particular, over the pre-cleaner 568. The grip 634 projects from a free end 636 of the cover 564. Opposite from the free end 636 is the hinge arrangement 566. By grasping the grip 634, the cover 564 may be pivoted about the hinge arrangement 566 relative to the housing wall 558 to selectively cover or expose the open interior 560.

Figure 46:
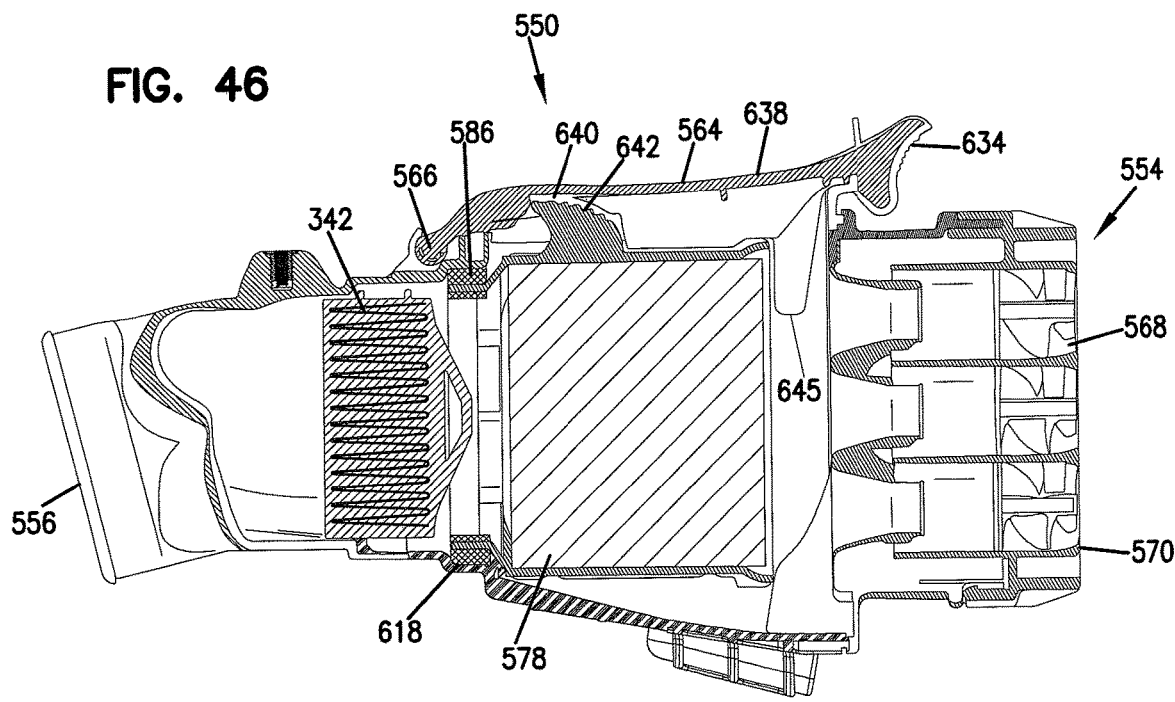
FIG. 46 is a schematic cross-sectional view of the air cleaner of FIG. 37 showing the internal components.

The cover 564 has an exterior surface 638 and an opposite interior surface 639. The interior surface 639 faces the housing open interior 560. In the particular embodiment shown, the interior surface 639 includes a receiver 640 that is sized to receive the cartridge-handle 642 projecting from the first shell wall 606. When the filter cartridge 578 is operably mounted within the housing 552, the receiver 640 contains at least a portion of the cartridge-handle 642 when the cover 564 is secured over the access opening 562. FIG. 46 shows the cartridge-handle 642 projecting within and being received by the receiver 640. The receiver 640 in this embodiment, is generally located adjacent to the hinge arrangement 566 and remote from the free end 636 and grip 634.

In this embodiment, the cover 564 further includes a projection arrangement 644. The projection arrangement 644 extends from the interior surface 639 into the housing open interior 560, when the cover 564 is secured over the access opening 562. In the embodiment shown, the projection arrangement 644 is located between the inlet flow face 591 or first flow face 589 of the filter cartridge 578 and the housing surrounding wall 558 to help hold the filter cartridge 578 in sealing engagement with the housing 552. This can be seen in FIG. 46. In particular, the projection arrangement 644 is between the first flow face 589 and a downstream portion of the pre-cleaner 568.

In the embodiment shown, the projection arrangement 644 includes at least first and second legs 645, 646. The first and second legs 645, 646 in this embodiment, extend from the cover 564, and for example, extend from the interior surface 639 of the cover 564. The first and second legs 645, 646, in the embodiment shown, do not extend the full length of the first flow face 589; rather, they extend less than 50%, and about 5-30% of the length of the first flow face 589 or the inlet flow face 591. The first and second legs 645, 646 help to prevent the radial seal 618 from backing out or becoming dislodged from its sealing engagement due to vibration, for example.

In the embodiment shown, the receiver 640 is located between the first and second legs 645, 646 and laterally spaced from the legs 645, 646. The legs 644, 645 are located adjacent to the free end 636 of the cover 564, while the receiver 640 is located adjacent to the hinge arrangement 566.

As can also be seen in FIGS. 38 and 46, the safety element 342 is operably located between the outlet flow face 592 and the outlet arrangement 556 of the housing 552. The safety element 342 is optional, and is removable and replaceable from the housing 552.

D. Method of Servicing

A method of servicing the air cleaner 550 is now described. The method includes grasping the cover 564 and pivoting the cover 564 away from the housing 552. During this step of pivoting, there is a step of moving the projection arrangement 644, which can include first and second legs 645, 646, that are extending from the cover 564 from a position adjacent to the filter cartridge 578. The step of moving the cover may also include exposing the cartridge-handle 642 on the cassette-free filter cartridge 578 from the receiver 640 in the cover 564. Next, the method includes grasping the cartridge-handle 642 on the cassette-free filter cartridge 578 and manipulating the filter cartridge 578 to release the seal, such as radial seal 618, between the filter cartridge 578 and the housing 552 by removing the cartridge 578 from the housing 552.

Next, a new cassette-free filter cartridge 578 is provided. The cartridge-handle 642 on the new filter cartridge 578 is grasped and directly inserted (without a cassette) into the open interior 560 of the housing 552. The new filter cartridge 578 is manipulated until the seal member 584 forms seal 618 with the housing by, for example, compression of the seal member 584 between and against the seal support section 614 of the frame 608 and the sealing surface 586 of the housing surrounding wall 558.

Next, the cover 564 is closed. By closing the cover 564, the projection arrangement 644 on the cover 564 is oriented between the inlet flow face 591 and the housing 552. Specifically, the first and second legs 645, 646 are oriented to project axially from the interior surface 639 of the cover 564 and be between the cartridge 578 and an internal surface of the housing wall 558. When closing the cover 564, the cartridge-handle 642 is placed within the receiver 640 of the cover 564. This also helps to secure the filter cartridge 578 within the housing 552.

V. The Embodiment of FIGS. 35-36, 47, and 48

Figure 35:
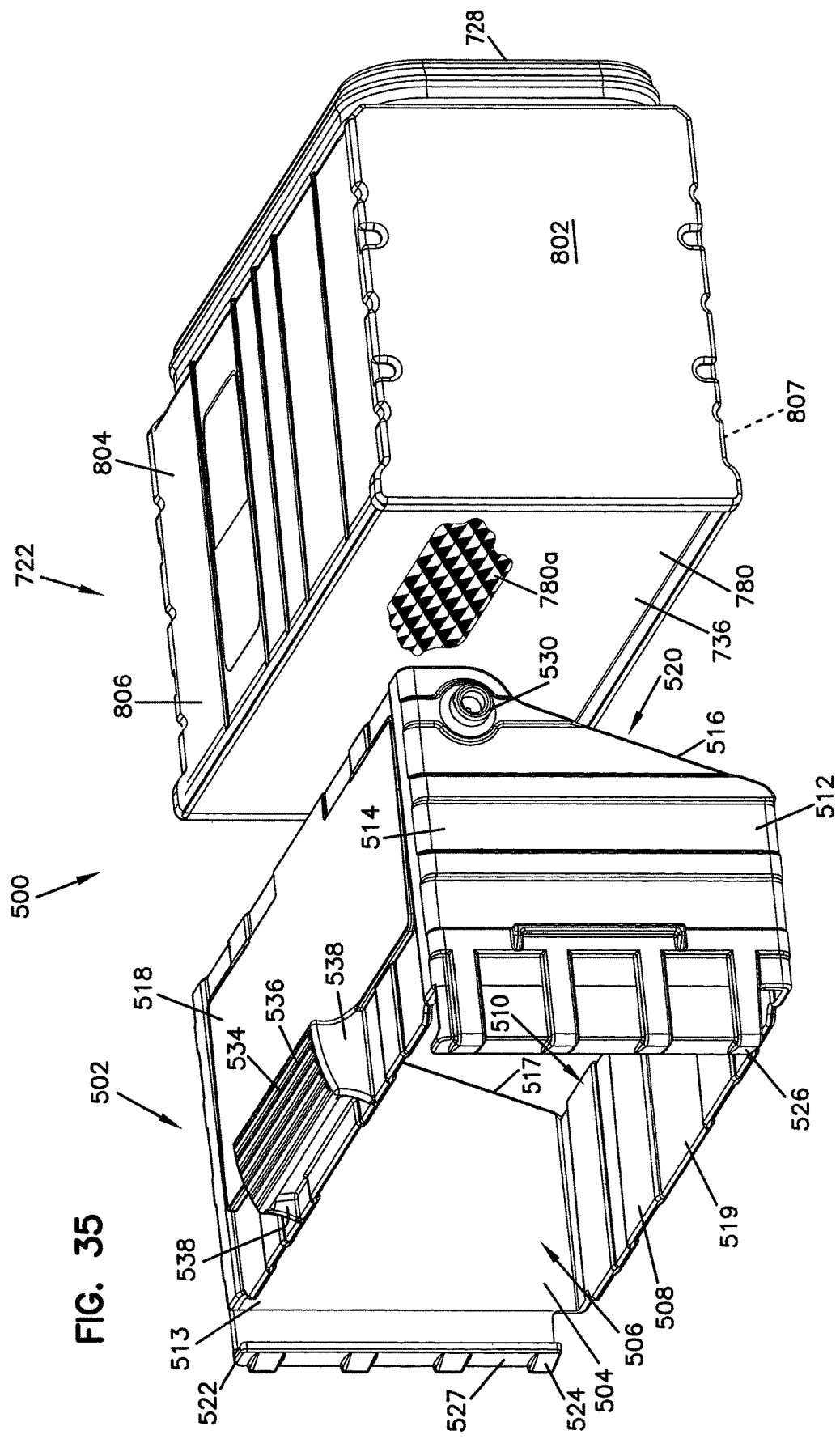
FIG. 35 is a perspective view of another embodiment of a filter cartridge and cassette assembly usable with the air cleaner of FIG. 8.
Figure 36:
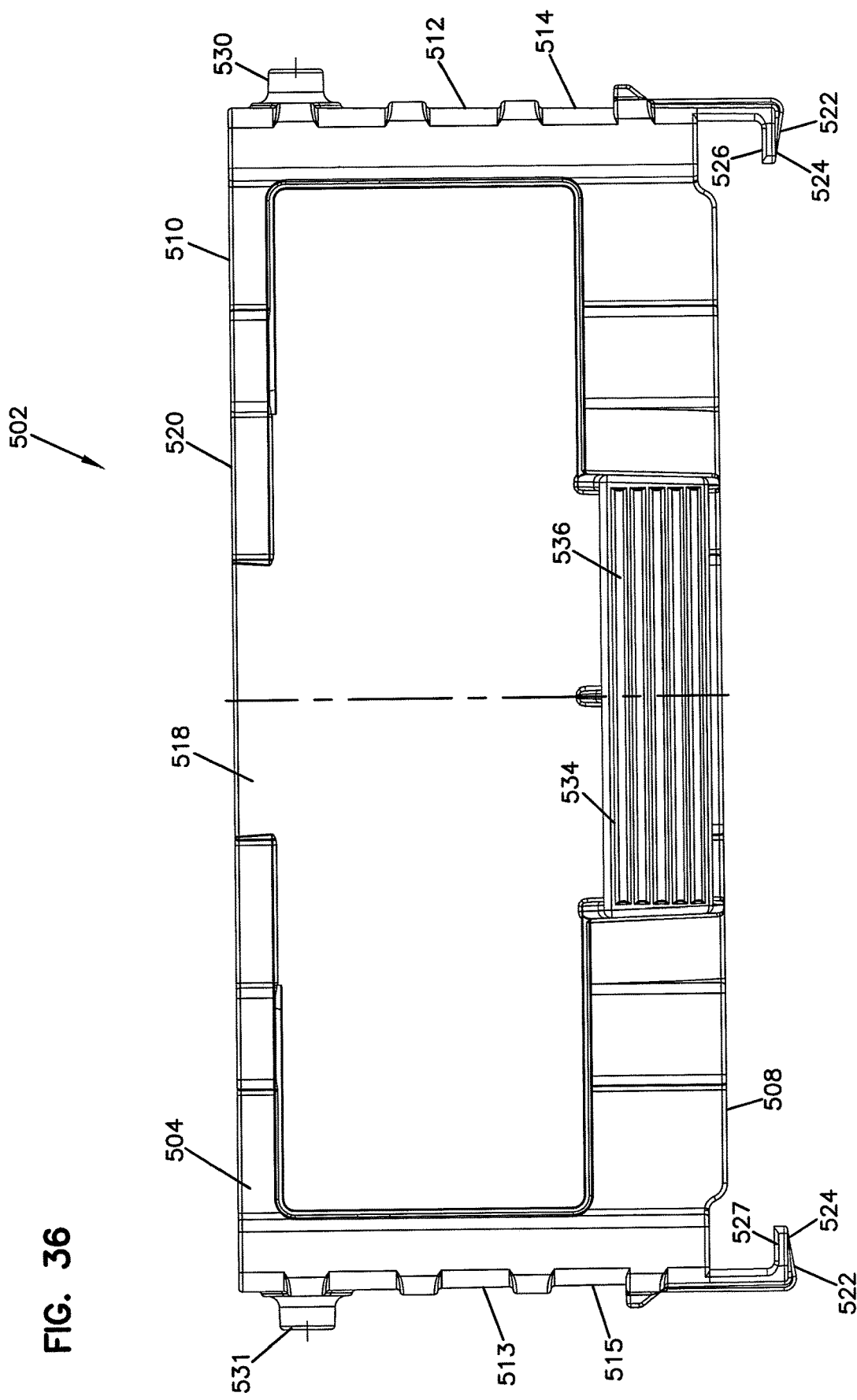
FIG. 36 is a top view of the cassette of FIG. 35.

In reference now to FIGS. 35 and 36, another embodiment of a cartridge and cassette assembly is shown generally at 500. The cartridge/cassette assembly 500 includes a filter cartridge 722, removably replaceable within a second embodiment of a cassette 502. The cassette 502 includes a cassette surrounding wall 504 defining a cassette open interior volume 506 therewithin. The cassette surrounding wall 504 includes first and second opposite open ends 508, 510 in communication with the interior volume 506.

In this embodiment, the cassette surrounding wall 504 has first and second opposite side walls 512, 513 defining exterior surfaces 514, 515. As can be seen in FIG. 35, the first and second side walls 512, 513 are generally trapezoidal in shape by having inclined edges 516, 517.

The cassette surrounding wall 504, in the embodiment shown, has a generally rectangular cross-section and includes a third side wall 518 in extension between the first side wall 512 and the second side wall 513. In this embodiment, the cassette surrounding wall 504 further includes a fourth side wall 519 extending between the first side wall 512 and the second side wall 513. The fourth side wall 519, in the embodiment shown, is generally parallel to the third side wall 518. A first and second side walls 512, 513 are generally parallel to each other and perpendicular to the third and fourth side walls 518, 519. As with the previous embodiment, in this embodiment, the second open end 510 is sized to be an access opening 520 to permit the filter cartridge 722 to be operably inserted and removed from the interior volume 506 of the cassette 502.

At the first open end 508, there is at least one cross piece 522 extending at least partially over the first open end 508 and in engagement with the cassette surrounding wall 504. The cross piece 522, in the embodiment shown, includes a ledge 524 extending over the first open end 508. Specifically, in this embodiment, the ledge 524 includes first and second arms 526, 527 extending over the first open end 508 from the first and second side walls 512, 513, respectively. The ledge 524 helps to hold the filter cartridge 722 in place within the cassette 502, while still allowing for the passage of air flow through the first open end 508 and to the inlet flow face 736 of the cartridge 722. When the filter cartridge 722 is operably oriented in the interior volume 506 of the cassette 502, the inlet flow face 736 is opposing, and may be against, the ledge 524 including the first arm 526 and second arm 527. When the filter cartridge 722 is removably oriented within the interior volume 506 of the cassette 502, the seal member 728 is outside of the cassette 502 and adjacent to the second open end 510 of the cassette 502. As such, as with the previous embodiment, only a portion of the filter cartridge 722 is within the interior volume 506 of the cassette 502.

As with the embodiment of FIGS. 8-34, in this embodiment, the cassette 502 includes a plurality of lugs, which is depicted as first and second lugs 530, 531. In the embodiment depicted, the first lug 530 extends from the exterior surface 515 of the first side wall 512, and the second lug 531 extends from the exterior surface 514 of the second side wall 513. In the embodiment depicted, the first and second lugs 530, 531 are illustrated as being projecting cylinders with circular cross-sections. The first and second lugs 530, 531 project from the first and second side walls 512, 513 a distance of at least 5 mm, for example, 10-40 mm, and no greater than 100 mm. In one example embodiment, the plurality of lugs includes no more than the first and second lugs.

The first and second lug 530, 531 is each located adjacent to the second open end 510 and adjacent to the inclined edges 516, 517. By the term "adjacent" in this context, it is meant that the first and second lugs 530, 531 are located no greater than 20% of the overall length of the edge of the second open end 510, and no greater than 20% of the overall length of the first and second side walls 512, 513 from the third side wall 518.

As with the embodiment of FIGS. 8-34, in this embodiment the cassette 502 further includes a handle 534 sized to accommodate at least a portion of a human hand. The handle 534 is provided so that the user may have structure to grasp in order to manipulate the cassette 502 alone, and also the cartridge/cassette assembly 500.

In this embodiment, the handle 534 is projecting from the surrounding wall 504. The handle 534 includes a flange 536 connected to the surrounding wall 504 by gussets 538. By spacing the flange 536 from the cassette surrounding wall 504, space is provided to accommodate portions of a human hand, such as four fingers. The flange 536 can be spaced at least 5 mm, for example 10-75 mm from the surrounding wall 504.

In the illustrated embodiment, the handle 534 projects from the third side wall 518. Further, in the embodiment depicted, the handle 534 is adjacent to the first open end 508 of the cassette 502. By the term "adjacent" it is meant that the handle 534 is no greater than 20% of the overall length of the third side wall 518 away from the first open end 508.

The cartridge/cassette assembly 500 is selectively mountable within the housing 302 (FIG. 8).

Figure 47:
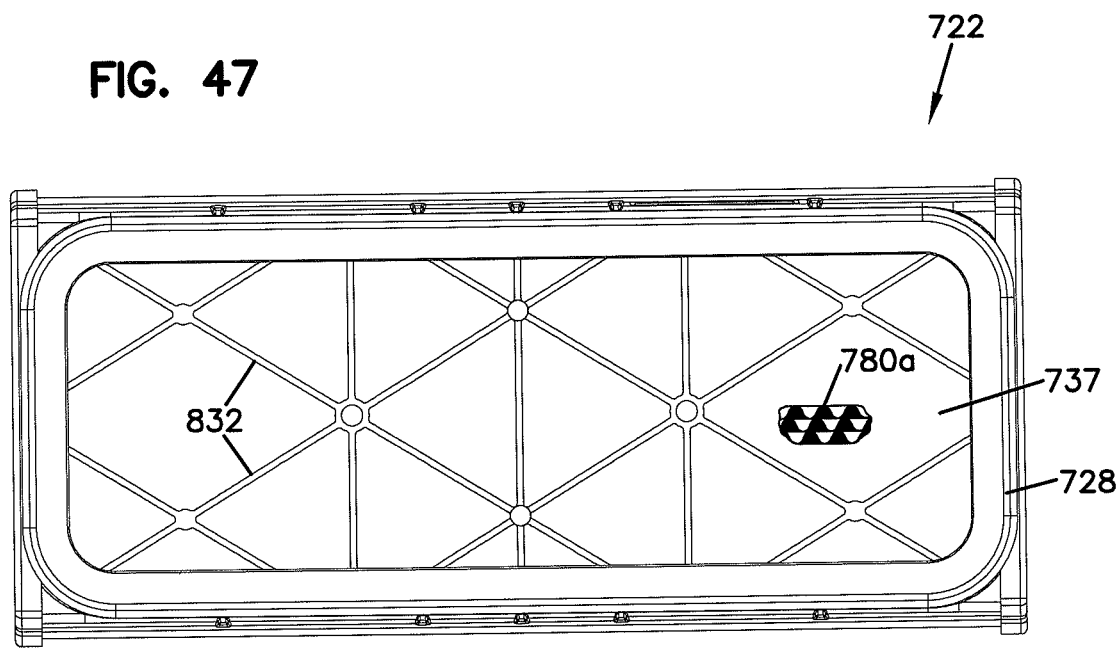
FIG. 47 is an end view of the filter cartridge depicted in the embodiment of FIG. 35.
Figure 48:
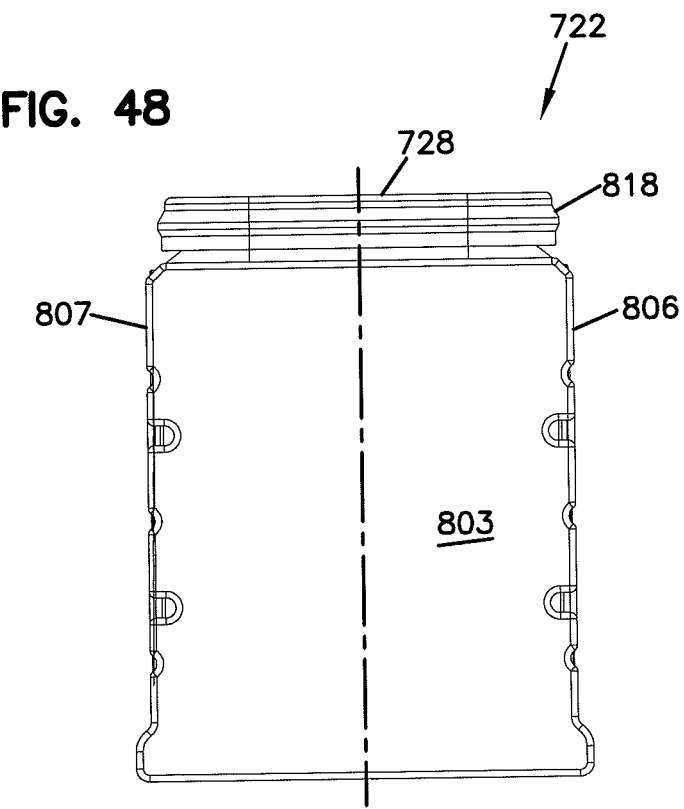
FIG. 48 is a side elevational view of the filter cartridge depicted in FIGS. 35 and 47.

The filter cartridge 722 includes z-media 780 as described in sections I and II, above. In FIGS. 35 and 47, only a portion of the z-media 780 is shown at portion 780a. It should be appreciated that the entire inlet face 736 and outlet face 737 would have z-media 780 as illustrated at 780a.

The filter cartridge 722 can be constructed analogously to the filter cartridge 578, described in connection with FIGS. 41 and 42. One difference between the filter cartridge 722 of FIGS. 35, 47, and 48 and the filter cartridge 578 (FIGS. 41 & 42) is that the filter cartridge 578 includes a cartridge-handle 642 constructed as part of the filter cartridge 578. Otherwise, the description of the filter cartridge 722 is the same as the cartridge 578, described above, and this description is incorporated herein by reference. The filter cartridge 722 can include a shell 804 having a first shell wall 806 and a second shell wall 807. First and second side panels 802, 803 are against sides of the media pack and are between the first and second shell walls 806, 807.

The shell 604 includes a frame, such as frame 608 including a seal support section, such as seal support section 614, and this supports the seal member 728. The seal member 728 forms a radially directed seal 818. A grid 832 is over and can be against the downstream or outlet flow face 737.

The above provides examples and principles. Many embodiments can be made using the principles described.

What is claimed is:

1. An air filter cartridge comprising:
   (a) a media pack having inlet and outlet opposite flow faces; the media pack comprising a z-filter media construction having a network of inlet and outlet flutes, inlet flutes being open at a region adjacent the inlet face and being closed at a region adjacent the outlet face; and, outlet flutes being closed adjacent the inlet face and being open adjacent the outlet face and oriented with flutes of each fluted sheet extending in a direction between the inlet and outlet flow faces;
      (i) the media pack having opposite first and second portions and opposite third and fourth portions therebetween;
      (ii) the third and fourth portions are longer than the first and second portions;
   (b) a frame secured to the media pack and mounted against the outlet flow face and a seal support section; the frame being a portion of a shell around the media pack;
      (i) the frame including a media face cross-piece arrangement extending across the outlet flow face;
   (c) a seal member oriented against the seal support section; and (d) a cartridge-handle projecting from the shell along the third portion of the media pack; the cartridge-handle having a surface profile angled upwardly from the shell to a terminal end and defining an opening between the surface profile and the shell.

2. The air filter cartridge of claim 1 wherein the media pack comprises a stack of strips of a fluted media sheet secured to a facing media sheet and oriented with flutes of each fluted sheet extending in a direction between the inlet face and outlet face.

3. The air filter cartridge of claim 1 wherein the third and fourth portions are straight sides.

4. The air filter cartridge of claim 1 wherein the seal member has a surface configured to form a radially outwardly directed seal.

5. The air filter cartridge according to claim 1 wherein:
  (a) the inlet flow face has a rectangular perimeter shape; and
  (b) the outlet flow face has a rectangular perimeter shape.

6. An air filter cartridge according to claim 1 wherein:
  (a) the seal support section has an end tip; and
  (b) a portion of the seal member is positioned over the end tip.

7. An air filter cartridge according to claim 1 wherein the cartridge-handle is centered along the third portion, between the first portion and second portion.

8. An air cleaner comprising:
  (a) a housing including a surrounding housing-wall defining an open interior; an inlet arrangement; and an outlet arrangement; the inlet arrangement and outlet arrangement being at opposite ends of the housing; the housing defining an access opening in communication with the open interior;
  (b) a cover removably secured to the housing over the access opening; the cover having an exterior surface and an opposite interior surface, the interior surface facing the housing open interior;
  (c) a cassette-free filter cartridge removably oriented for selective removal within the open interior between the inlet arrangement and outlet arrangement; the filter cartridge including a media pack having inlet and outlet opposite flow faces; the media pack comprising a z-filter media construction having a network of inlet and outlet flutes, inlet flutes being open at a region adjacent the inlet face and being closed at a region adjacent the outlet face; and, outlet flutes being closed adjacent the inlet face and being open adjacent the outlet face and oriented with flutes of each fluted sheet extending in a direction between the inlet and outlet flow faces; and a seal member secured to the media pack; the seal member forming a releasable seal with a sealing surface in the housing so that the filter cartridge is in sealing engagement with the housing;
    (i) a handle sized to accommodate at least a portion of a human hand extending from the filter cartridge; and
    (ii) the interior surface of the cover includes a receiver that contains at least a portion of the cartridge-handle when the filter cartridge is operably oriented within the housing interior and when the cover is secured over the access opening;
  (d) the cover further includes a projection arrangement extending from the interior surface into the housing open interior, when the cover is secured over the access opening;
    (i) the projection arrangement being between the inlet face of the filter cartridge and the housing surrounding wall; and
    (iii) the receiver is between the projection arrangement and laterally spaced therefrom.

9. An air cleaner according to claim 8 wherein:
  (a) the filter cartridge includes a shell with first and second opposing shell walls secured to the media pack; the handle projecting from the first shell wall.

10. An air cleaner according to claim 9 wherein:
  (a) the shell includes a frame extending between and joining the first and second shell walls; the frame being mounted against the second flow face of the media pack;
  the frame including:
    (i) a base member defining an airflow opening arrangement in communication with the second flow face;
    (ii) a seal support section extending from the base member along a perimeter of the airflow opening arrangement; and
  (b) the seal member is oriented against the seal support section.

11. An air cleaner according to claim 8 wherein:
  (a) the cover has a free end with a grip for manipulating the cover;
  (b) the projection arrangement is located adjacent to the free end; and
  (c) the inlet arrangement includes a precleaner;
    (i) the grip projecting over the precleaner.

12. An air cleaner according to claim 8 further including:
  (a) a safety element operably located between the outlet flow face of the filter cartridge and the outlet arrangement of the housing.

13. A method of servicing an air cleaner; the method comprising:
  (a) grasping a cover of an air cleaner and pivoting the cover away from an air cleaner housing; the step of pivoting the cover away includes:
    (i) moving a projection arrangement extending from the cover from a position adjacent to a cassette-free filter cartridge; and
    (ii) exposing a handle on the cassette-free filter cartridge from a receiver in the cover;
  (b) releasing a seal between the filter cartridge and the housing by removing the filter cartridge from the housing;
    (i) the filter cartridge including a media pack comprising a z-filter media construction having a network of inlet and outlet flutes, inlet flutes being open at a region adjacent the inlet face and being closed at a region adjacent the outlet face; and, outlet flutes being closed adjacent the inlet face and being open adjacent the outlet face and oriented with flutes of each fluted sheet extending in a direction between the inlet and outlet flow faces;
  (c) providing a new filter cartridge; the new filter cartridge including:
    (i) a media pack having opposite inlet and outlet flow faces; the media pack comprising a z-filter media construction having a network of inlet and outlet flutes, inlet flutes being open at a region adjacent the inlet face and being closed at a region adjacent the outlet face; and, outlet flutes being closed adjacent the inlet face and being open adjacent the outlet face and oriented with flutes of each fluted sheet extending in a direction between the inlet and outlet flow faces;
    (ii) a seal member secured to the media pack; and
    (iii) a handle extending therefrom; the filter cartridge being cassette-free;

(d) operably installing the new filter cartridge into the housing by forming a seal between the seal member and the housing;

(e) closing the cover to:
  (i) orient the projection arrangement on the cover between the inlet flow face and the housing; and
  (ii) orient the receiver of the cover so that the handle of the new filter cartridge is within the receiver.

14. The method of claim 13 wherein the step of providing a new filter cartridge includes providing a filter cartridge in which the inlet flow face has a rectangular perimeter shape; and the outlet flow face has a rectangular perimeter shape.

15. The method of claim 13 wherein the step of providing a new filter cartridge includes providing a filter cartridge having a shell secured to the media pack; the shell including a frame mounted against the outlet flow face and a seal support section; the frame including a media face crosspiece arrangement extending across the outlet flow face; and the seal member is oriented against the seal support section.

16. The method of claim 13 wherein the step of by forming a seal between the seal member and the housing includes forming a radially outwardly directed seal with the air cleaner housing.

\* \* \* \* \*